United States Patent [19]

Torii et al.

[11] Patent Number: 6,014,073
[45] Date of Patent: Jan. 11, 2000

[54] TEMPERATURE SENSOR ELEMENT, TEMPERATURE SENSOR HAVING THE SAME AND METHOD FOR PRODUCING THE SAME TEMPERATURE SENSOR ELEMENT

[75] Inventors: Hideo Torii, Osaka; Takeshi Kamada, Nara; Atsushi Tomozawa, Osaka; Eiji Fujii, Osaka; Ryoichi Takayama, Osaka; Hiroki Moriwake, Hyogo, all of Japan

[73] Assignee: Matsushita Electric Industrial Co., Ltd., Osaka, Japan

[21] Appl. No.: 08/776,625

[22] PCT Filed: May 10, 1996

[86] PCT No.: PCT/JP96/01266

§ 371 Date: Jan. 10, 1997

§ 102(e) Date: Jan. 10, 1997

[87] PCT Pub. No.: WO96/35932

PCT Pub. Date: Nov. 14, 1996

[30] Foreign Application Priority Data

May 11, 1995 [JP] Japan ..................................... 7-112896
Mar. 12, 1996 [JP] Japan ..................................... 8-54601

[51] Int. Cl.[7] .................................................... H01C 7/10
[52] U.S. Cl. ........................... 338/25; 338/28; 338/22 SD
[58] Field of Search ............................ 338/22 R, 22 SD, 338/25, 28

[56] References Cited

U.S. PATENT DOCUMENTS

| | | | |
|---|---|---|---|
| 3,469,224 | 9/1969 | Riddel et al. | 338/22 R |
| 3,872,419 | 3/1975 | Groves et al. | |
| 4,037,082 | 7/1977 | Tamada et al. | 219/541 |
| 4,177,375 | 12/1979 | Meixner | 219/441 |
| 4,223,208 | 9/1980 | Kleinschmidt et al. | 219/530 |
| 4,424,507 | 1/1984 | Nagai et al. | 338/22 R |
| 4,987,749 | 1/1991 | Baier | 62/222 |
| 5,158,366 | 10/1992 | Nagai et al. | 374/183 |
| 5,497,139 | 3/1996 | Takahashi et al. | 338/22 SD |

FOREIGN PATENT DOCUMENTS

| | | |
|---|---|---|
| 3100852 | 8/1982 | Germany ................................ 338/25 |
| 57-149929 | 9/1982 | Japan . |
| 63-224302 | 9/1988 | Japan . |
| 2-87032 | 3/1990 | Japan . |
| 6-258147 | 9/1994 | Japan . |
| 6-283310 | 10/1994 | Japan . |

OTHER PUBLICATIONS

Dummer, "Materials for Resisitive and Conductive Functions" (1970), p18.

Takeshi Nagai et al., "Rapid response SiC thin–film thermistor" *Review of Scientific Instruments* vol. 55, No. 7, pp. 1163–1165 Jul. 1984.

Communication from European Patent Office and Supplementary Search Report May 28, 1998.

*Primary Examiner*—Michael L. Gellner
*Assistant Examiner*—Karl Easthom
*Attorney, Agent, or Firm*—Merchant, Gould, Smith, Edell, Welter & Schmidt P.A.

[57] ABSTRACT

A temperature sensor element for measuring the temperature of exhaust gas from car engines comprises a metallic support having a shape of a flat board, a first electric-insulating film existing on the support, a first temperature sensitive film existing on the first electric-insulating film and having a pair of electrodes, and a second electric-insulating film existing on the temperature sensitive film. The element is superior in thermal shock resistance. The element needs no heat-resistant cap. The element is superior in heat-response since the element has a small heat capacity.

11 Claims, 37 Drawing Sheets

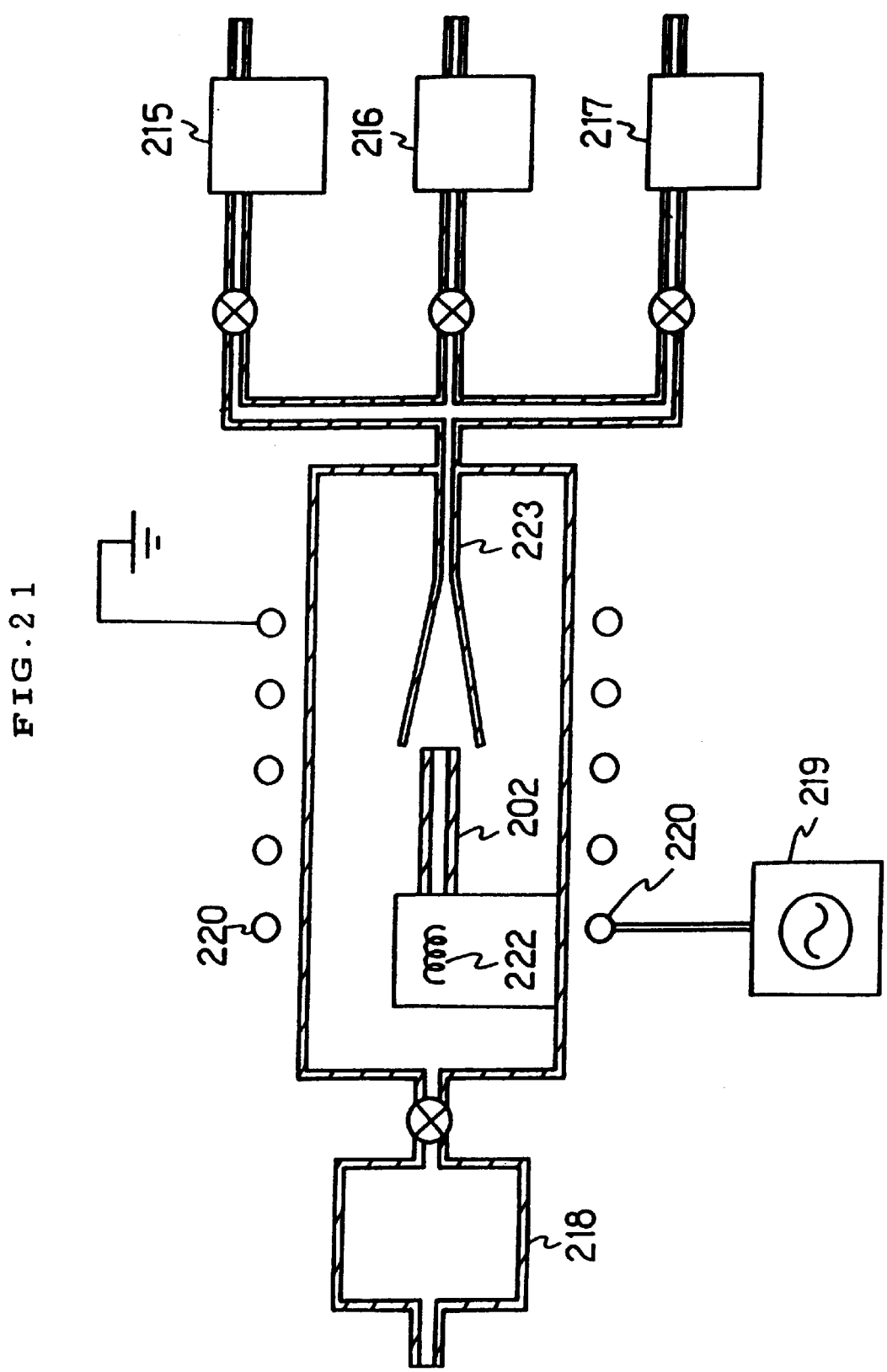

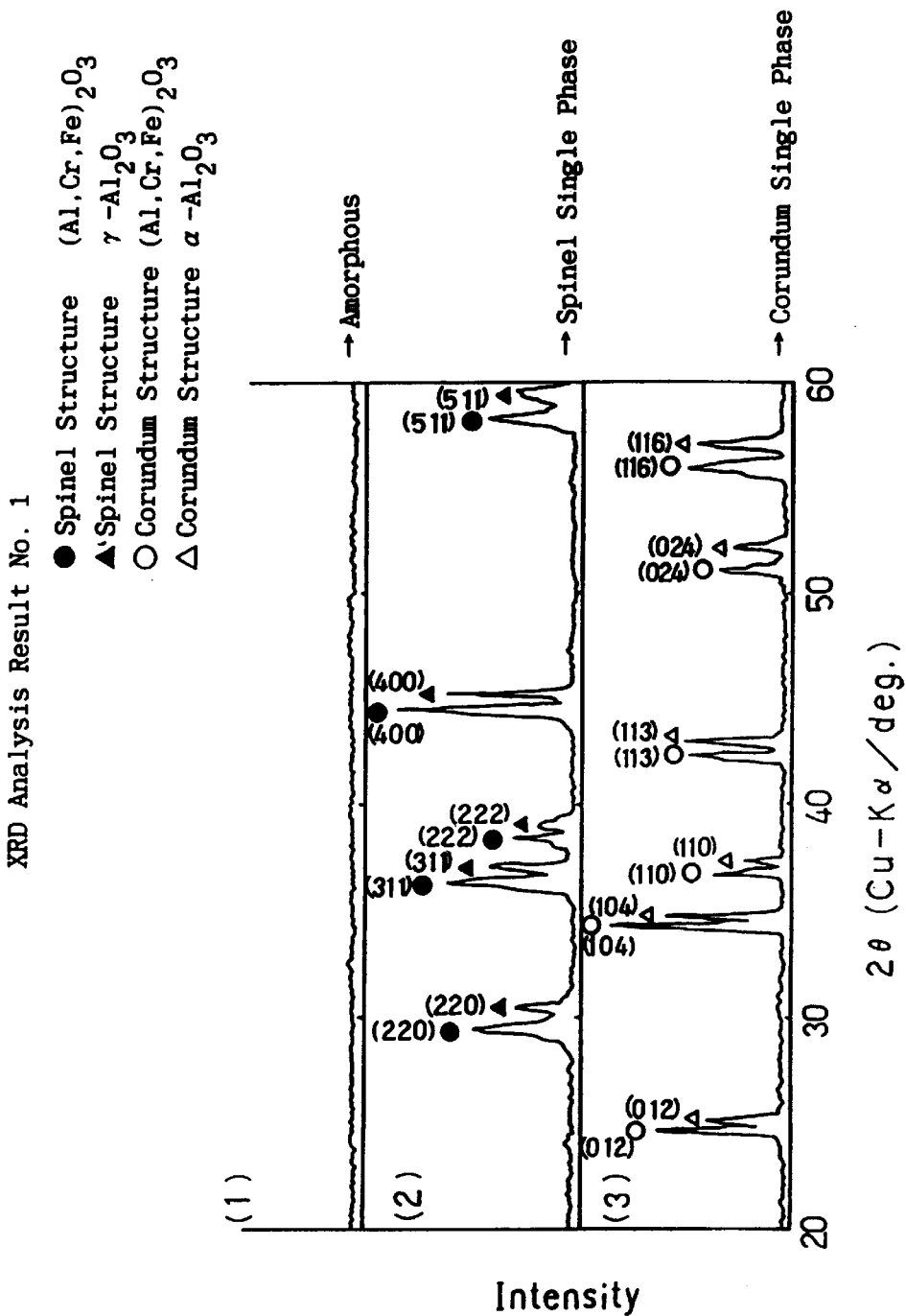

TEMPERATURE SENSOR ELEMENT, TEMPERATURE SENSOR HAVING THE SAME AND METHOD FOR PRODUCING THE SAME TEMPERATURE SENSOR ELEMENT

TECHNICAL FIELD

The invention relates to temperature sensor elements for measuring the temperature of a variety of substances, temperature sensors having the element, and methods for manufacturing the temperature sensor elements. Particularly, the invention relates to temperature sensor elements superior in heat-resistance, thermal shock resistance, heat-response and reliability, and methods for producing the same.

BACKGROUND OF THE INVENTION

Exhaust gas from car engines lately has been required to be purified as much as possible for release into the air in view of preventing air pollution. For this reason, an exhaustion system provided with a catalytic converter purifies exhaust to harmless gas. In this case, the temperature of the catalysts has to be measured exactly to increase purification efficiency, i.e. catalyst efficiency. Consequently, temperature sensor elements to measure the temperature of exhaust from car engines need to be heat-resistant, thermal shock resistant, heat-responsive and reliable.

FIG. 35 shows an example of a temperature sensor element comprising a composite of sintered body 100 and lead 101 of precious metal. Sintered body 100 exhibited a reponse property of linear type, nonlinear type, negative type or positive type with respect to temperature. FIG. 36 shows temperature sensor 120. Lead 101 from temperature sensor element 102 was connected with lead 103. Metallic housing 105 was provided on the outer face of lead 103 through electric insulator 104. The other end of housing 105, where no sensor element was provided, was fixed on metallic flange 106. Flange 106 is to fix the sensor on substances whose temperature is to be measured. Electric-insulator 107 insulated lead 103, housing 105 and flange 106. Cap 108 made of heat-resistant metal covered temperature sensor element 102 (e.g. JP Kokai Laid-Open No. Hei 6-283310, and U.S. Pat. No. 5,497,139).

However, when conventional temperature sensors having a temperature sensor element as described above were installed to catalyst converters of cars, the temperature sensors had some problems. The temperature sensors were not heat responsive. The manufacturing process was complicated. That was because temperature sensitive body 100 was a sintered body and therefore the size and thermal capacity were large, and further because temperature sensor element 102 was covered with cap 108 of heat resistant metal. When heat resistance and shock-proofing tests were performed using the conventional temperature sensor having no cap 108 of heat resistant metal, temperature sensitive body 100 cracked.

To solve the above problems, the invention aims to provide a temperature sensor element superior in heat-resistance, thermal shock resistance, heat-response and reliability, where the resistance hardly changes over time, a temperature sensor having such a temperature sensor element and a method for producing the element.

DISCLOSURE OF THE INVENTION

To attain the purpose of the invention, the first temperature sensor element of the invention comprises a planar heat-resistant metallic support, a first electric-insulating film on the support, a temperature sensitive film on the electric-insulating film, a pair of electrodes facing each other in contact with the temperature sensitive film, and a second electric-insulating film on the pair of electrodes. Preferable examples of the metal support include a heat-resistant alloy having 18 atom % of Cr, 3 to 4 atom % of Al, and the remainder of Fe. Other examples include stainless steel (SUS), heat-resistant steel (a stainless steel containing a high content of Cr), titanium steel, and duralumin. The shape of the metal support is not particularly restricted, and the metal support is appropriately shaped according to the use thereof. The preferable thickness is, for example, about 0.2 to 10 mm. The electric insulating film is formed of materials such as alumina ($Al_2O_3$), ceramic exhibiting a resistance of $10^{12}\Omega$.cm or more at 25° C., or glass. The preferable thickness is about 1 to 3 $\mu$m. The temperature sensitive film is preferably formed of ceramic semiconductor. A particular preferred example is an oxide containing Al, Cr and Fe as main components and having the corundum crystal structure or spinel crystal structure. The corundum crystal structure is also called α-alumina structure, and the structure is a crystal structure that compounds represented by the formula $A_2B_3$ exhibit. The spinel crystal structure is called "senshoseki (spinel)" structure, and the structure is a crystal structure that compounds represented by the formula $AB_2X_4$ exhibit, wherein A and B represent positive elements and X represents a negative element. An example of the preferable compositions containing Al, Cr and Fe is $(Al_{1-x-y}, Cr_x, Fe_y)_2O_z$ wherein $0.05 \leq x+y \leq 0.95$, $0.05 \leq y/(x+y) \leq 0.6$ and $8/3 \leq z \leq 3$. The electrode is preferably formed of precious metals, mainly platinum. Examples of the materials containing platinum include a platinum to which is added rhodium, iridium or yttrium and the like to increase heat resistance, or a simple substance of platinum. The content of the above additional elements is, for example, as follows: rhodium can be up to about 40 atom % and yttrium can be up to about 5 atom %. Iridium can be contained as a simple substance. The preferable thickness of the electrode films is about 0.05 to 3 $\mu$m.

It is preferable in the above invention that a second temperature sensitive film exists between the first temperature sensitive film and the second electric insulating film.

It is preferable in the above invention that one of the pair of electrodes is a first electrode film existing on an upper surface of the temperature sensitive film and the other of the pair of electrodes is a second electrode film existing on a bottom surface of the temperature sensitive film.

It is preferable in the above invention that a metallic cover exists on the second electric-insulating film.

It is preferable in the above invention that the metallic cover is unremovably connected with the metallic support having a shape of a flat board.

It is preferable in the above invention that the electrodes consist of a thin film of a precious metallic alloy.

The first temperature sensor of the invention is characterized by comprising a metallic flange to fix a substance of which temperature is to be measured on the temperature sensor, a metallic housing being connected with the metallic flange, a temperature sensor element being connectedly fixed on the metallic housing, a lead to take out a signal, which is connected with the temperature sensor element, and an electric insulator to electrically insulate the metallic housing from the leads, existing on the lead, wherein the temperature sensor is connectedly fixed on the metallic housing, the lead to take out a signal is connected with each of the pair of electrodes of the temperature sensor element, and the electric insulator is provided on the leads to electrically insulate the leads from the metallic housing.

The first method for producing a temperature sensor element of the invention comprises the steps of forming a first electric-insulating film on a surface of a heat-resistant metallic support having a shape of a flat board, forming a first temperature sensitive film on the first electric-insulating film, forming a pair of electrode films facing each other in contact with the temperature sensitive film, and forming a second electric-insulating film on one part of a surface of the pair of electrode films with another part of the surface of the pair of electrode films uncovered by the second electric-insulating film. The electric-insulating film and the temperature sensitive film are sequentially formed in, for example, metal organic chemical vapor deposition (MOCVD). The electrode films are, for example, formed in the sputtering method.

It is preferable that the above method further comprises the steps of forming a second temperature sensitive film on one part of a surface of the pair of electrode films, with another part of the surface of the pair of electrode films being uncovered by the second temperature sensitive film, before forming the second electric-insulating film, and forming the second electric-insulating film on a surface of the second temperature sensitive film.

It is preferable that the method further comprises the steps of forming one of the pair of electrode films on the first electric-insulating film before forming the first temperature sensitive film, forming the first temperature sensitive film on one part of a surface of the one of the pair of electrode films, with another part of the surface of the one of the pair of electrode films being uncovered by the first temperature sensitive film, forming the other of the pair of electrode films on the first temperature sensitive film, and forming the second electric-insulating film on one part of a surface of the other of the pair of electrode films with another part of the surface of the other of the pair of electrode films uncovered by the second electric-insulating film.

It is preferable that the method further comprises the steps of placing a metallic cover on the second electric-insulating film after forming the second electric-insulating film, and connecting the metallic cover with the metallic support of flat board shape by welding.

The second temperature sensor element of the invention comprises a metallic tube support, a temperature sensitive film on any one surface of the inner wall and outer wall of the metallic tube support, and an electrode film on the temperature sensitive film.

The second temperature sensor of the invention comprises the second temperature sensor element of the invention, a lead (A) on the metallic tube support or the electrode film, an electric-insulator (A) existing on outer face of the lead (A), a metallic housing existing outside the electric-insulator and having a lead, an electric-insulator (B) existing at the other end of the metallic housing where the temperature sensor is not provided, a metallic flange existing in contact with the electric-insulator (B), and an electric-insulator (C) existing on outer face of the leads (A) and (B) and to electrically insulate the metallic flange, leads (A) and (B) and metallic housing from each other.

It is preferable in the above temperature sensor elements and temperature sensors that the temperature sensitive film shows at least one property selected from the group consisting of linear type, nonlinear type, negative type and positive type with respect to temperature.

It is preferable in the second temperature sensor element and second temperature sensor that the electrode film comprises at least one selected from the group consisting of a heat-resistant alloy, a precious metal and a precious metallic alloy.

The second method for producing a temperature sensor element of the invention comprises the steps of forming a temperature sensitive film on any one surface of the inner wall and outer wall of a metallic tube support, forming an electrode film on the temperature sensitive film, and polishing both ends of the metallic tube support.

Further, the metallic tube support can be sufficiently long, and the method can further comprises the steps of forming a temperature sensitive film on any one surface of the inner wall and outer wall of the metallic tube support, forming an electrode film on the temperature sensitive film to form a sufficiently long sensor element, and cutting the element into pieces.

The third method for producing a temperature sensor element of the invention comprises the steps of forming a first electric-insulating film on a surface of a substrate, forming a film of oxide including Al, Cr and Fe as main components on the first electric-insulating film by a vacuum gas phase film formation, heat treating the film to form a temperature sensitive film, forming a pair of electrode films facing each other on a surface of the temperature sensitive film, and forming a second electric-insulating film on one part of a surface of the pair of electrode films with another part of the surface of the pair of electrode films uncovered by the second electric-insulating film.

It is preferable in the above invention that the vacuum gas phase film formation is a method selected from the group consisting of the plasma CVD method, thermal CVD method, reactive deposition method, RF sputtering method, reactive sputtering method and facing targets sputtering method.

It is preferable in the above invention that the oxide has a component represented by $(Al_{1-x-y}, Cr_x, Fe_y)_2O_z$ wherein $0.05 \leq x+y \leq 0.95$, $0.05 \leq y/(x+y) \leq 0.6$ and $8/3 \leq z \leq 3$.

It is preferable in the above invention that the temperature sensitive film comprises an oxide including Al, Cr and Fe as main ingredients, and the oxide has a crystal structure of the corundum crystal or spinel crystal.

It is preferable in the above invention that the film of oxide is formed at 200 to 800° C.

It is preferable in the above invention that the film of oxide is heat treated at 900 to 1300° C.

It is preferable in the above invention that the film of oxide is heat treated in an oxidizing atmosphere.

BRIEF DESCRIPTION OF THE DRAWINGS

FIG. 16 is a sectional view of a temperature sensor element in Example 6.

FIG. 21 is a schematic illustration of a CVD apparatus to manufacture temperature sensitive films and electrode films in an example of the invention.

FIG. 22($b$) is an exploded view showing a layered structure of the temperature sensor element.

FIG. 24 is a schematic illustration of a plasma CVD apparatus in an example of the invention.

FIG. 25 shows profiles of XRD analysis result No. 1 in Example 11.

PREFERRED EMBODIMENTS OF THE INVENTION

Figure 2:
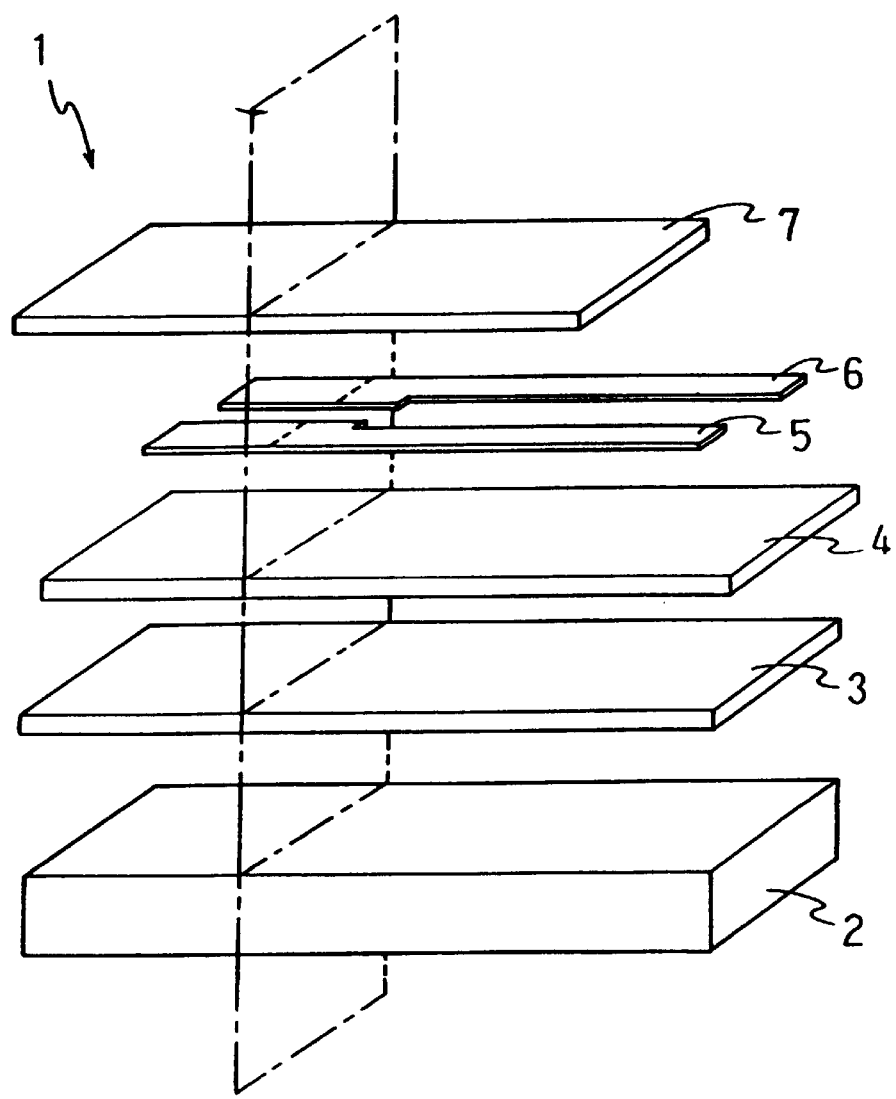
FIG. 2 is an exploded view showing a layered structure of the temperature sensor element in Example 1.
Figure 11:
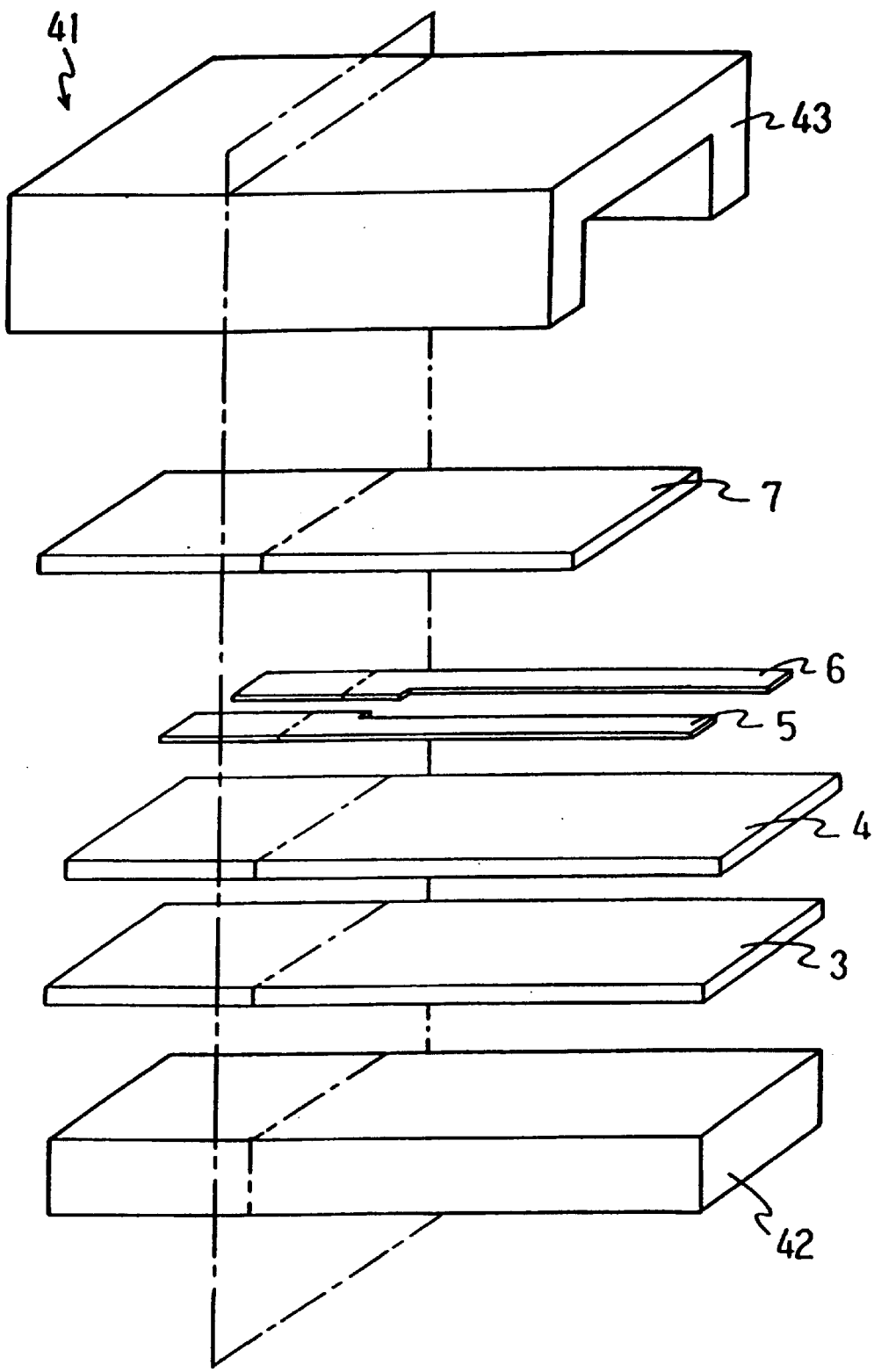
FIG. 11 is an exploded view showing a layered structure of the temperature sensor element in Example 4.

FIG. 2 shows the first temperature sensor element. Electric insulating film 3 of $Al_2O_3$ was placed on heat-resistant metallic support 2 having a shape of a flat board. Thermosensitive film 4 of a composite oxide containing aluminum, iron and chromium was placed on electric insulating film 3. Further, a pair of platinum film electrodes 5 and 6 were placed in contact with temperature sensitive film 4. Upper electric insulating film 7 of $Al_2O_3$ was placed on electrodes 5 and 6, and upper electric insulating film 7 was to protect the electrodes. FIG. 11 shows another temperature sensor element. Electric insulating film 3, temperature sensitive film 4, electrodes 5 and 6, and upper electric insulating film 7 were similarly placed on a thin heat-resistant metallic support 42 having a shape of a flat board. Further, metallic cover 43 was placed from above. The presence of metallic cover 43 prevents the films such as electric insulating film 7 from being damaged due to contact with contaminants.

Figure 5:
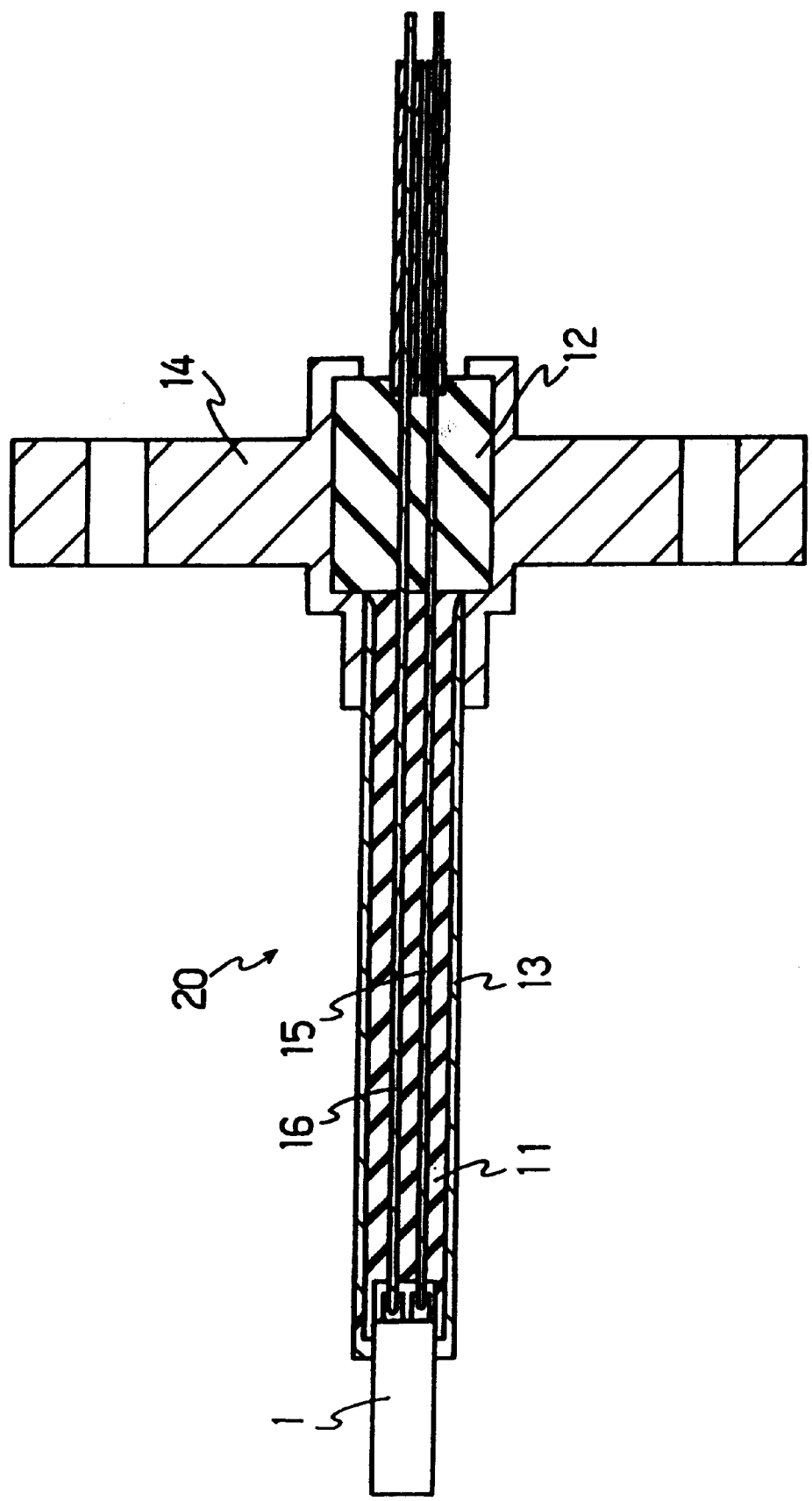
FIG. 5 is a sectional view of a temperature sensor in Example 1.

FIG. 5 shows the first temperature sensor of the invention. Any of the above temperature sensors is connectedly fixed on metallic housing 13. Metallic flange 14 is connected with metallic housing 13. Metallic flange 14 is to fix the temperature sensor on substances whose temperature is to be measured. Leads (A) 15 and (B) 16 to take signals are each connected with any of the pair of electrodes. Electric insulator 11 was provided on leads 15 and 16, and metallic housing 13 and metallic flange 14 were electrically insulated from each other by electric insulator 11.

The method for producing the first temperature sensor element comprises the formation of electric insulating film 3 of $Al_2O_3$ film on heat-resistant metallic support having a shape of a flat board by plasma metal organic chemical vapor deposition (MOCVD). The deposition uses a vapor mixture of organic metal compounds formed of aluminum, iron and chromium, respectively as material gasses, and oxygen gas as a reactive gas. The formation of electric insulating film 3 is followed by the formation of temperature sensitive film 4 from a composite oxide of aluminum, iron and chromium in the plasma MOCVD method. A pair of electrode films 5 and 6 are formed by RF sputtering using platinum-containing precious metal as a target. Further, upper electric-insulating film 7 of $Al_2O_3$ film is formed on the electrode films in the above plasma MOCVD method to complete a temperature sensor element. Alternatively, the method can further comprise the steps of covering the element thus formed with metallic cover 43 and connecting metallic cover 43 with metallic support by welding after forming upper electric-insulating film 7.

The above inventions have the following merits:

(1) Thermosensitive films are provided on a support of metallic plate. Electrode films are provided on the temperature sensitive film. Consequently, the heat capacity of the resulting temperature sensor elements becomes small, improving heat conduction. The resulting temperature sensor elements become excellent temperature sensor elements superior in heat-resistance, thermal shock resistance, heat-response and reliability, where the resistance hardly changes over time. Thermosensors having such an excellent temperature sensor element are also available.

(2) Since the temperature sensor does not have a heat-resistant cap, the heat capacity and heat conduction resistance of the temperature sensor become small. The resulting temperature sensor becomes an excellent temperature sensor superior in heat-response.

(3) Since the temperature sensitive film is film-like, the manufactured temperature sensitive film is lighter than a conventional temperature sensitive body formed of ceramic sintered body.

The second temperature sensor element, second temperature sensor and second method for producing temperature sensor elements similarly renders the heat capacity of the resulting temperature sensor element small, improving the heat conduction. The inventions realize excellent temperature sensor elements superior in heat-resistance, heat shock resistance, heat-response and reliability, where the resistance hardly changes over time, and further temperature sensors having such a temperature sensor element. Since the temperature sensitive film is film-like, the manufactured temperature sensitive film is lighter than a conventional temperature sensitive body formed of ceramic sintered body.

According to the third method of the invention, thin films are formed from temperature sensitive bodies in a variety of the vacuum gas phase film formation, and then the thin films are crystallized by heat treatment. Consequently, thin films can be formed at a relatively low temperature. Further, the method sinters the structure of thin films in heat treatment. The method has an advantage to solve a problem of the difference in resistances between the thickness direction of the thin films and the transverse direction of substrates due to the presence of grain boundary. Furthermore, the method renders the heat capacity of the temperature sensor elements small, improving the heat response of the temperature sensor elements. Since the method forms thin films on heat-resistant substrates, the method provides temperature sensitive bodies superior in heat-resistance, heat shock-proof, heat-response and reliability, where the resistance hardly changes over time. The above inventions can solve a heat response problem caused by conventional temperature sensors with temperature sensitive bodies having a sintered body installed in car catalyst convertors.

The inventions will be explained with reference to examples.

EXAMPLE 1

Figure 1:
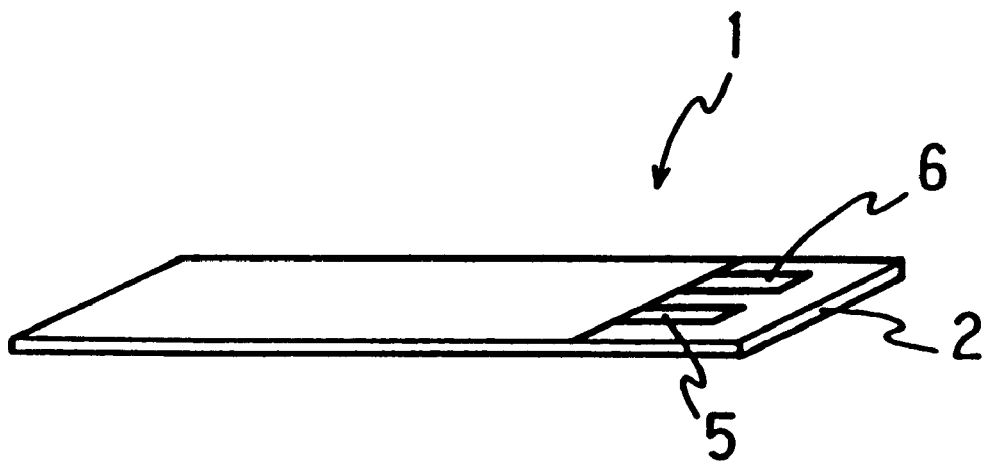
FIG. 1 is a perspective view of a temperature sensor element in Example 1.
Figure 3:
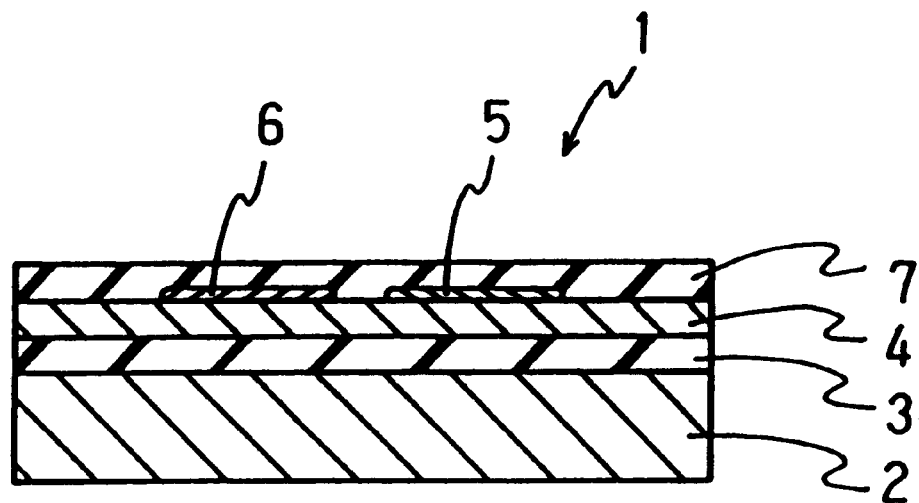
FIG. 3 is a sectional view of a temperature sensor element in Example 1.
Figure 4:
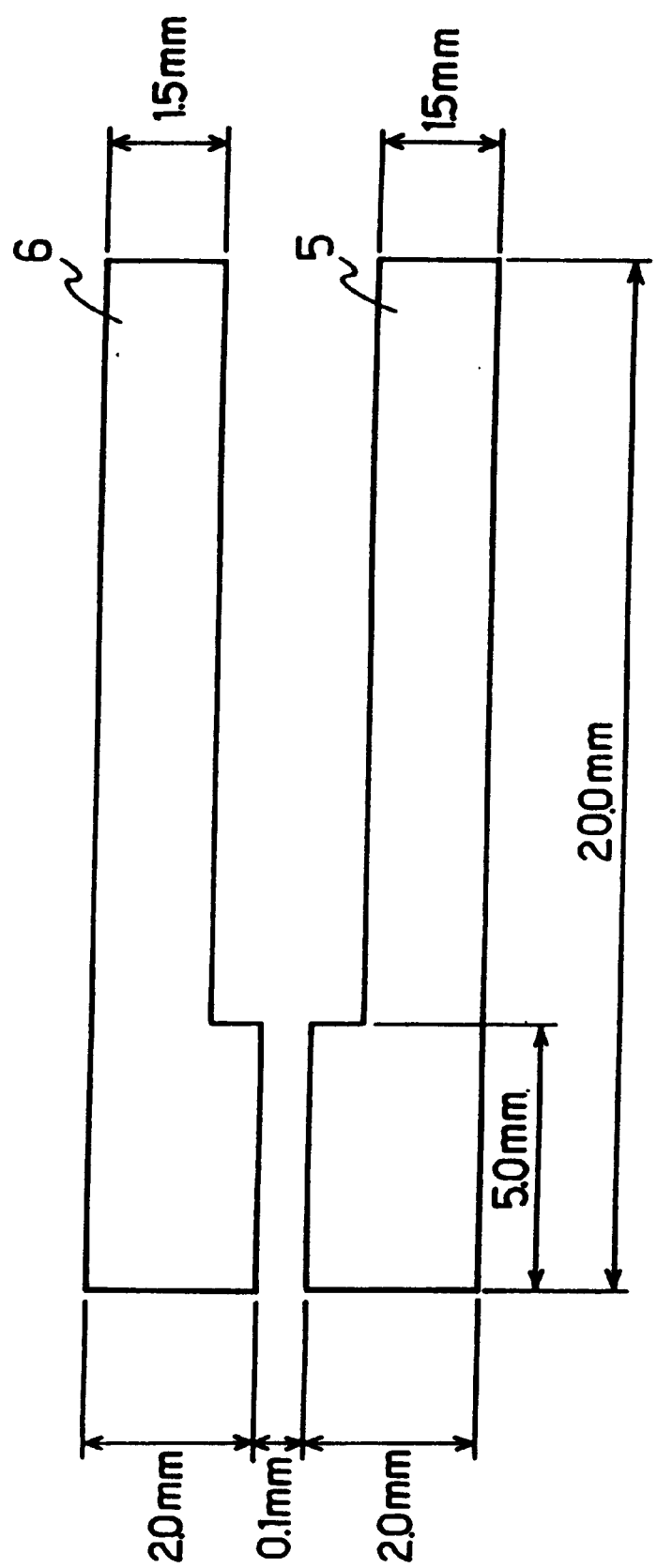
FIG. 4 is a top view of an electrode in a temperature sensor element in Example 1.

Example 1 is an example of the first temperature sensor element and the temperature sensor using the element. FIG. 1 is a perspective view of temperature sensor element 1. FIG. 2 is an exploded view showing a layered structure of temperature sensor element 1. FIG. 3 is a sectional view of temperature sensor element 1 after the films were laminated, taken along a broken line of FIG. 2. FIG. 4 is a top view of electrodes. Referring to FIG. 2, metallic support 2 having a shape of flat board is 5 mm wide, 25 mm long and 0.8 mm thick. Metallic support 2 is formed of a heat-resistant alloy comprising iron, chromium and aluminum. Electric-insulating film 3 is placed on the whole of metallic support 2. Electric-insulating film 3 of 1.0 $\mu$m thickness is formed of $Al_2O_3$. Thermosensitive film 4 of 2.0 $\mu$m thickness is placed on electric-insulating film 3. Thermosensitive film 4 is formed of a composite oxide comprising aluminum, chromium and iron and having corundum crystal structure.

Electrodes (A) 5 and (B) 6 of platinum film are placed on temperature sensitive film thus formed. The platinum film contains 3 atom % of yttrium. FIG. 4 shows the shape of electrodes 5 and 6. One end of electrodes 5 and 6 is 2.0 mm wide and 5.0 mm long, and the other of electrodes 5 and 6 is 1.5 mm wide and 15.0 mm long. The whole length of electrodes 5 and 6 is 20.0 mm, and the thickness of electrodes 5 and 6 is 0.8 $\mu$m. Electrodes 5 and 6 are positioned to face each other at an electrode interval of 0.1 mm. Electric insulating film 7 of $Al_2O_3$ film is placed on the above electrodes. Electric insulating film 7 is 5.0 mm wide, 22.0 mm long and 2.0 $\mu$m thick. Upper electric insulating film 7 having good insulation is to protect the electrodes. Upper electric insulating film 7 is positioned to cover the electrodes except a part of 3.0 mm long from the 1.5 mm wide end of electrodes (A) 5 and (B) 6.

Thermosensor element 1 shown in FIG. 1 was formed as follows. Electric-insulating film 3 of 1.0 $\mu$m thick $Al_2O_3$ film was formed on metallic support 2 by the plasma MOCVD method. Metallic support 2 comprises 18 atom % of chromium, 3 atom % of aluminum and the remainder of iron. In this case, aluminum acetyl acetonate was heated, and vapor of evaporated aluminum acetyl acetonate was used for a material gas. The carrier gas was nitrogen, and the reactive gas was oxygen. Plasma and thermal CVD reaction were generated by high frequency application at 13.56 MHz, a substrate temperature of 1000° C. and a vacuum of 1.0 Pa. Subsequently, temperature sensitive film 4 of 2.0 $\mu$m thick film was formed of an oxide material having corundum crystal structure on oxide electric insulating film 3 in the plasma MOCVD method. The oxide material having corundum crystal structure was formed of a composite oxide comprising aluminum, chromium and iron in a ratio of 0.71:0.14:0.15. In this case, the material gas was a gas mixture of aluminum acetyl acetonate vapor, chromium acetyl acetonate vapor and iron acetyl acetonate vapor. The carrier gas for each was nitrogen, and the reactive gas was oxygen. Subsequently, 0.5 $\mu$m thick electrodes (A) 5 and (B) 6 were formed of platinum-containing precious metal by the RF magnetron sputtering method using a target of platinum provided with yttrium and a sputtering gas of argon gas at a substrate temperature of 400° C. and a vacuum of 1.0 Pa. A mask having the same shape as the electrodes shown in FIG. 4 was used for sputtering. Subsequently, upper electric insulating film 7 of 1.0 $\mu$m thick $Al_2O_3$ film was formed on surfaces where the formation of film 7 was needed, similarly in the plasma MOCVD method using a mask. Thermosensor element 1 shown in FIG. 1 was thus completed.

FIG. 5 is a sectional view of temperature sensor 20 in Example 1. Platinum leads (A) 15 and (B) 16 are connected with electrodes (A) 5 and (B) 6, respectively. The leads penetrate electric insulators (A) 11 and (B) 12 having two fine tubes to allow the leads to pass through. The leads are thus accommodated inside of housing 13 and flange 14 connected with metallic housing 13, putting electric insulators (A) 11 and (B) 12 therebetween. Metallic housing 13, formed of a heat-resistant metal tube, is connected with temperature sensor element 1 to support temperature sensor element 1. Consequently, leads (A) 15 and (B) 16 are electrically insulated by electric insulators (A) 11 and (B) 12 from metallic housing 13 and metallic flange 14.

The heat response in temperature sensor 20 was measured as follows. Leads (A) 5 and (B) 6 were connected with a sensor temperature detection circuit. The output terminal of the circuit was connected with a recorder. Thermosensor 20 exhibiting room temperature was quickly placed in a thermostat kept at 350, 500 or 800° C. The measurement was performed by measuring the time of period in which the temperature exhibited by temperature sensor 20 appropriately rose from room temperature to 350, 500 or 800° C., and then stabilized at the constant. The measurement was conducted 5 times. The average value of the repetition was considered one result.

Thermosensor 20 exhibiting room temperature took 4.0 seconds to exhibit 350° C., 4.9 seconds to exhibit 500° C., and 7.6 seconds to exhibit 800° C. Thermosensor 20 was thus found to show an excellent heat response rate.

EXAMPLE 2

Figure 6:
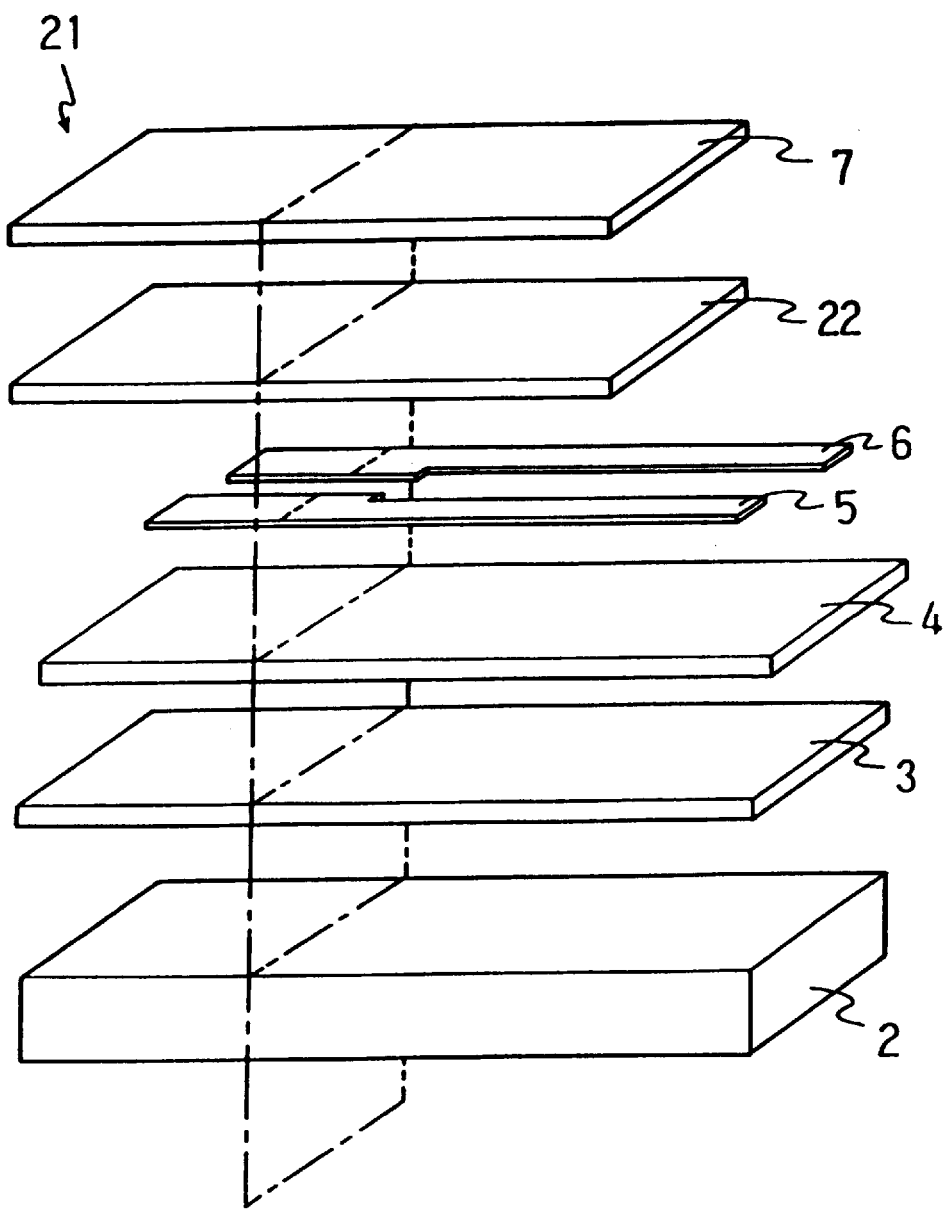
FIG. 6 is an exploded view showing a layered structure of a temperature sensor element in Example 2.
Figure 7:
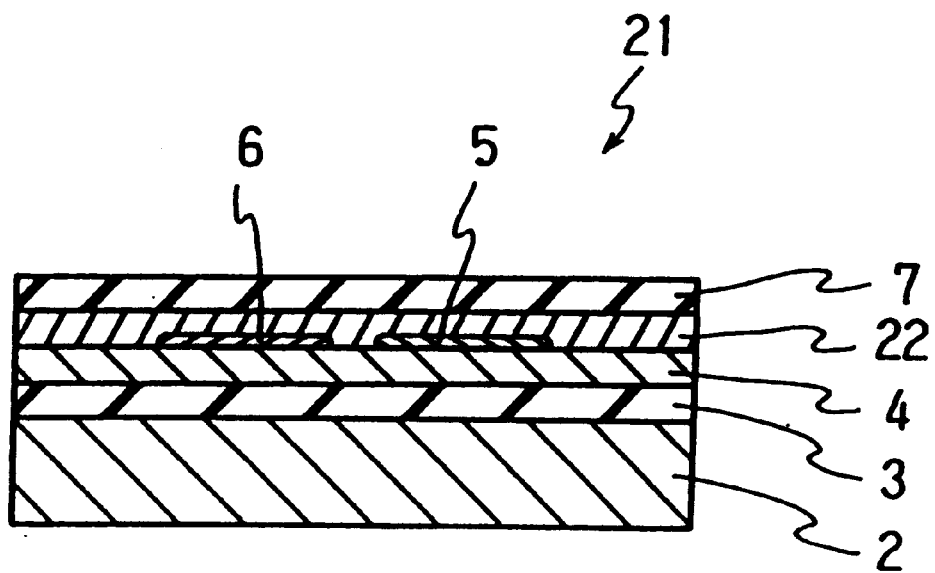
FIG. 7 is a sectional view of a temperature sensor element in Example 2.

FIG. 6 is an exploded view showing a layered structure of temperature sensor element 21 in Example 2. FIG. 7 is a sectional view of temperature sensor element 21 after the films were laminated, taken along a broken line of FIG. 6. Referring to FIG. 6, oxide electric-insulating film 3 is placed on the whole of the same metallic support 2 having a shape of a flat board as used in Example 1. Metallic support 2 is 5 mm wide, 25 mm long and 0.8 mm thick. Metallic support 2 is formed of the same heat-resistant alloy comprising iron, chromium and aluminum as was used in Example 1. Electric-insulating film 3 of 1.0 μm thickness is formed of $Al_2O_3$. Thermosensitive film 4 of 2.0 μm thickness is placed on oxide electric-insulating film 3. Thermosensitive film 4 is formed of a composite oxide comprising aluminum, chromium and iron and having corundum crystal structure. The same electrodes (A) 5 and (B) 6 of platinum film as was used in Example 1 are placed on temperature sensitive film 4 thus formed. The thickness of electrodes 5 and 6 is 0.8 μm. Electrodes 5 and 6 are positioned to face each other at an electrode interval of 0.1 mm. Thermosensitive film 22 of 5.0 mm wide, 22.0 mm long and 2.0 μm thick is placed on the above electrodes so that temperature sensitive film 22 covers the electrodes except a part of 3.0 mm long from the 1.5 mm wide end of electrodes (A) 5 and (B) 6. Thermosensitive film 22 is the same in crystal structure and composition as temperature sensitive film 4. Upper electric insulating film 7 of 2.0 μm thick is placed on temperature sensitive film 22. The size of upper electric insulating film 7 is the same as that of temperature sensitive film 22. Upper electric insulating film 7 of $Al_2O_3$ film exhibits good insulation.

Thermosensor element 21 was manufactured by forming the films using the plasma MOCVD method and RF magnetron sputtering in the same manner as in Example 1. Upper temperature sensitive film 22 was formed under the same condition in which temperature sensitive film 4 in Example 1 was formed. The used mask was the same as used in forming upper electric insulating film of $Al_2O_3$ in Example 1. Thermosensor element 21 having a section shown in FIG. 7 was thus formed.

The temperature sensor of Example 2 was formed in the same manner as in Example 1. Platinum lead (A) 15 was connected with electrode (A) 5, and platinum lead (B) 16 was connected with electrode (B) 6.

The heat response in the temperature sensor was measured in the same manner as in Example 1. The temperature sensor exhibiting room temperature took 4.1 seconds to exhibit 350° C., 4.8 seconds to exhibit 500° C., and 7.6 seconds to exhibit 800° C. The temperature sensor was thus found to show an excellent heat response rate.

EXAMPLE 3

Figure 8:
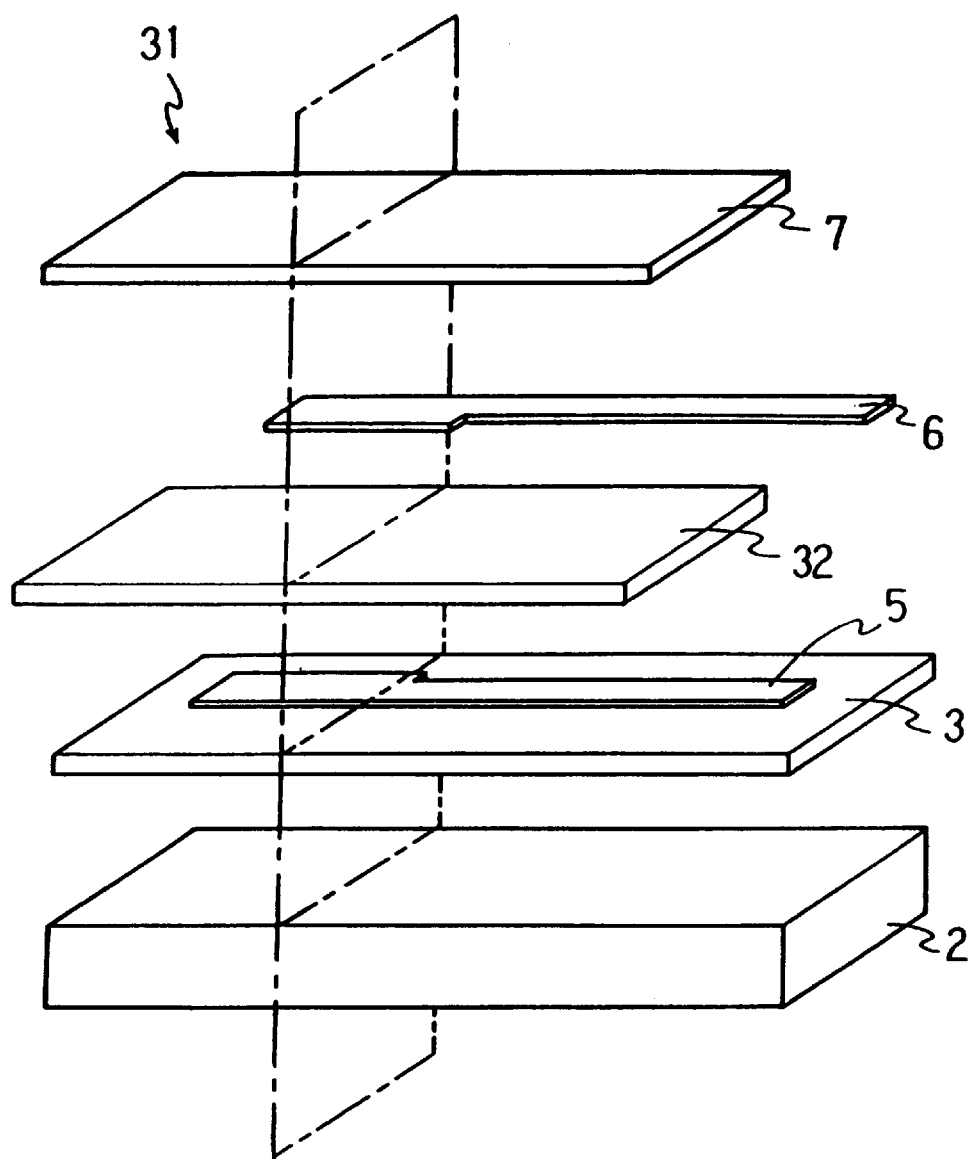
FIG. 8 is an exploded view showing a layered structure of the temperature sensor element in Example 3.
Figure 9:
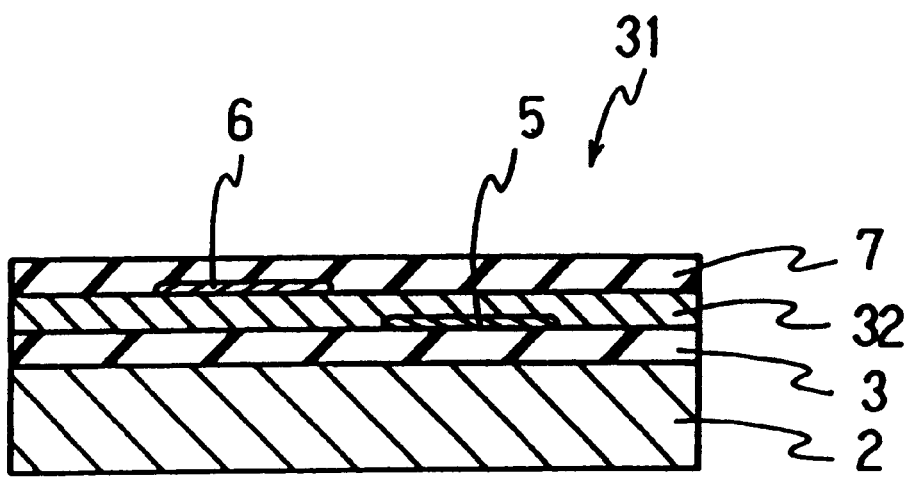
FIG. 9 is a sectional view of a temperature sensor element in Example 3.

FIG. 8 is an exploded view showing a layered structure of temperature sensor element 31 in Example 3. FIG. 9 is a sectional view of temperature sensor element 31 after the films were laminated, taken along a broken line of FIG. 8. Referring to FIG. 8, oxide electric-insulating film 3 is placed on the whole of the same metallic support 2 having a shape of a flat board as used in Example 1. Metallic support 2 is 5 mm wide, 25 mm long and 0.8 mm thick. Metallic support 2 is formed of the same heat-resistant alloy comprising iron, chromium and aluminum as was used in Example 1. Electric-insulating film 3 of 1.0 μm thickness is formed of $Al2O_3$. Electrode (A) 5 of platinum film 0.8 μm thick is placed on electric-insulating film 3. The size of electrode (A) 5 is shown in FIG. 4. Thermosensitive film 32 of 2.0 μm thickness is placed on electrode (A) 5. Thermosensitive film 32 is formed of a composite oxide comprising aluminum, chromium and iron and having the corundum crystal structure. Electrode (B) 6 of platinum film 0.8 μm thick is placed on temperature sensitive film 32. Electrodes (A) 5 and (B) 6 are positioned to projectively face each other, putting temperature sensitive film 32 therebetween at an electrode interval of 0.1 mm. Upper electric insulating film 7 of 1.0 μm thickness is placed to cover temperature sensitive film 32 and electrode 6. The size of upper electric insulating film 7 was the same as in Example 1. Upper electric insulating film 7 of $Al_2O_3$ film exhibits good insulation.

Thermosensor element 31 was manufactured by forming the films using the plasma MOCVD method and RF magnetron sputtering in the same manner as in Example 1. Electrodes (A) 5 and (B) 6, different from those in Example 1, were individually formed in the same condition as electrodes (A) and (B) were formed in Example 1, while the two masks to form the electrode shown in FIG. 4 were concealed one by one. Thermosensor element 31 having a section shown in FIG. 9 was thus completed.

The temperature sensor of Example 3 was formed in the same manner as in Example 1. Platinum lead (A) 15 was connected with electrode (A) 5, and platinum lead (B) 16 was connected with electrode (B) 6.

The heat response in the temperature sensor was measured in the same manner as in Example 1. The temperature sensor exhibiting room temperature took 4.0 seconds to exhibit 350° C., 4.7 seconds to exhibit 500° C., and 7.5 seconds to exhibit 800° C. The temperature sensor was thus found to show an excellent heat response rate.

EXAMPLE 4

Figure 10:
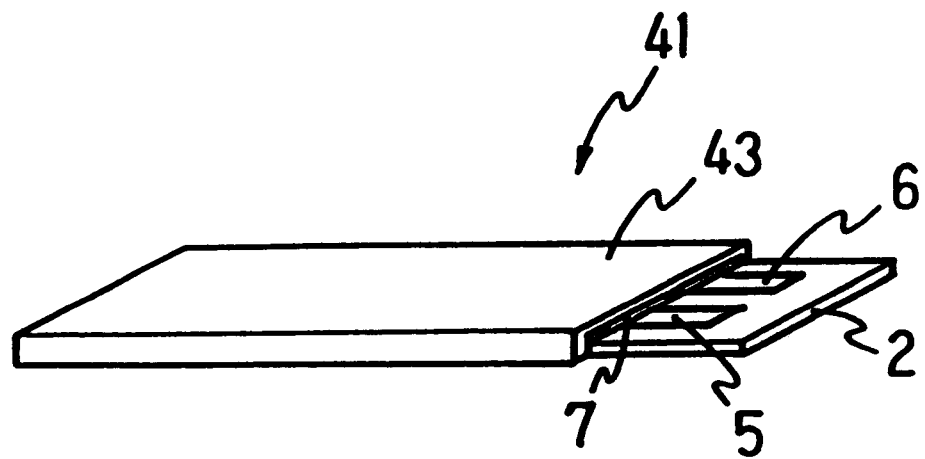
FIG. 10 is a perspective view of a temperature sensor element in Example 4.
Figure 12:
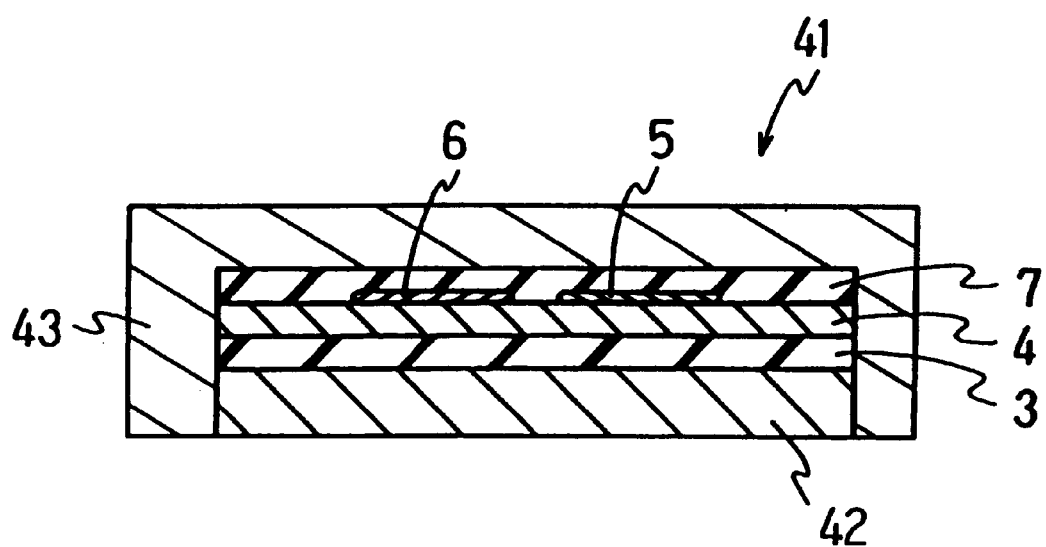
FIG. 12 is a sectional view of a temperature sensor element in Example 4.

FIG. 10 is a perspective view of temperature sensor element 41 in Example 4. FIG. 11 is an exploded view showing a layered structure of temperature sensor element 41 in Example 4. FIG. 12 is a sectional view of temperature sensor element 41 after the films were laminated, taken along a broken line of FIG. 11. Referring to FIG. 11, oxide electric-insulating film 3, temperature sensitive film 4, electrodes (A) 5 and (B) 6, and upper electric insulating film 7 are sequentially placed on the whole of the same metallic support 42 having a shape of a flat board as was used in Example 1. Metallic support 42 is formed of the same heat-resistant alloy comprising iron, chromium and aluminum as was used in Example 1. Metallic support 42 is 5 mm wide, 25 mm long and 0.3 mm thick. Electric-insulating film 3 of 1.0 μm thickness is formed of $Al_2O_3$. Thermosensitive film 4 of 2.0 μm thickness is formed of a composite oxide comprising aluminum, chromium and iron and having corundum crystal structure. Electrodes (A) 5 and (B) 6 are positioned to face each other at an electrode interval of 0.1 mm. Electrodes 5 and 6 are formed of palladium-platinum alloy film containing 85 atom % of palladium. Upper electric insulating film 7 of 2.0 μm thickness is formed of $Al_2O_3$ exhibiting good insulation. The portions of electrodes 5 and 6 for connection to the leads are exposed. Metallic cover 43 of heat resistant stainless steel is connected with metallic support 42 so that one end face of metallic cover 43 makes one plane together with one end face of metallic support 42. An example of the metallic cover has a U-shaped section, a thickness of 0.4 mm, an outside top face being 5.8 mm long and 21.0 mm wide and an inside face being 5.0 mm long and 21.0 mm wide.

Thermosensor element 41 was manufactured by forming the films in the plasma MOCVD method and RF magnetron sputtering in the same manner as in Example 1. At the last step, the U-shaped metallic cover 43 was placed on support 42 provided with all films formed, and metallic cover 43 and support 42 were connected by welding to complete temperature sensor 41 having a section shown in FIG. 12.

The temperature sensor of Example 4 was formed in the same manner as in Example 1. Platinum lead (A) 15 was connected with electrode (A) 5 of temperature sensor 41 shown in FIG. 10. Platinum lead (B) 16 was connected with electrode (B) 6.

The heat response in the temperature sensor was measured in the same manner as in Example 1. The temperature sensor exhibiting room temperature took 3.9 seconds to exhibit 350° C., 4.8 seconds to exhibit 500° C., and 7.5 seconds to exhibit 800° C. The temperature sensor was thus found to show an excellent heat response rate.

EXAMPLE 5

Figure 13:
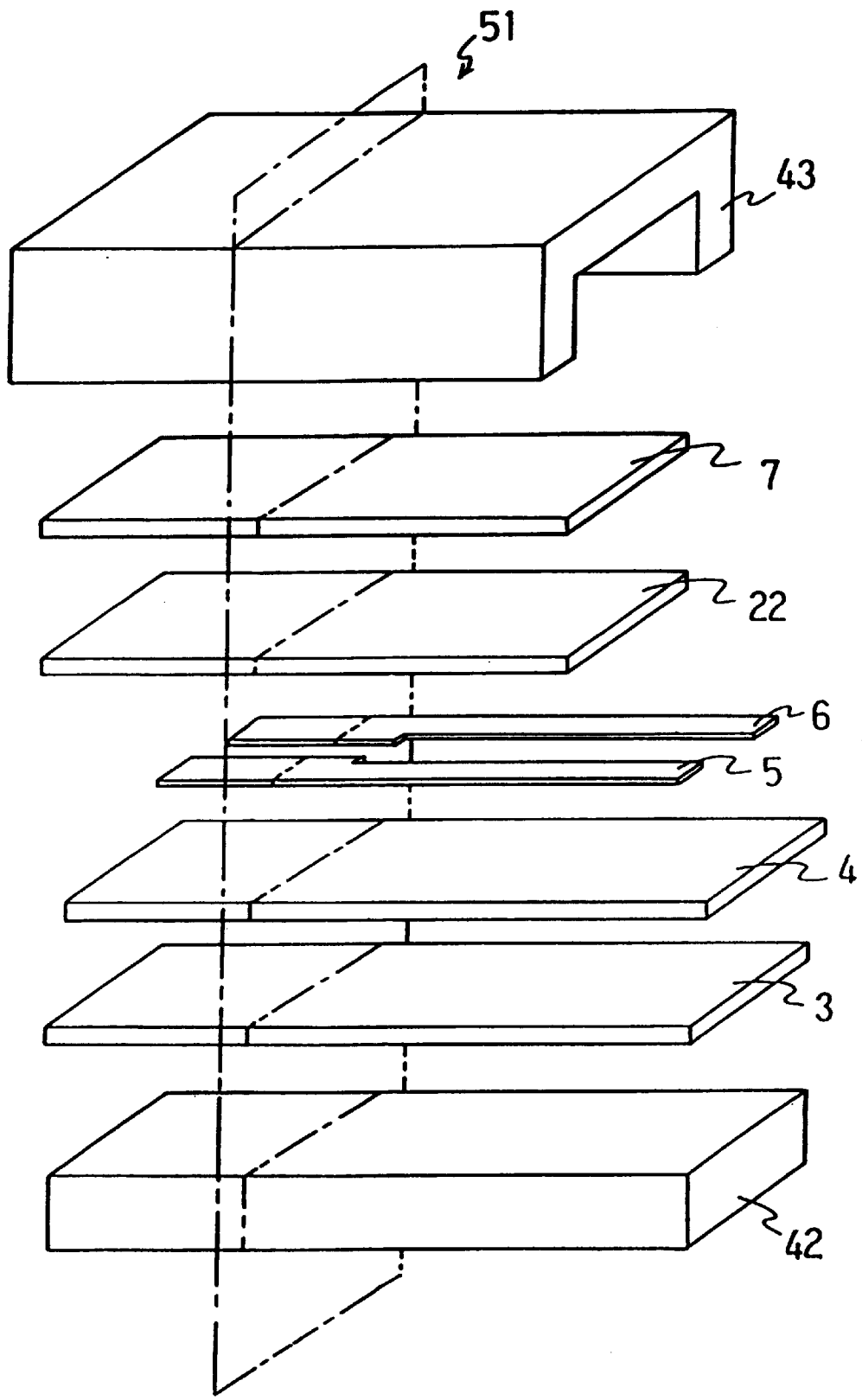
FIG. 13 is an exploded view showing a layered structure of the temperature sensor element in Example 5.
Figure 14:
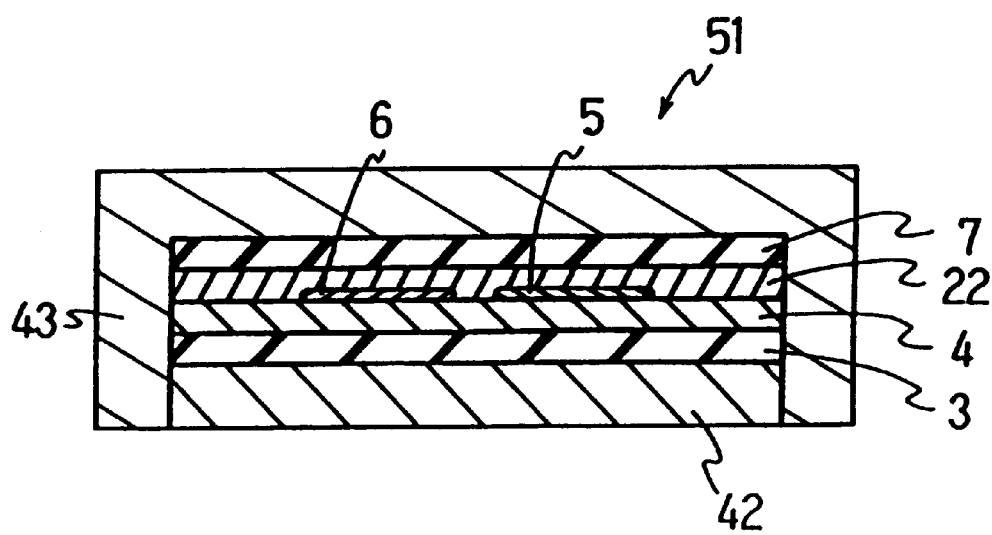
FIG. 14 is a sectional view of a temperature sensor element in Example 5.

FIG. 13 is an exploded view showing a layered structure of temperature sensor element 51 in Example 5. FIG. 14 is a sectional view of temperature sensor element 51 after the films were laminated, taken along a broken line of FIG. 13. Referring to FIG. 13, oxide electric-insulating film 3, temperature sensitive film 4, electrodes (A) 5 and (B) 6, upper temperature sensitive film 22 and upper electric insulating film 7 are sequentially placed on the whole of the same metallic support 42 having a shape of a flat board as used in Example 4. Each film is formed in the same manner as in Example 2. Metallic support 42 is formed of the same heat-resistant alloy comprising iron, chromium and aluminum as was used in Example 4. Electric-insulating film 3 of 1.0 μm thickness is formed of $Al_2O_3$. Thermosensitive film 4 of 2.0 μm thickness is formed of a composite oxide comprising aluminum, chromium and iron and having a corundum crystal structure. Electrodes (A) 5 and (B) 6 are positioned to face each other at an electrode interval of 0.1 mm. Upper temperature sensitive film 22 of 2.0 μm thickness is the same in crystal structure and composition as temperature sensitive film 4. Upper electric insulating film 7 of 1.0 μm thickness is formed of $Al_2O_3$ exhibiting good insulation. The portions of electrodes 5 and 6 for connection to the leads are exposed in the same manner as in Example 4. Metallic cover 43 having the same size as in Example 4 is connected with support 42 so that metallic cover 43 and support 42 accommodate the laminated films therein.

Thermosensor element 51 was manufactured by forming the films using the plasma MOCVD method and RF magnetron sputtering in the same manner as in Example 2. At the last step, the U-shaped metallic cover 43 was placed on support 42 provided with all films formed in the same manner as in Example 4, and metallic cover 43 and support 42 were connected by welding to complete temperature sensor 51 having a section shown in FIG. 14.

The temperature sensor of Example 5 was formed in the same manner as in Example 1. Platinum lead (A) 15 was connected with electrode (A) 5 of temperature sensor 51. Platinum lead (B) 16 was connected with electrode (B) 6.

The heat response in temperature sensor was measured in the same manner as in Example 1. The temperature sensor exhibiting room temperature took 3.9 seconds to exhibit 350° C., 4.7 seconds to exhibit 500° C., and 7.5 seconds to exhibit 800° C. The temperature sensor was thus found to show an excellent heat response rate.

EXAMPLE 6

Figure 15:
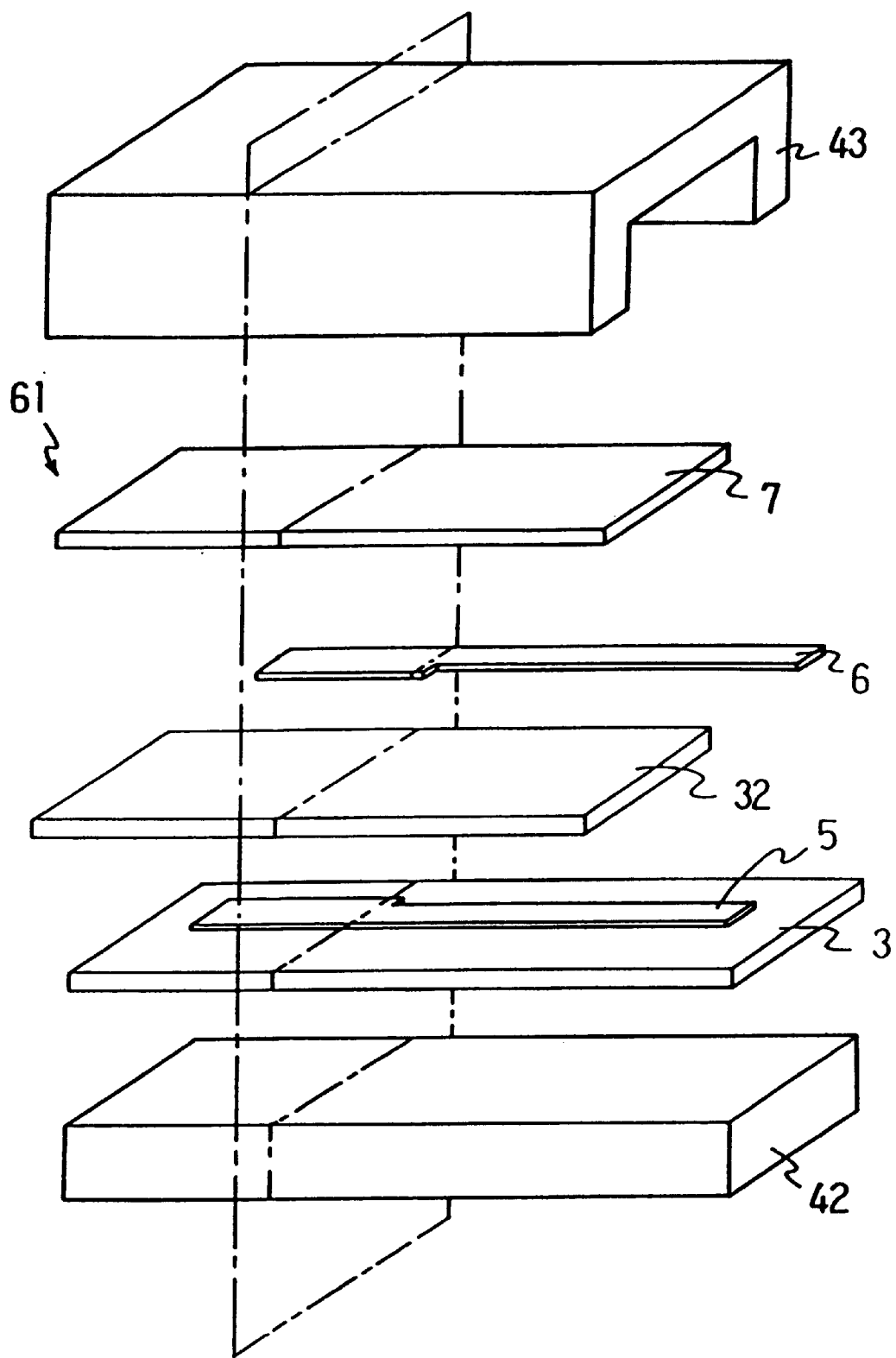
FIG. 15 is an exploded view showing a layered structure of the temperature sensor element in Example 6.
Figure 1:
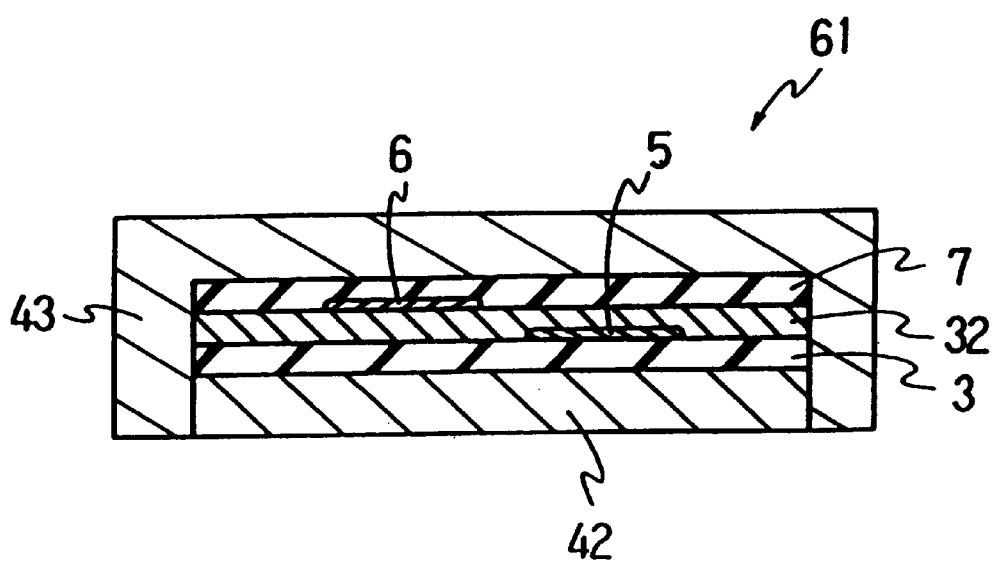

FIG. 15 is an exploded view showing a layered structure of temperature sensor element 51 in Example 6. FIG. 16 is a sectional view of temperature sensor element 61 after the films were laminated, taken along a broken line of FIG. 15. Referring to FIG. 15, oxide electric-insulating film 3, electrode (A) 5 of platinum film, temperature sensitive film 32, electrode (B) 6 of platinum film, and upper electric insulating film 7 are sequentially placed on the whole of the same metallic support 42 having a shape of a flat board as was used in Example 4. Each film is formed in the same manner as in Example 3. Metallic support 42 is formed of the same heat-resistant alloy comprising iron, chromium and aluminum as was used in Example 4. Electric-insulating film 3 of 1.0 μm thickness is formed of $Al_2O_3$. Thermosensitive film 32 of 2.0 μm thickness is formed of a composite oxide comprising aluminum, chromium and iron and having corundum crystal structure. Upper electric insulating film 7 of 2.0 μm thickness is formed of $Al_2O_3$ exhibiting good insulation. The portions of electrodes 5 and 6 for connection to the leads are exposed in the same manner as in Example 4. Metallic cover 43 having the same size as in Example 4 is connected with support 42 so that metallic cover 43 and support 42 accommodate the laminated films therein.

Thermosensor element 61 was manufactured by forming the films using the plasma MOCVD method and RF magnetron sputtering in the same manner as in Example 3. At the last step, the U-shaped metallic cover 43 was placed on support 42 provided with all films formed in the same manner as in Example 4, and metallic cover 43 and support 42 were connected by welding to complete temperature sensor 61 having a section shown in FIG. 16.

The temperature sensor of Example 6 was formed in the same manner as in Example 1. Platinum lead (A) 15 was connected with electrode (A) 5 of temperature sensor 61 shown in FIG. 15. Platinum lead (B) 16 was connected with electrode (B) 6.

The heat response in temperature sensor was measured in the same manner as in Example 1. The temperature sensor exhibiting room temperature took 3.9 seconds to exhibit 350° C., 4.7 seconds to exhibit 500° C., and 7.4 seconds to exhibit 800° C. The temperature sensor was thus found to show an excellent heat response rate.

Comparative Example 1

Figure 35:
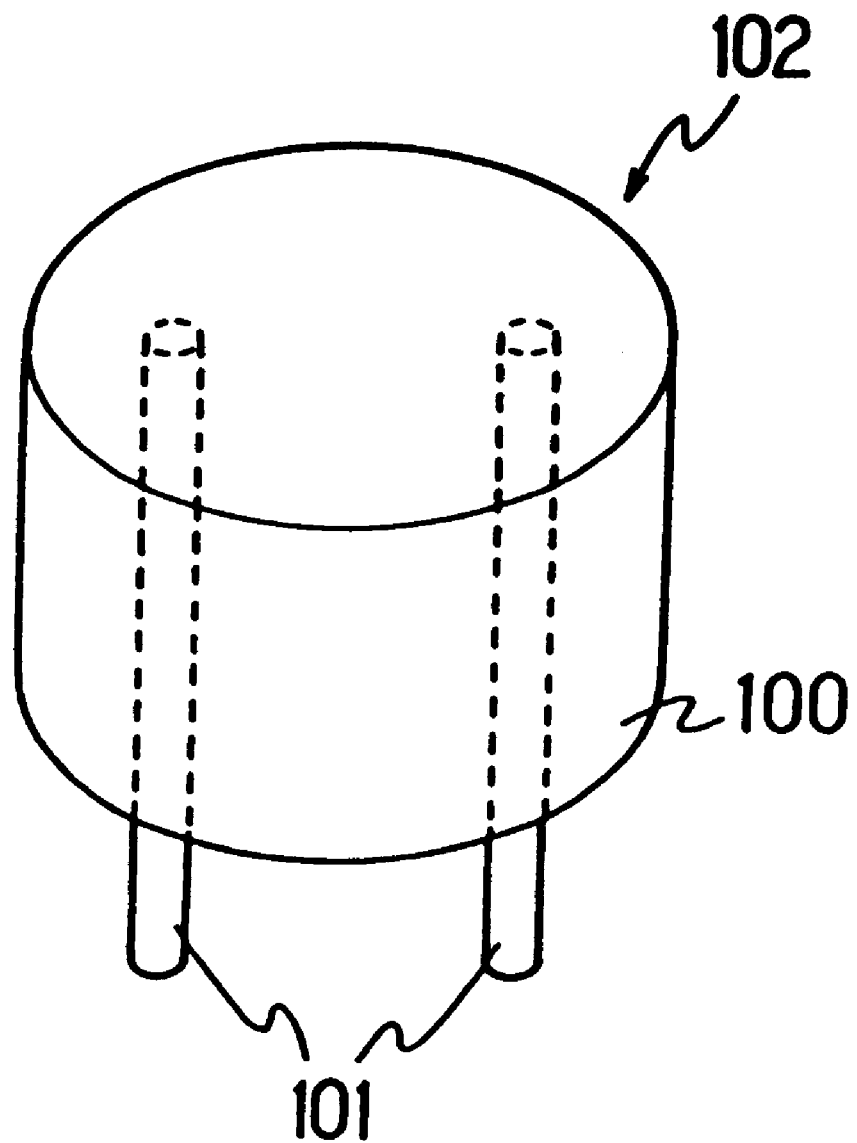
FIG. 35 is a perspective view of a temperature sensor element in a comparative example.

FIG. 35 is a perspective view of a conventional temperature sensor element as a comparative example. Thermosensor element 102 comprises sintered body 100 and two platinum pipes 101. Sintered body 100 is a disk being 3.7 mm in diameter and 2 mm in thickness. Sintered body 100 has the corundum crystal structure and the negative type response property.

Thermosensor element 102 was formed as follows. After $Al_2O_3$, $Cr_2O_3$ and $Fe_2O_3$ were weighed to given amounts, they were prefired, ground and molded to form a molded body. Two platinum pipes 101 were inserted into the molded body. The molded body was sintered at 1600° C. to form sintered body 100 containing Al, Cr and Fe in a ratio of 0.7:0.15:0.15 and having the corundum crystal structure.

Figure 36:
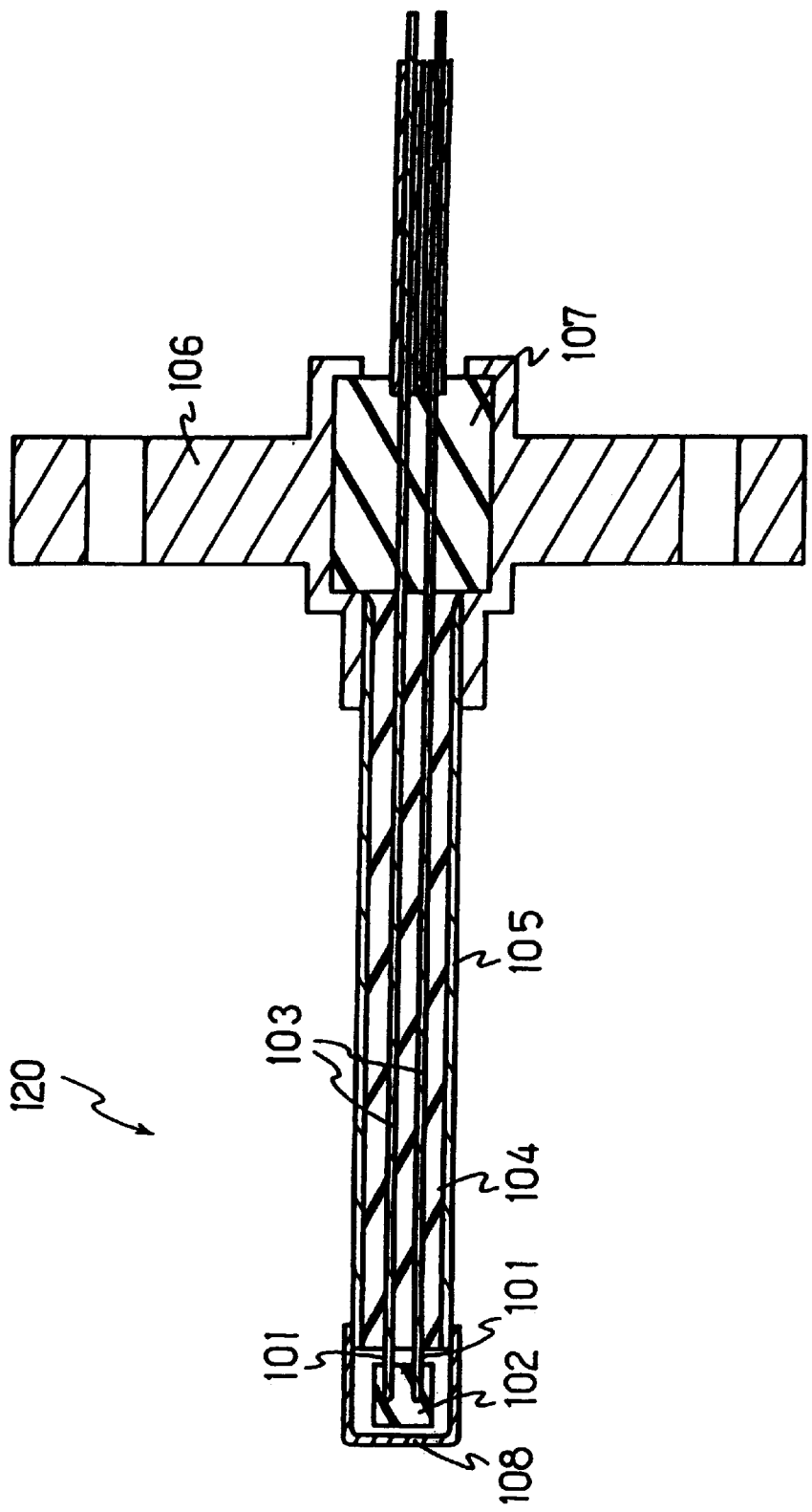
FIG. 36 is a sectional view of a temperature sensor in a comparative example.

FIG. 36 is a sectional view of temperature sensor 120 as a comparative example. Thermosensor 120 was formed as follows. Leads 103 were connected with two platinum pipes 101 of temperature sensor element 102. Electric insulator (A) 104 was inserted in metallic tubular housing 105. Leads 103 were allowed to go through electric insulator (A) 104.

Metallic flange 106 was inserted on the end of housing 105 where temperature sensor element 102 was not provided. Electric insulator (B) 107 was inserted in metallic flange 106, and leads 103 were electrically insulated from metallic flange 106 by electric insulator (B) 107. Finally, heat resistant cap 108 was fixed on metallic housing 105 by welding to complete temperature sensor 120.

The heat response in temperature sensor 120 of the comparative example was measured in the same manner as in Example 1. Thermosensor 120 exhibiting room temperature took 5.0 seconds to exhibit 350° C., 8.0 seconds to exhibit 500° C., and 12.0 seconds to exhibit 800° C. The temperature sensors of the Examples were thus found to be better in heat response at any temperature.

EXAMPLE 7

Figure 17:
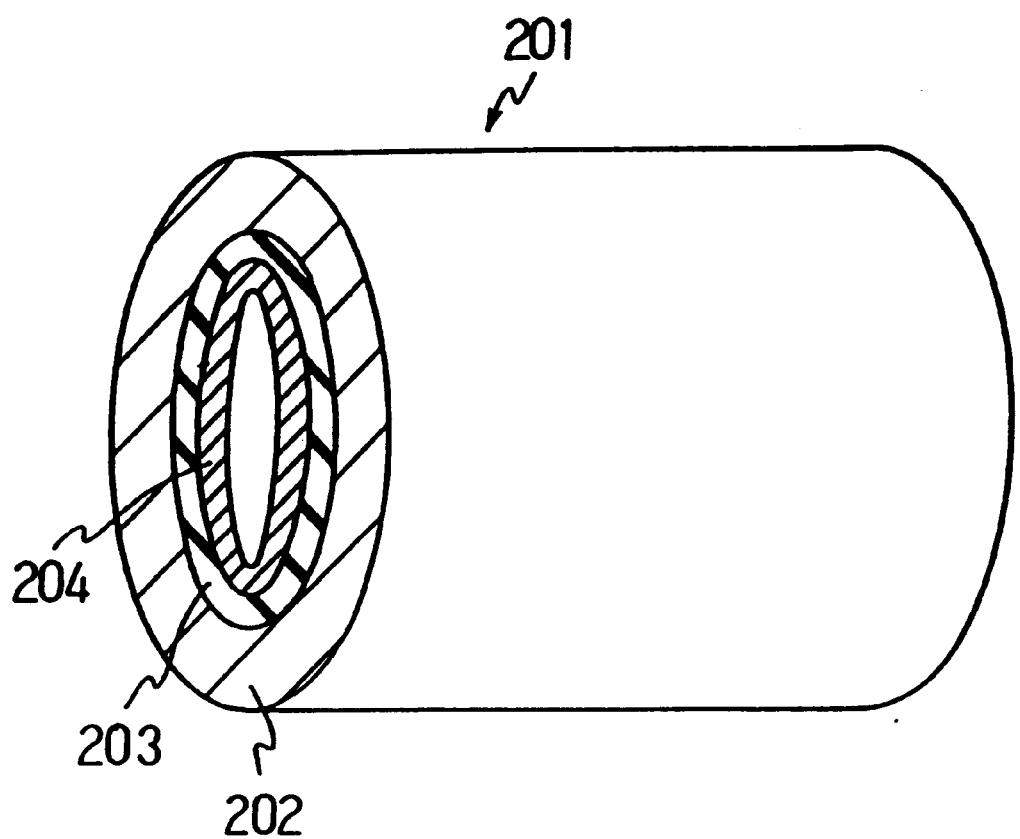
FIG. 17 is a perspective view of a temperature sensor element in Example 7.

Example 7 is an example of the second temperature sensor element and second temperature sensor of the invention. FIG. 17 is a perspective view of temperature sensor element 201 in Example 7. Metallic tubular support 202 shown in FIG. 17 is 4 mm in outside diameter, 2.6 mm in inside diameter and 5 mm in length. Metallic tubular support 202 is formed of heat-resistant stainless steel. Thermosensitive film 203 of 5 μm thickness is formed on the inside wall of the metallic tubular support. Thermosensitive film 203 is formed of oxide film containing Al, Fe and Cr in a ratio of 0.7:0.15:0.15. The oxide film has the corundum crystal structure. Thermosensitive film 203 has the negative response property. Electrode film 204 of 0.5 mm thickness is formed on the temperature sensitive film. Electrode film 204 is formed of a heat resistant metal, nickel. The temperature sensor having this temperature sensor element shown in FIG. 18 was formed as follows. Lead (A) 205 was connected with electric film 204 of temperature sensor element 201. Electric insulator (A) 206 was placed on lead (A) 205. Metallic tubular housing 208 having lead (B) 207 is placed on electric insulator (A) 206. Metallic flange 210 is connected with the end of housing 208 where temperature sensor element 201 is not provided, putting electric insulator (B) 209 therebetween. Leads (A) 205 and (B) 207, metallic tubular housing 208 and metallic flange 210 are electrically insulated from each other by electric insulator (C) 211.

The heat response in temperature sensor of this example was measured and compared with that of the same conventional temperature sensor as in Comparative Example 1. The temperature sensor exhibiting room temperature took 4 seconds to exhibit 350° C., 5 seconds to exhibit 500° C., and 8 seconds to exhibit 800° C. The length of time shows heat response. On the other hand, the heat response in the conventional temperature sensor shown in FIG. 36 was 5 seconds, 8 seconds and 12 seconds. The temperature sensor of Example 7 was thus found to be better in heat response at any temperature. The heat response in temperature sensor was measured as follows. Two leads of the temperature sensor were connected with a sensor temperature detection circuit. The output terminal of the circuit was connected with a recorder. The temperature sensor exhibiting room temperature was quickly placed in a thermostat kept at 350, 500 or 800° C. The measurement was performed by measuring the time of period in which the temperature exhibited by the temperature sensor appropriately rised from room temperature to 350, 500 or 800° C., and stabilized at the constant. The measurement was conducted 5 times. The average value of the repetition was considered one result.

The method for producing the temperature sensor element in the example will be explained below.

Figure 19:
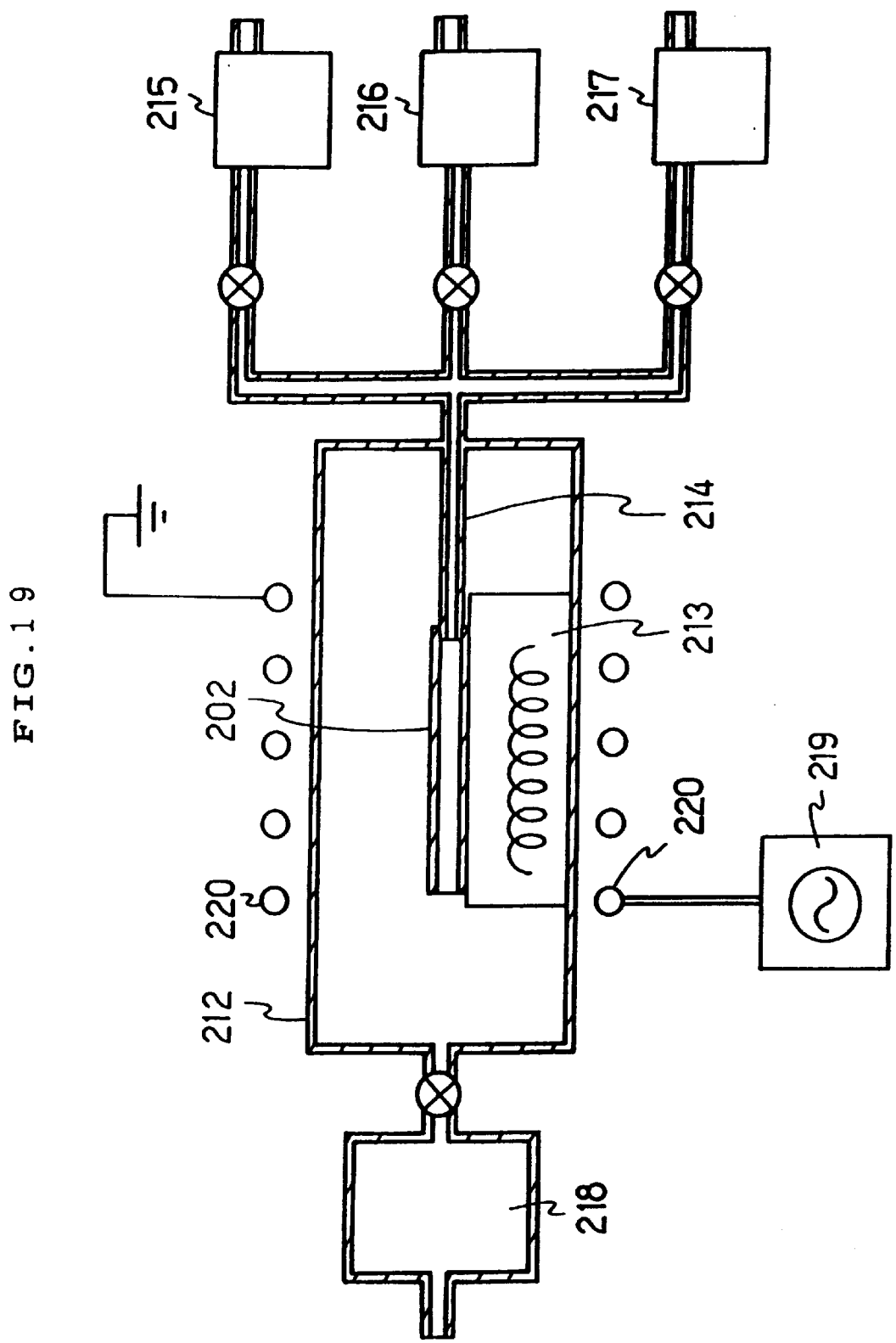
FIG. 19 is a schematic illustration of a CVD apparatus to manufacture temperature sensitive films and electrode films in an example of the invention.

FIG. 19 shows that vacuum chamber 212 of a chemical vapor deposition (CVD) apparatus accommodates tube 202 of heat resistant stainless steel. Tube 202 was 4 mm in outside diameter, 2.6 mm in inside diameter and 5 mm in length. The tube was heated to 1100° C. by heater 213.

Nozzle 214 to spout CVD gas was inserted in the tube. The outside diameter of nozzle was 2.2 mm. Vapor of aluminum acetyl acetonate was supplied to material gas supplying device 215. Vapor of iron acetyl acetonate was supplied to material gas supplying device 216. Vapor of chromium acetyl acetonate was supplied to material gas supplying device 217. A gas mixture containing the above three vapors and oxygen gas was provided for 20 minutes while vacuum chamber 212 was kept at a vacuum of 0.8 Torr by exhaustion pump 218, and plasma was generated by applying a high frequency at 13.56 MHz to high frequency coil 220 with high power source 219. This caused thermal CVD reaction on the inside wall of tube 202, forming temperature sensitive film 203 of Al-Fe-Cr-O shown in FIG. 17. The tube having the temperature sensitive film formed was placed in a plating chamber, and a plastic tubular nozzle being 2 mm in outside diameter was inserted in the tube. A plating solution was circulated in the tube. Nonelectrolytic palladium plating was first conducted, and then, electrolytic nickel plating was conducted to form nickel electrode film 204. Short circuit between electrodes was removed by polishing both ends of the metallic tubular support.

Thermosensitive film 203 weighed 0.0005% of conventional temperature sensor element 102.

Figure 18:
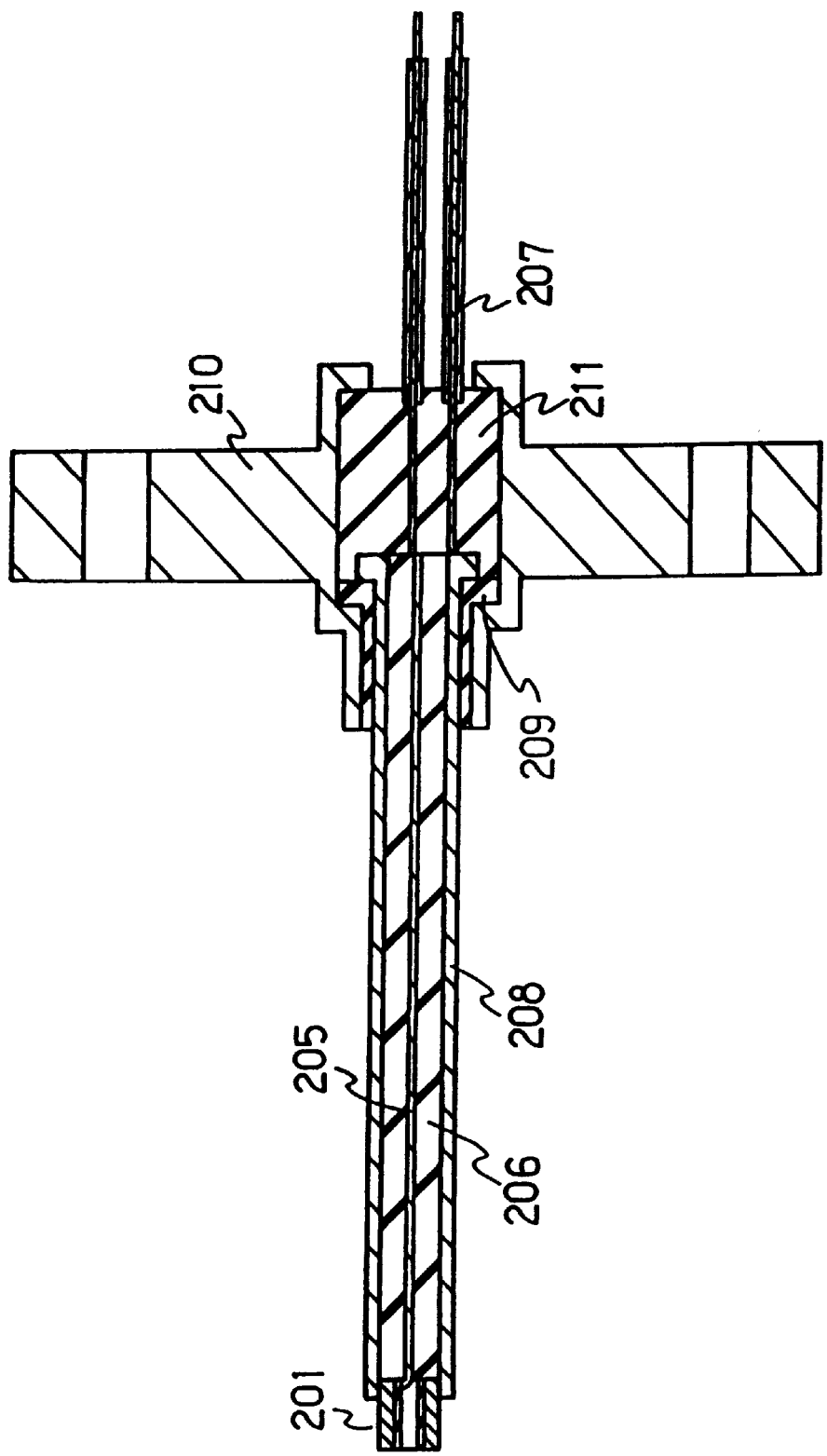
FIG. 18 is a sectional view of a temperature sensor in Example 7.

The temperature sensor shown in FIG. 18 was formed as follows. One end of lead (A) 205 was welded to electrode film 204 of temperature sensor element thus formed. One end of tubular housing 208 of stainless steel was welded to one end of stainless steel tube 202. Lead (B) 207 was welded to the other end of tubular metallic housing 208. Electric insulator 206 was inserted in housing 208. Lead (A) 205 was inserted in electric insulator 206. Electric insulator (B) 209 was inserted on the end of housing 208 where temperature sensor element 201 was not provided. Electric insulator (C) 211 was inserted in metallic flange 210 to electrically insulate leads (A) 205 and (B) 207, and tubular metallic housing 208 from each other.

Conventional temperature sensor element 102 (FIG. 35) was formed as follows. After $Al_2O_3$, $Cr_2O_3$ and $Fe_2O_3$ were weighed to given amounts, they were prefired, ground and molded to form a molded body. Two platinum pipes 101 were inserted into the molded body. The molded body was sintered at 1600° C. to form sintered body 100 containing Al, Cr and Fe in a ratio of 0.7:0.15:0.15 and having the corundum crystal structure. A conventional temperature sensor was formed in the same manner as in Comparative Example 1.

EXAMPLE 8

The temperature sensor element of Example 8 and the method therefor will be explained with reference to FIGS. 20 and 21.

Figure 20:
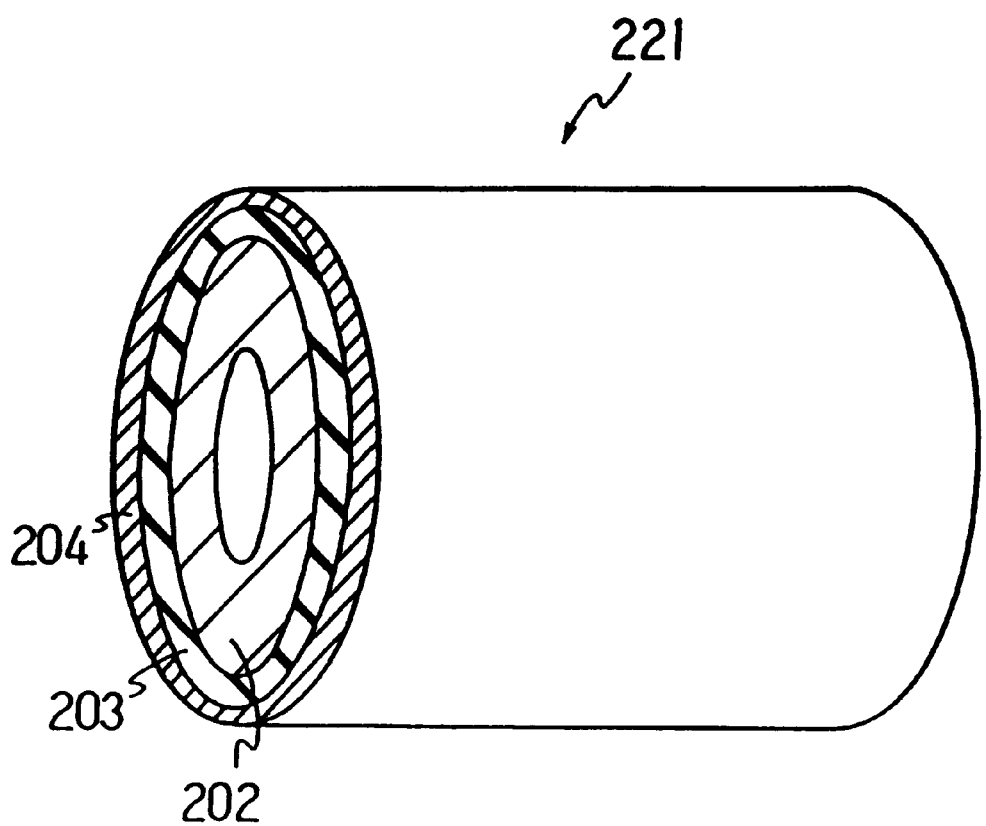
FIG. 20 is a perspective view of a temperature sensor element in Example 8.

FIG. 20 is a perspective view of temperature sensor element 221 in Example 8. Thermosensitive film 203, unlike that in Example 7, was provided on the outside wall of metallic tubular support 202, and electrode film 204 was provided on the temperature sensitive film. The method for forming this temperature sensor element will be explained with reference to FIG. 21. This example was different from Example 7 in that temperature sensitive film 203 was formed while heater 222 having electrically insulated surface was inserted in metallic tubular support 202, and nozzle 223 to spout CVD gas had one wider opening of 8 mm outside diameter to cover metallic tubular support 202. However, FIG. 21 shows heater 222 before being inserted in metallic tubular support 202. Thermosensor element 221 resulting from the above method was used for a temperature sensor in the same manner as in Example 7. As a result of measuring the heat response in the temperature sensor, the temperature sensor of this example exhibiting room temperature took 4 seconds to exhibit 350° C., 5 seconds to exhibit 500° C., and 7 seconds to exhibit 800° C. The temperature sensor of Example was thus found to be superior in heat response at any temperature to the conventional temperature sensors and superior at 800° C. to that in Example 7.

EXAMPLE 9

The method for forming a temperature sensor element in this example is different from those of Examples 7 and 8 in that the length of metallic tubular support was 100 mm, instead of 5 mm, and the metallic tubular support was cut to 5 mm long after the temperature sensitive film and electrode film were formed. The method of this example has advantages of forming a plurality of temperature sensor elements in one step and not requiring a step of polishing both ends of the elements to remove short circuit between electrodes.

Example 10

The temperature sensor element in this example is different from those of Examples 7 and 8 that lithium (Li)-containing nickel oxide (NiO) film of 8 $\mu$m thickness was used for electrode film 204 instead of nickel.

The electrode film was formed as follows. Within vacuum chamber 212 of a CVD apparatus shown in FIG. 19, the outside wall of the same tube 202 having temperature sensitive film 203 as in Example 7 was placed on heater 213 kept at 600° C. to be heated. Nozzle 214 of 2.2 mm outside diameter to spout CVD gas was inserted in tube 202 of heat resistant stainless steel. A gas mixture was provided for 20 minutes to material gas supplying devices 215 and 216. The gas mixture contained vapors of nickel acetyl acetonate and lithium dipivaloyl methane and oxygen gas while vacuum chamber 212 was kept at a vacuum of 0.8 Torr by exhaustion pump 218, and plasma was generated by applying a high frequency at 13.56 MHz to high frequency coil 220 with high power source 219. This caused a CVD reaction on temperature sensitive film 203 on tube 202, forming electrode film 204. The temperature sensor element thus formed was used as a temperature sensor in the same manner as in Example 7. The temperature sensor of this example exhibiting room temperature took 4 seconds to exhibit 350° C., 5 seconds to exhibit 500° C., and 8 seconds to exhibit 800° C. The temperature sensor of this Example was thus found to be superior in heat response at any temperature to the conventional temperature sensors.

Since the temperature sensor element and temperature sensor of the example used oxide electrodes, the temperature sensor was superior in reliability to those of Examples 7 and 8 using nickel electrode film.

In this example, the temperature sensitive film was of Al-Cr-Fe-O having the negative response property. However, materials are not limited to this example. Examples of other materials include Ba-Ti-O having the positive response property, Si-C having the nonlinear response property and platinum having the linear response property. Those examples have similar effects. In this example, the electrode film was formed of nickel oxide containing nickel and lithium. Precious metals such as platinum or a precious metallic alloy such as an alloy of platinum-rhodium have similar effects. The plasma CVD method and plating were explained by way of the formation for the temperature sensitive film and electrode film. However, the methods are not limited to this example. Vacuum deposition and sputtering have similar effects.

EXAMPLE 11

Example 11 is an example of the method for forming the third temperature sensor element of the invention.

Figure 22A:
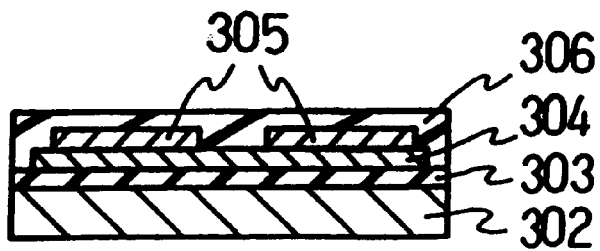
FIG. 22($a$) is a sectional view of a temperature sensor element in an example of the invention.
Figure 22B:
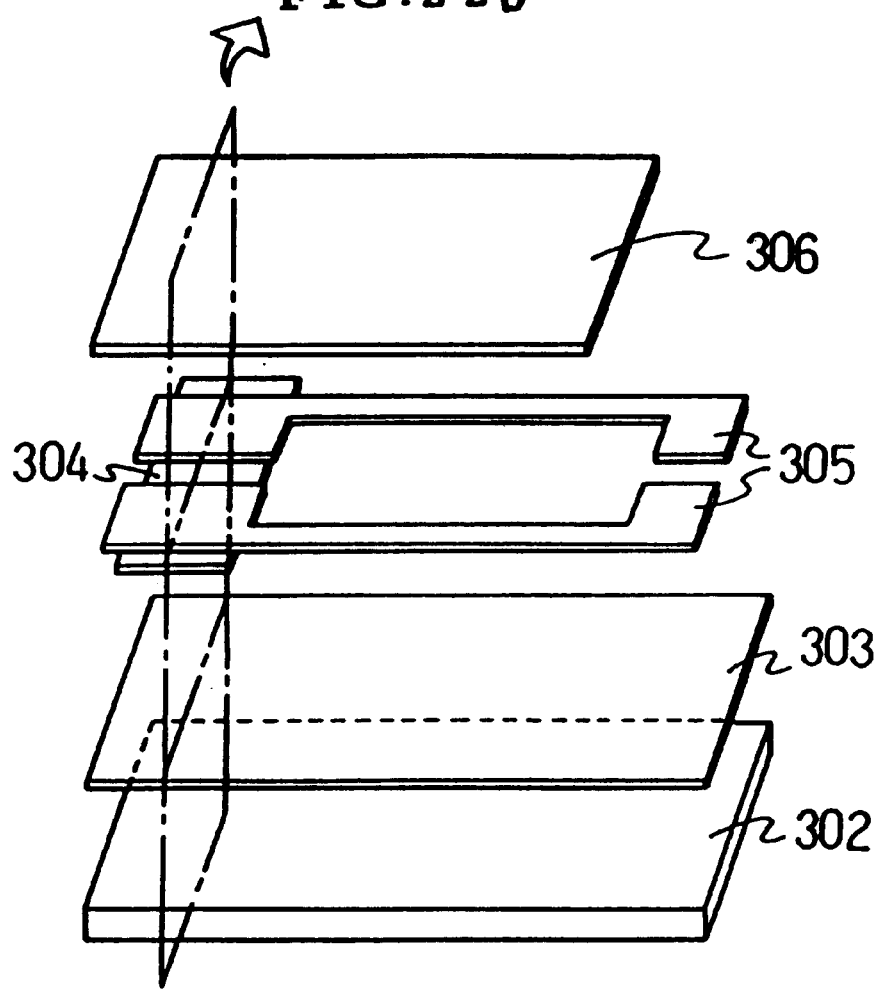
Figure 23:
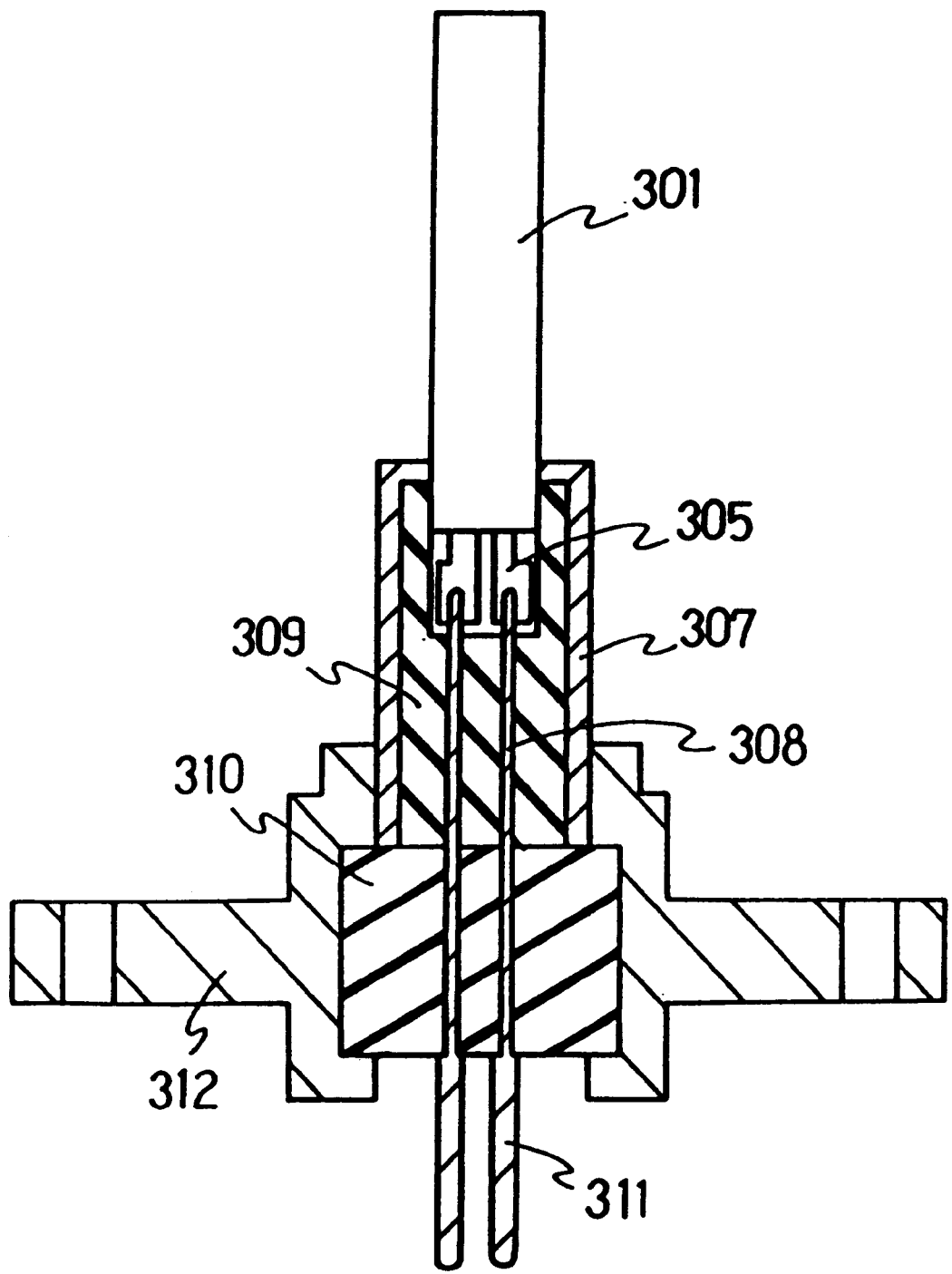
FIG. 23 is a sectional view of a temperature sensor in an example of the invention.
Figure 2:
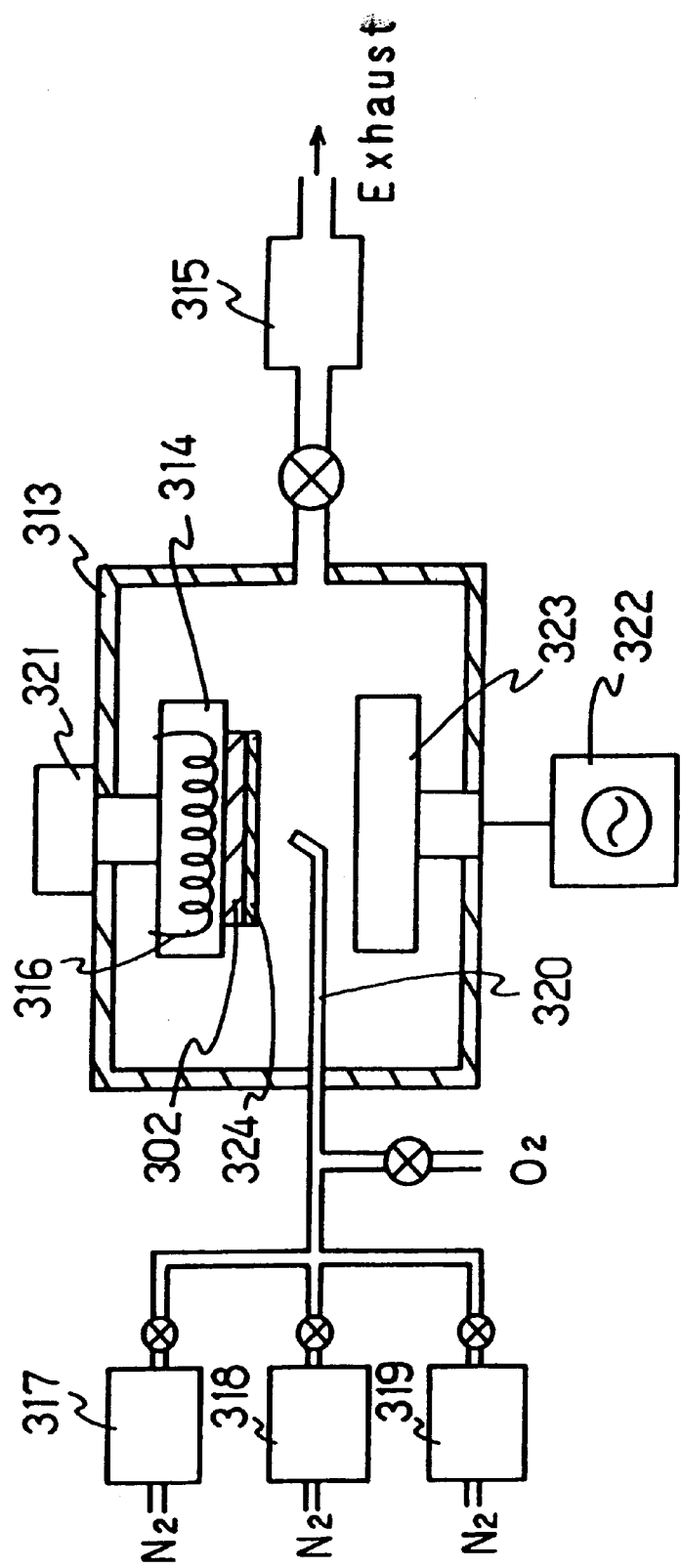

FIG. 22(a) is a sectional view of the temperature sensor element using a temperature sensitive body in this example. FIG. 22(b) is an exploded view showing a layered structure of the temperature sensor element. Strip-shaped substrate 302 was formed of heat-resistant "Inconel" metal, a nickel-chromium alloy. The size of substrate 302 was 3 mm in width, 0.3 mm in thickness, and 20 mm in length. Electric insulating film 303 of 2 $\mu$m thickness was formed of alumina on the whole surface of substrate 302. A film of temperature sensitive body 304 was provided on part of electric insulating film 303. The size of temperature sensitive body 304 was 2.5 mm by 2.0 mm, and 2 $\mu$m thick. Electrode films 305 of 100 nm thick platinum having an electrode interval of 0.5 mm were formed on the film of temperature sensitive body 304. Electric protective film 306 of 2 $\mu$m thickness is provided on the whole surface of temperature sensitive body 304 and most of the surface of electrode films 305. FIG. 23 shows that one side of temperature sensor element 301 having uncovered surfaces of electrode films 305 is connected with metallic housing 307 in a temperature sensor having the above temperature sensor element. Within housing 307, leads (A) 308 are connected with uncovered electrode films 305, and electric insulator (A) 309 is placed on leads (A) 308. Leads (A) going through electric insulator (B) 310 are connected with leads (B) 311. Housing 307 and electric insulator (B) 310 are fixed on metallic flange 312.

The method for forming temperature sensor element 301 is as follows. In this example, electric insulating film 303, the film of temperature sensitive body 304 and electric protective film 306 were formed by the plasma CVD method, and electrode films 305 were formed by RF sputtering.

A plasma CVD apparatus shown in FIG. 24 was used. Substrate 302 of heat-resistant "Inconel" metal was placed on substrate holder 314 within chamber 313. Chamber 313 was evacuated to 1 Pa with vacuum pump 315 while substrate 302 was heated to 400° C. with heater 316. After the substrate temperature was stabilized, vapor of aluminum acetyl acetonate together with a carrier gas (nitrogen) was supplied into chamber 313 from gas supplying device 317 from among three gas supplying devices 317, 318 and 319. Oxygen as a reactive gas, vapor of aluminum acetyl acetonate and the carrier gas were directed toward substrate 302 through supplying nozzle 320. High frequency power source 322 was operated to generate plasma between electrode 323 and substrate holder 314 for 20 minutes, while chamber 313 was kept at a vacuum of 8 Pa, and substrate holder 314 was rotated with substrate rotating motor 321 at a rate of 60 rotations per minute. An electric insulating film of aluminum oxide was thus formed on the whole surface of substrate 302.

Within the same plasma CVD apparatus shown in FIG. 24, substrate 302 having electric insulating film and metal mask 324 were placed on substrate holder 314, and substrate 302 was heated to 400° C. with heater 316 while chamber 313 was evacuated to 1 Pa with vacuum pump 315. After the substrate temperature was stabilized, vapor of aluminum acetyl acetonate together with a carrier gas (nitrogen) and oxygen as a reactive gas was supplied into chamber 313 from gas supplying device 317 through supplying nozzle 320 and directed toward substrate 302. Vapor of iron acetyl acetonate was similarly supplied into chamber 313 from gas supplying device 318. Vapor of chromium acetyl acetonate was similarly supplied into chamber 313 from gas supplying device 319. High frequency power source 322 was operated to generate plasma between electrode 323 and substrate holder 314 for 20 minutes, while chamber 313 was kept at a vacuum of 10 Pa, and substrate holder 314 was rotated with substrate rotating motor 321 at a rate of 60 rotations per minute. A film of temperature sensitive body 304 was thus formed of an oxide containing aluminum, chromium and iron on the part of the electric insulating film which was not covered with the metal mask. Thermosensitive film 304 contained aluminum, chromium and iron at a ratio of 0.7:0.15:0.15. FIG. 25 shows profiles of XRD analysis result No. 1 for electric insulating film 303 formed on substrate 302 and the film of temperature sensitive body 304. The profile (1) means that electric insulating film 303 and the film of temperature sensitive body 304 were amorphous. SEM observation for a section of this film revealed that the structure of the film was a column-like structure having a clear grain boundary.

To crystallize temperature sensitive body 304, temperature sensitive body 304 was heat treated in the air at 1000° C. or 1200° C. for 3 hours using an electric furnace. The profiles (2) and (3) in FIG. 25 mean that electric insulating film 303 consists of layers of alumina and temperature sensitive body 304 consists of layers of oxide containing aluminum, chromium and iron. The profile (2) shows that the crystal structure of the film was a single phase of the spinel structure. The profile (3) shows that the crystal structure of the film was a single phase of the corundum structure. SEM observation for a section of this film revealed that the structure of the film was a uniformly sintered structure having no grain boundary.

Figure 26:
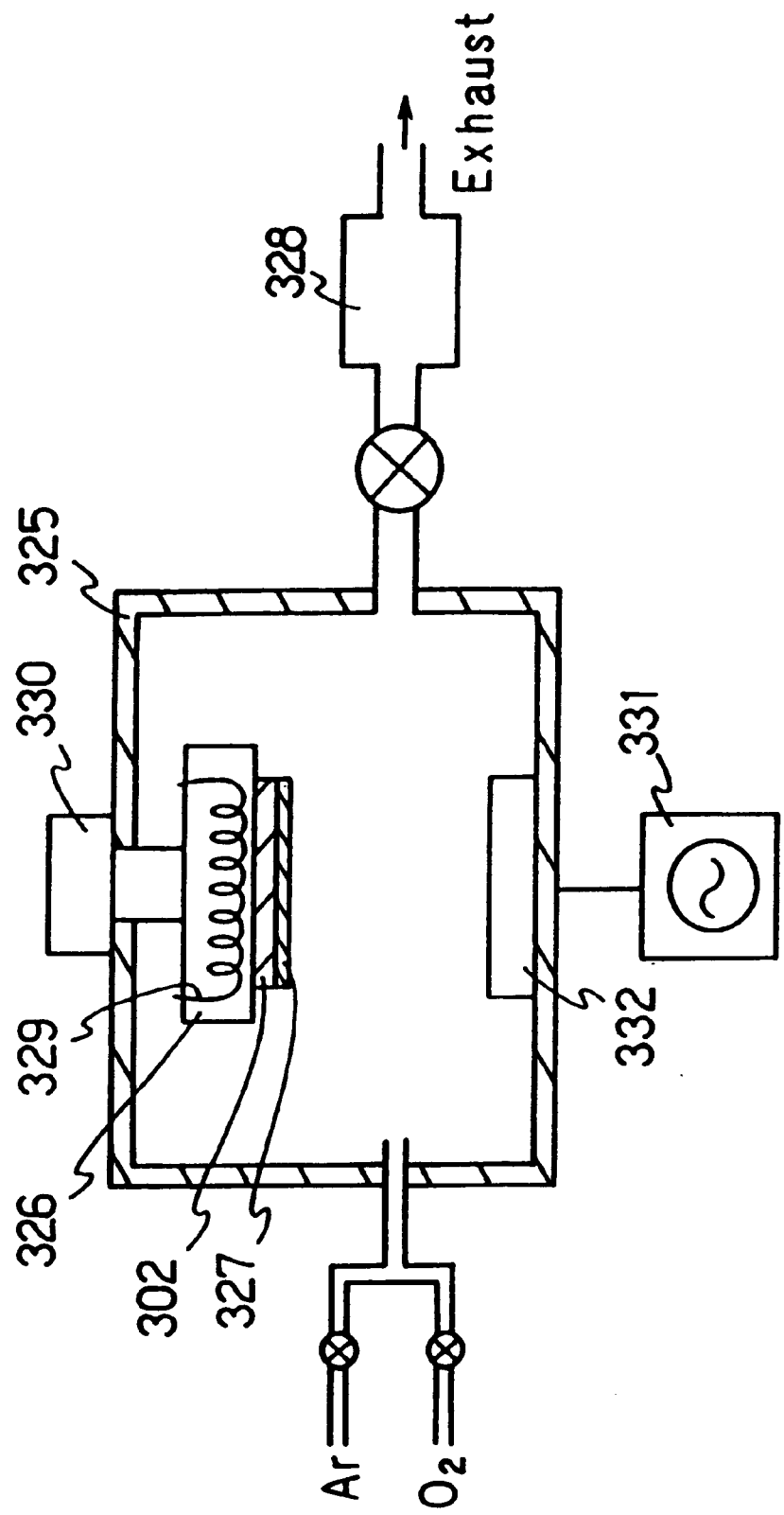
FIG. 26 is a schematic illustration of an RF sputtering apparatus in an example of the invention.

Next, electrode films 305 were formed using an RF sputtering apparatus shown in FIG. 26. Substrate 302 having electric insulating film 303 and the film of temperature sensitive body 304, and metal mask 327 thereon were placed on substrate holder 326 within chamber 325, and substrate 302 was heated to 400° C. with heater 329 while chamber 325 was evacuated to 2×10$^{-4}$Pa with vacuum pump 328. After the substrate temperature was stabilized, argon as a sputtering gas was induced to chamber 325, and target 332 of platinum was sputtered for 10 minutes while chamber 325 was kept at a vacyuum of 1.0 Pa, and substrate holder 326 was rotated with substrate rotating motor 330 at a rate of 5 rotations per minute, and high frequency power source 331 was operated. Electrode films 305 of platinum were thus formed on the surface of electric insulating film 303 and the film of temperature sensitive body 304 which was not covered with the metal mask.

With the plasma CVD apparatus shown in FIG. 24, substrate 302 having electric insulating film 303, the film of temperature sensitive body 304 and electrode films 305 formed, and further metal mask 324 were placed on substrate holder 314 within chamber 313, and substrate 302 was heated to 400° C. with heater 316 while chamber 313 was evacuated to 1 Pa with vacuum pump 315. After the substrate temperature was stabilized, vapor of aluminum acetyl acetonate together with a carrier gas (nitrogen) was supplied into chamber 313 from gas supplying device 317. The vapor and oxygen as a reactive gas were induced toward substrate 302 through supplying nozzle 320. High frequency power source 322 was operated to generate plasma between electrode 323 and substrate holder 314 for 20 minutes, while chamber 313 was kept at a vacuum of 8 Pa, and substrate holder 314 was rotated with substrate rotating motor 321 at a rate of 60 rotations per minute. Electric insulating protective film 306 of alumina was thus formed on the part of electric insulating film 303, the film of temperature sensitive body 304 and electrode films 305 which was not covered with the metal mask.

In the temperature sensor shown in FIG. 23, the end of two leads (A) 308 was welded with electrode films 305, and temperature sensor element 301 including part of electric protective film 306 was inserted in metallic housing 307, which accommodates electric insulator (A) 309. Electric films 305 which were not covered by anything were confined to housing 307 to avoid having electric films 305 and leads (A) 308 exposed to the air. Leads (A) 308 sticking out of housing 307, which was connected with temperature sensor element 301, were allowed to go through electric insulator (B) 310 within metallic flange 312. Leads (A) 308 were connected with leads (B) 311, and housing 307 was fixed on flange 312.

The above temperature sensor has temperature sensor element 301 which has a small thermal capacity. Further, temperature sensor 301 is expected to exhibit a high response because the heat directly conducts from the air to the film of temperature sensitive body 304 through electric insulating protective film 306 of 2 μm thickness.

Figure 37:
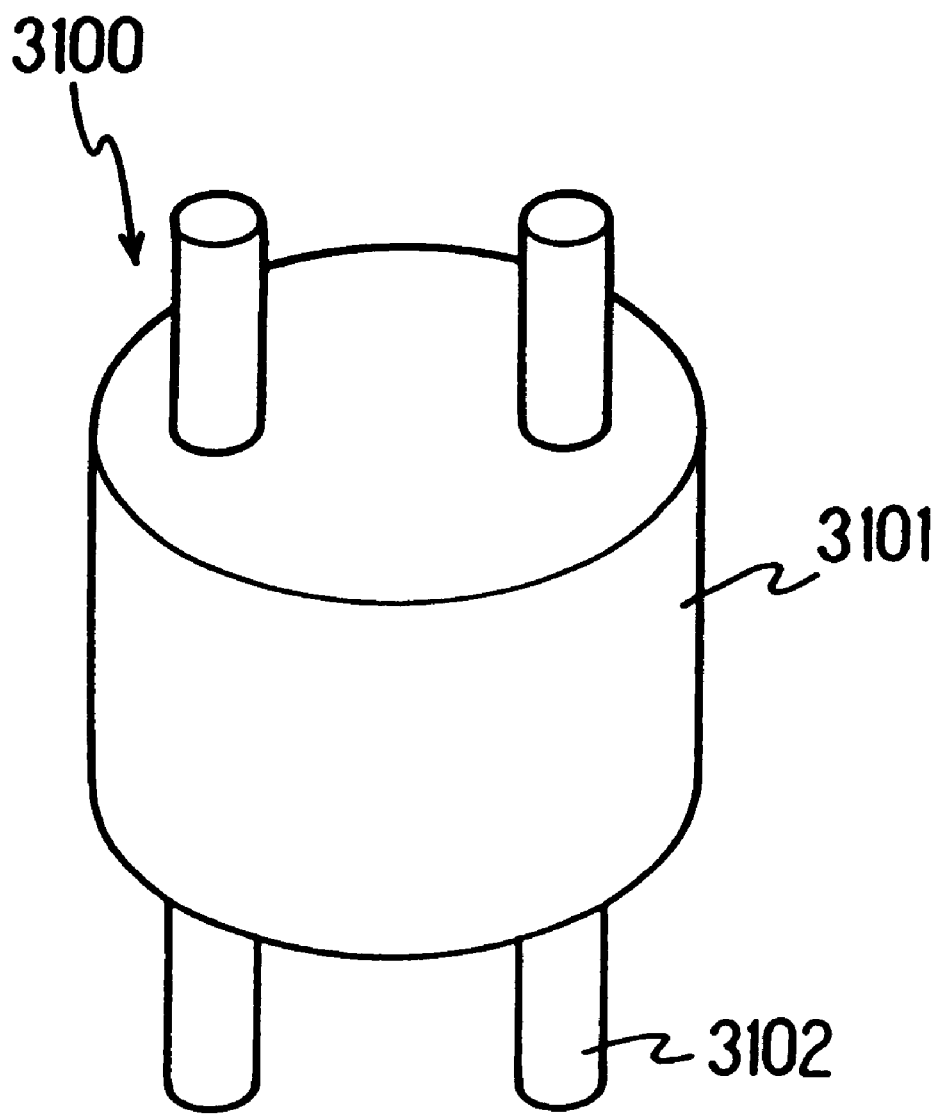
FIG. 37 is a perspective view of a temperature sensor element in a comparative example.

Conventional temperature sensor element 3100 shown in FIG. 37 was formed as follows. After $Al_2O_3$, $Cr_2O_3$ and $Fe_2O_3$ were weighed to given amounts, they were prefired, ground and molded to form a molded body. Two platinum pipes for leads (A) 3102 were inserted into the molded body. The molded body was sintered at 1600° C. to form temperature sensitive body 3101 as a sintered body containing Al, Cr and Fe in a ratio of 0.7:0.15:0.15 and having the corundum crystal structure. The temperature sensor element was a disk of 3.7 mm diameter and 2 mm thickness. A conventional temperature sensor was formed as follows. Two leads 3102 of platinum pipes were connected with leads 103 as shown in FIG. 36. Leads 103 were allowed to go through electric insulator 104. Flange 106 was inserted on one end of tubular housing 105 where temperature sensor element 3100 was not provided. Housing 105 was formed of stainless steel. Electric insulator 107 was inserted to metallic flange 106 to electrically insulate leads 103 from flange 106. Finally, heat resistant cap 108 was fixed by welding on the end of metallic housing 105 where temperature sensor element 3100 was provided.

The heat response of a temperature sensor using temperature sensor element 301 was compared with that of a conventional temperature sensor. The method for measuring the heat response was as follows. Two leads of the temperature sensor were connected with a sensor temperature detection circuit. The output terminal of the circuit was connected with a recorder. The temperature sensor exhibiting room temperature was quickly placed in a thermostat kept at 350, 500 or 800° C. The measurement was performed by measuring the time period in which the temperature exhibited by the temperature sensor appropriately rose from room temperature to 350, 500 or 800° C., and stabilized at the constant. The measurement was conducted 5 times. The average value of the repetition was considered one result. Table 1 shows the results.

TABLE 1

HEAT RESPONSE

| Sample/Crystal | R.T. → 350° C. | R.T. → 500° C. | R.T. → 800° C. |
|---|---|---|---|
| (1)/Spinel | 3.8 sec | 4.9 sec | 7.5 sec |
| (2)/Corundum | 3.3 sec | 4.6 sec | 6.5 sec |
| (3)/Spinel | 4.0 sec | 5.1 sec | 7.7 sec |
| (4)/Corundum | 3.5 sec | 4.8 sec | 6.8 sec |
| (5)/Spinel | 3.9 sec | 5.1 sec | 7.6 sec |
| (6)/Corundum | 3.3 sec | 4.8 sec | 6.7 sec |
| (7)/Spinel | 3.6 sec | 4.8 sec | 7.3 sec |
| (8)/Corundum | 3.1 sec | 4.3 sec | 6.0 sec |
| (9)/Spinel | 3.7 sec | 4.8 sec | 7.5 sec |
| (10)/Corundum | 3.3 sec | 4.5 sec | 6.2 sec |
| (11)/Spinel | 3.7 sec | 4.9 sec | 7.5 sec |
| (12)/Corundum | 3.2 sec | 4.5 sec | 6.3 sec |
| (13)/Corundum | 5.0 sec | 8.3 sec | 12.5 sec |

R.T.: Room Temperature

Table 1 shows the heat response in the temperature sensor of the example. The temperature sensor using sample (1) of the spinel crystal structure at room temperature took 3.8 seconds, 4.9 seconds and 7.5 seconds to exhibit 350° C., 500° C. and 800° C., respectively. The temperature sensor using sample (2) of the corundum crystal structure took 3.3 seconds, 4.6 seconds and 6.5 seconds, respectively. On the other hand, a conventional temperature sensor using sample (13) took 5.0 seconds, 8.3 seconds and 12.5 seconds. The heat response in the temperature sensor of the example was thus found to be better at any temperature.

The change in the temperature sensor of the example was examined over time. After 100 heat cycles from room temperature to 800° C., the above measurement was performed. The change of period to rise from room temperature to 350° C., 500° C. or 800° C. (heat response) was restricted to between minus 0.5 second and plus 0.5 second of the original value for each respective temperature. The examination confirmed that no change in the temperature sensor over time was recognized.

The composition for Al, Cr and Fe in oxide in the film of the temperature sensitive body of the example was a ratio of 0.7:0.15:0.15. However, the Al-Cr-Fe composition is not limited to this example. Oxide containing Al, Cr and Fe as main components provided similar crystallinity and heat response as long as the oxide had a composition represented by $(Al_{1-x-y}, Cr_x, Fe_y)_2O_z$ wherein $0.05 \leq x+y \leq 0.95$, $0.05 \leq y/(x+y) \leq 0.6$ and $8/3 \leq z \leq 3$.

The films for an electric insulating film, temperature sensitive body and electric insulating protective film were formed on substrates at 400° C. However, the substrate temperature is not limited to 400° C. The temperature from 200 to 800° C. provided similar crystallinity and heat response.

The films for an electric insulating film and temperature sensitive body were heat treated in the air for crystallization at 1000° C. or 1200° C. However, the temperature in heat treatment is not limited to those temperatures. The temperature from 900 to 1100° C. provided spinel structure films having a similar crystallinity. The temperature from 1100 to 1300° C. provided corundum structure films having a similar crystallinity. Those films resulted in similar heat response. Heat treatment around 1100° C. caused films containing a mixture of the spinel structure and corundum structure. Films containing a mixture of the spinel structure and corundum structure resulted in a heat response intermediate between that of films singly having the spinel structure and that of films singly having the corundum structure.

EXAMPLE 12

FIGS. 22 and 23 also show a temperature sensor element and a temperature sensor of Example 12.

The method for forming temperature sensor element 301 is as follows. In this example, electric insulating film 303, a film of temperature sensitive body 304 and electric protective film 306 were formed by the thermal CVD method, and electrode films 305 were formed by RF sputtering.

Figure 27:
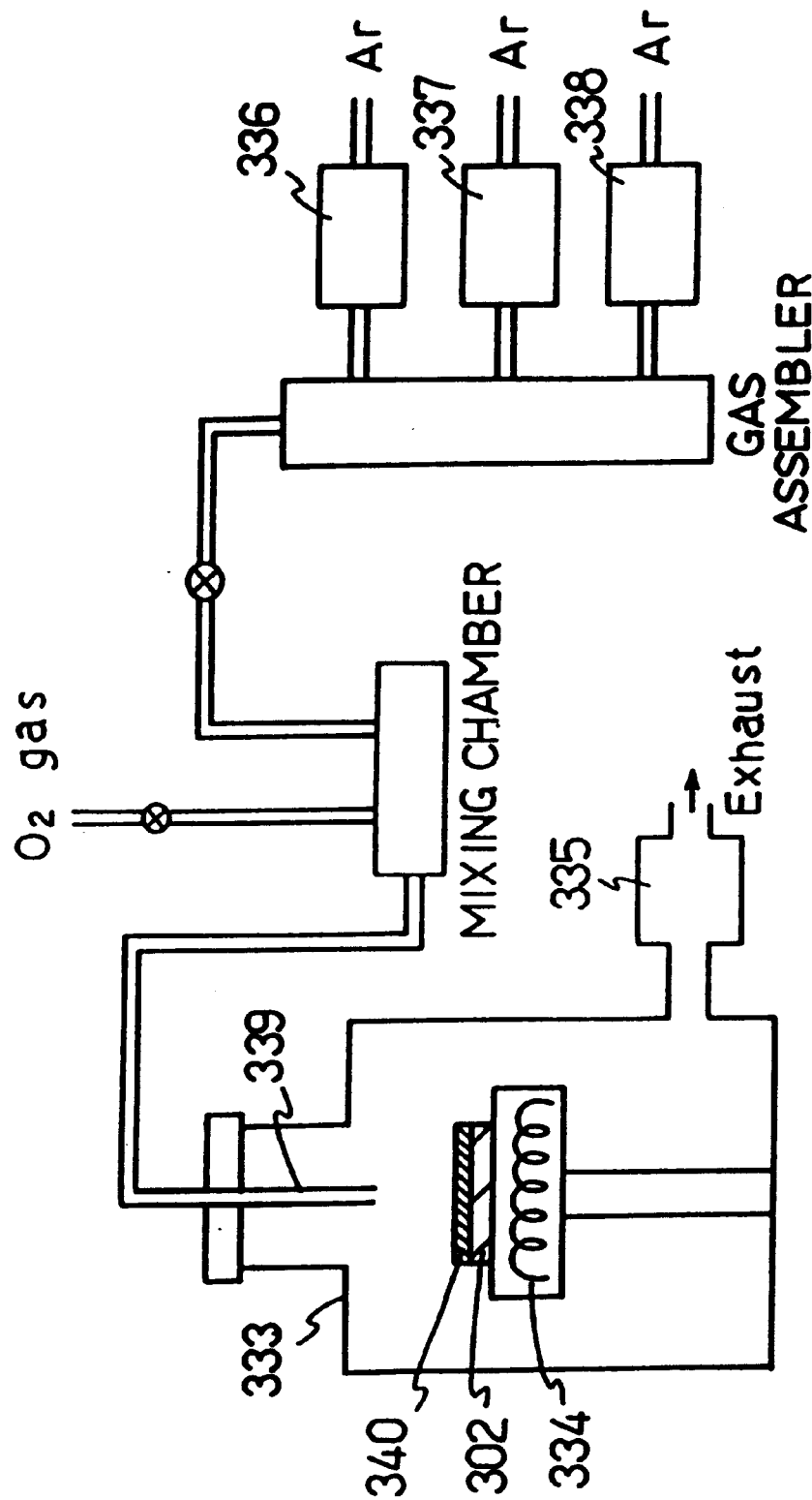
FIG. 27 is a schematic illustration of a thermal CVD apparatus in an example of the invention.

A thermal CVD apparatus shown in FIG. 27 was used. Substrate 302 of heat-resistant "Inconel" metal was placed on heater 334 within longitudinal type chamber 333. Chamber 333 was evacuated to 10 Pa with vacuum pump 335 while substrate 302 was heated to 600° C. with heater 334. After the substrate temperature was stabilized, vapor of aluminum acetyl acetonate together with a carrier gas (argon) was supplied into chamber 333 from gas supplying device 336 from among three gas supplying devices 336, 337 and 338. Oxygen as a reactive gas, vapor of aluminum acetyl acetonate and the carrier gas were directed toward substrate 302 through supplying nozzle 339. A film was formed on substrate 302 for 40 minutes while chamber 333 was kept at a vacuum of 0.5 KPa. Electric insulating film 303 of aluminum oxide was thus formed on the whole surface of substrate 302.

Figure 28:
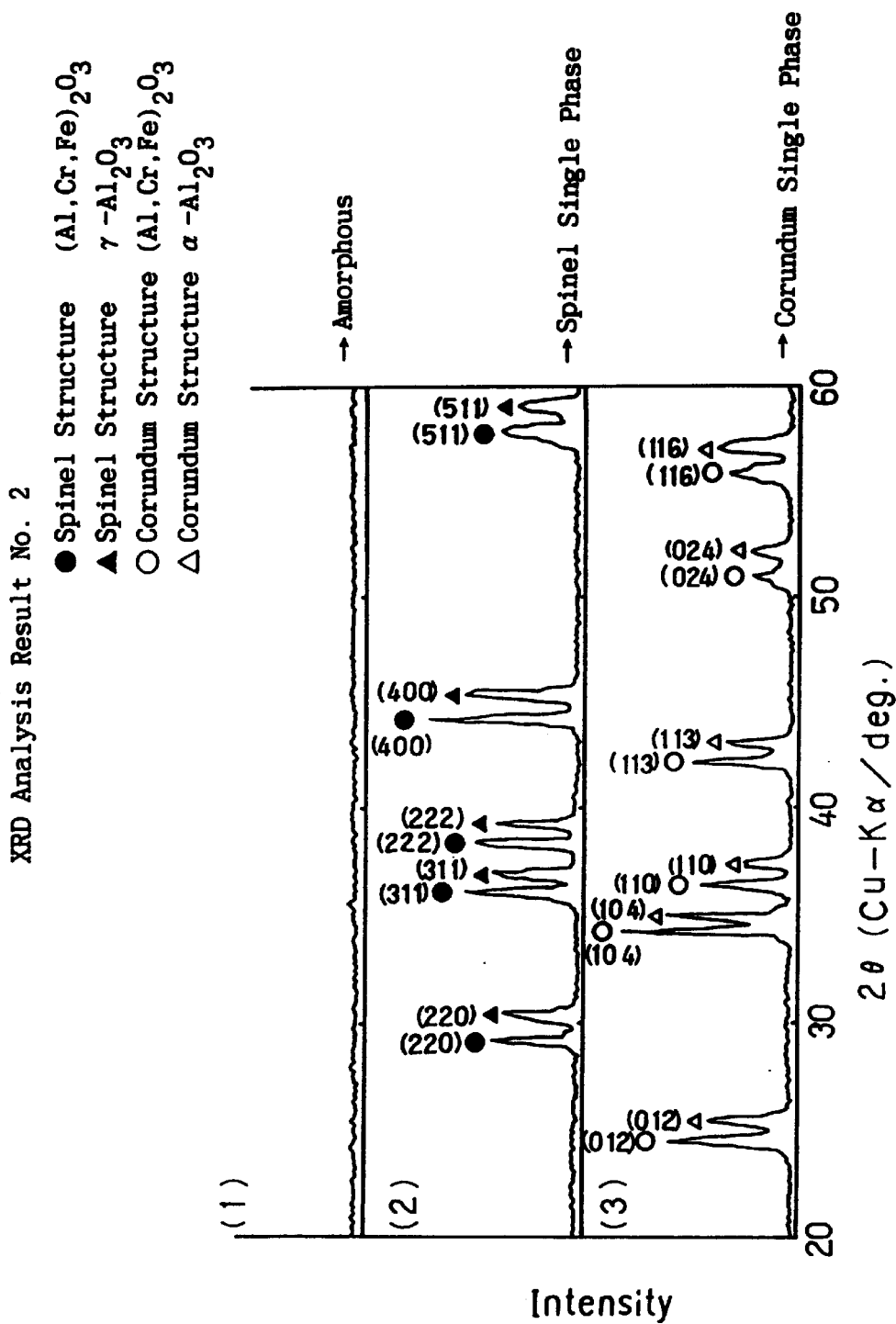
FIG. 28 shows profiles of XRD analysis result No. 2 in Example 12.

With the same thermal CVD apparatus, substrate 302 having electric insulating film 303 and metal mask 340 thereon were set, and substrate 302 was heated to 600° C. with heater 334 while chamber 333 was evacuated to 10 Pa with vacuum pump 335. After the substrate temperature was stabilized, vapor of aluminum acetyl acetonate together with a carrier gas (argon) and oxygen as a reactive gas were supplied into chamber 333 from gas supplying device 336 through supplying nozzle 339 and directed toward substrate 302. Vapor of iron acetyl acetonate was similarly supplied into chamber 333 from gas supplying device 337. Vapor of chromium acetyl acetonate was similarly supplied into chamber 333 from gas supplying device 338. A film was formed on substrate 302 for 40 minutes while chamber 333 was kept at a vacuum of 0.5 KPa. The film of temperature sensitive body 304 was thus formed of aluminum oxide, chromium oxide and iron oxide on the part of the electric insulating film 303 which was not covered with the metal mask. Thermosensitive film 304 contained aluminum, chromium and iron at a ratio of 0.7:0.15:0.15. FIG. 28 shows profiles of XRD analysis result No. 2 for electric insulating film 303 formed on substrate 302 and the film of temperature sensitive body 304. The profile (1) means that electric insulating film 303 and the film of temperature sensitive body 304 were amorphous. SEM observation for a section of this film revealed that the structure of the film was a column-like structure having a clear grain boundary. To crystallize temperature sensitive body 304, temperature sensitive body 304 was heat treated in the air at 1000° C. or 1200° C. for 3 hours using an electric furnace. The profiles (2) and (3) in FIG. 28 mean that electric insulating film 303 consists of layers of alumina and temperature sensitive body 304 consists of layers of oxide containing aluminum, chromium and iron. The profile (2) shows that the crystal structure of the film was a single phase of the spinel structure. The profile (3) shows that the crystal structure of the film was a single phase of the corundum structure. SEM observation for a section of this film revealed that the structure of the film was a uniformly sintered structure having no grain boundary.

Next, electrode films 305 of platinum were formed using an RF sputtering apparatus shown in FIG. 26 in the same manner as in Example 11.

Next, again with the thermal CVD apparatus shown in FIG. 27, substrate 302 having electric insulating film 303, the film of temperature sensitive body 304, electrode films 305, and further metal mask 340 were placed on heater 334 within chamber 333, and substrate 302 was heated to 600° C. with heater 334 while chamber 333 was evacuated to 10 Pa with vacuum pump 335. After the substrate temperature was stabilized, vapor of aluminum acetyl acetonate together with a carrier gas (argon) and oxygen as a reactive gas was supplied into chamber 333 from gas supplying device 336 through supplying nozzle 339 and induced toward substrate 302. A film was formed on substrate 302 for 40 minutes while chamber 333 was kept at a vacuum of 0.5 KPa. Electrode protective films 306 of alumina was thus formed on the surface of electric insulating film 303, the film of temperature sensitive body 304 and electrode film 305 which was not covered with the metal mask.

The temperature sensor element 301 thus formed was used in a similar manner as in Example 11 to form a temperature sensor shown in FIG. 23. In the temperature sensor of the example, temperature sensor element 301 has a small thermal capacity. Further, temperature sensor 301 is expected to exhibit a high response because the heat directly conducts from the air to the film of temperature sensitive body 304 through electric insulating protective film 306 of 2 μm thickness. Conventional temperature sensor element 3100 shown in FIG. 37 was formed in the same manner as described in Example 11.

The heat response of a temperature sensor using temperature sensor element 301 was compared with that of a conventional temperature sensor. The method for measurement was the same manner as in Example 11.

As shown in Table 1, temperature sensor using sample (3) of the spinel crystal structure at room temperature took 4.0 seconds, 5.1 seconds and 7.7 seconds to exhibit 350° C., 500° C. and 800° C., respectively. The temperature sensor using sample (4) of the corundum crystal structure took 3.5 seconds, 4.8 seconds and 6.8 seconds, respectively. On the other hand, a conventional temperature sensor using sample (13) took 5.0 seconds, 8.3 seconds and 12.5 seconds. The heat response in the temperature sensor of the example was thus found to be better at any temperature.

To examine the change in temperature sensor of the example over time, 100 heat cycles from room temperature to 800° C. were conducted, and the above measurement was performed again. The change of period to rise from room temperature to 350° C., 500° C. or 800° C. (heat response) was restricted to between minus 0.5 second and plus 0.5 second of the original value for each respective temperature. The examination confirmed that no change in the temperature sensor over time was recognized.

The composition for Al, Cr and Fe in oxide in the film of temperature sensitive body of the example was a ratio of 0.7:0.15:0.15. However, the Al-Cr-Fe composition is not limited to this example. Oxide containing Al, Cr and Fe as main components provided similar crystallinity and heat response as long as the oxide had a composition represented by $(Al_{1-x-y}, Cr_x, Fe_y)2O_z$ wherein $0.05 \leq x+y \leq 0.95$, $0.05 \leq y/(x+y) \leq 0.6$ and $8/3 \leq z \leq 3$.

The films for an electric insulating film, temperature sensitive body and electric insulating protective film were formed on substrates at 600° C. However, the substrate temperature is not limited to 600° C. The temperature from 200 to 800° C. provided similar crystallinity and heat response.

The films for an electric insulating film and temperature sensitive body were heat treated in the air for crystallization at 1000° C. or 1200° C. However, the temperature in heat treatment is not limited to those temperatures. The temperature from 900 to 1100° C. provided spinel structure films having a similar crystallinity. The temperature from 1100 to 1300° C. provided corundum structure films having a similar crystallinity. Those films resulted in similar heat response. Heat treatment around 1100° C. caused films containing a mixture of the spinel structure and corundum structure. Films containing a mixture of the spinel structure and corundum structure resulted in a heat response intermediate between that of films singly having the spinel structure and that of films singly having the corundum structure.

EXAMPLE 13

FIGS. 22 and 23 also show a temperature sensor element and a temperature sensor of Example 13.

The method for forming temperature sensor element 301 is as follows. In this example, electric insulating film 303, a film of temperature sensitive body 304 and electric protective film 306 were formed by the reactive deposition method, and electrode films 305 were formed by RF sputtering.

Figure 29:
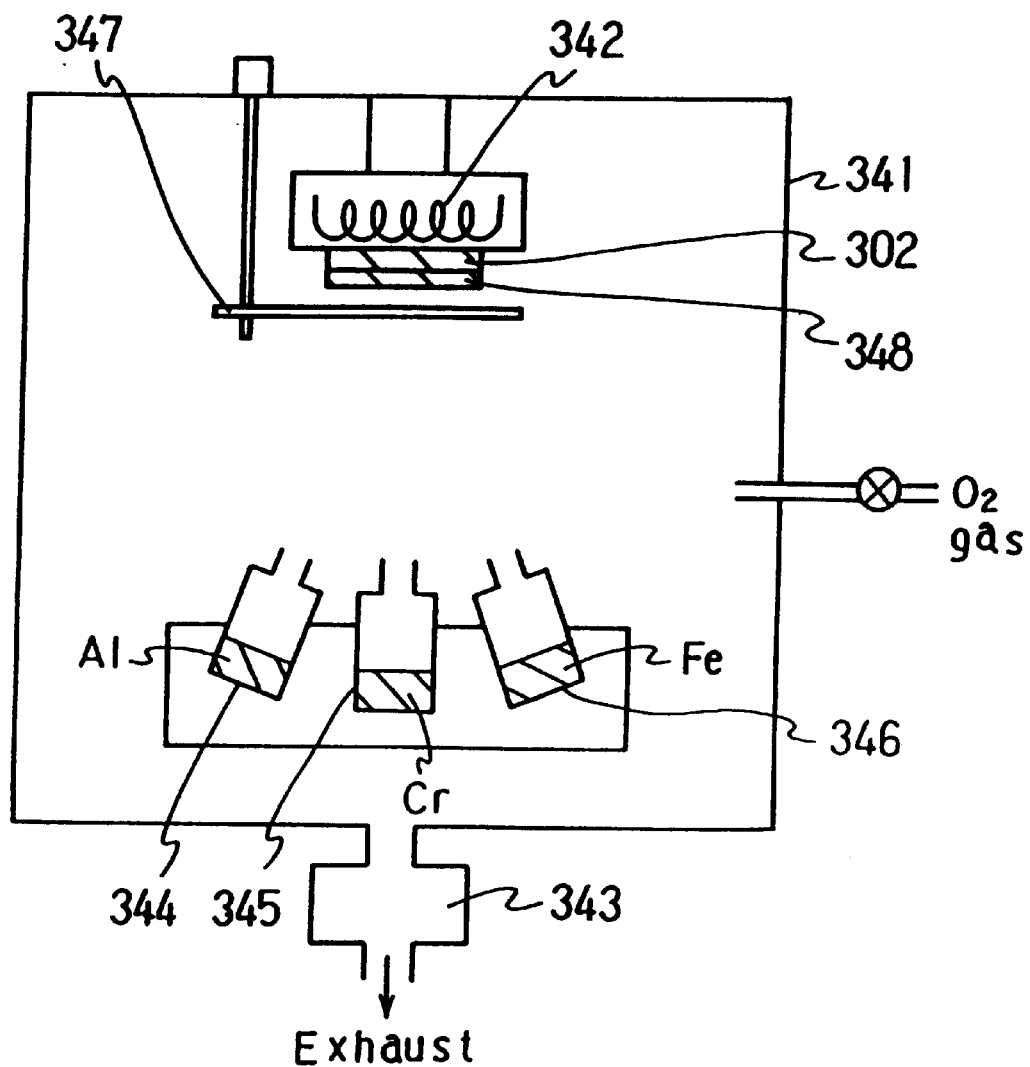
FIG. 29 is a schematic illustration of a reactive deposition apparatus in an example of the invention.

A reactive deposition apparatus shown in FIG. 29 was used. Substrate 302 of heat-resistant "Inconel" metal was placed on heater 342 within chamber 341. Chamber 341 was evacuated to $1 \times 10^{-3}$ Pa with vacuum pump 343 while substrate 302 was heated to 300° C. with heater 342. After the substrate temperature was stabilized, oxygen as a reactive gas was introduced to chamber 341 kept at a vacuum of $5 \times 10^{-3}$ Pa. Aluminum oxide films were formed on substrate 302 for 40 minutes by splashing metal aluminum from a metal atom supply source, that is, electron beam gun (hereinafter referred to as EB gun) 344 from among EB guns 344, 345 and 346 with shutter 347 opened. Atoms of metal aluminum were thus subjected to reaction with oxygen as a reactive gas in plasma to form electric insulating film 303 of aluminum oxide on the whole surface of substrate 302.

Figure 30:
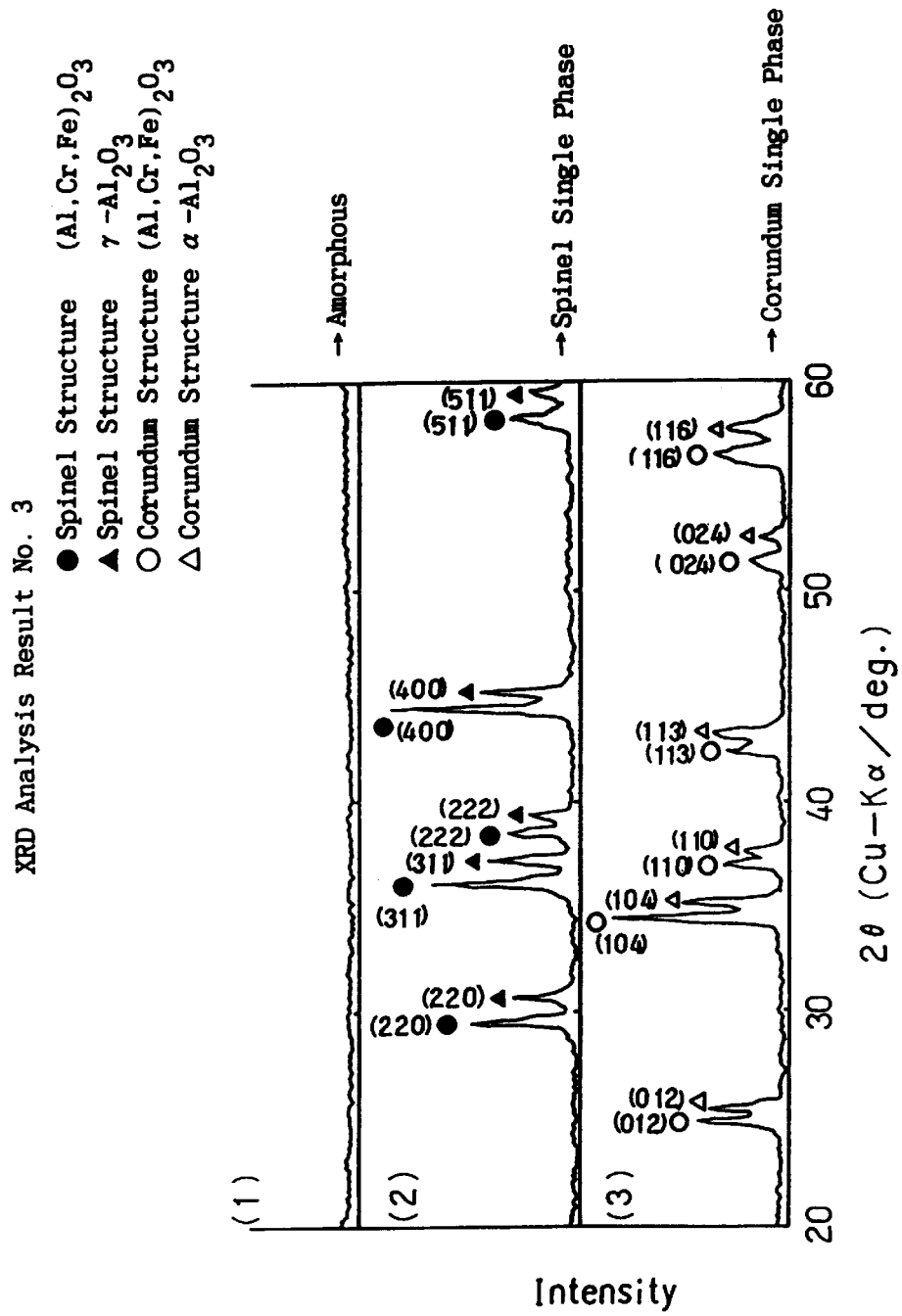
FIG. 30 shows profiles of XRD analysis result No. 3 in Example 13.

With the same reactive deposition apparatus shown in FIG. 29, substrate 302 having electric insulating film 303 formed and metal mask 340 thereon were set, and substrate 302 was heated to 300° C. with heater 342 while chamber 341 was evacuated to $1 \times 10^{-3}$ Pa with vacuum pump 343. After the substrate temperature was stabilized, oxygen as a reactive gas was introduced to chamber 341 kept at a vacuum of $5 \times 10^{-3}$ Pa. Oxide films comprising a compound of aluminum, chromium and iron were formed on substrate 302 for 30 minutes by splashing metal aluminum from EB guns 344, metal chromium from EB gun 345 and metal iron from EB gun 346 with shutter 347 opened. Atoms of metal aluminum, metal chromium and metal iron were thus subjected to reaction with oxygen as a reactive gas in plasma to form a film of temperature sensitive body 304 of aluminum oxide, chromium oxide and iron oxide on the part of the electric insulating film 303 which was not covered with the metal mask. Thermosensitive film 304 contained aluminum, chromium and iron at a ratio of 0.7:0.15:0.15. FIG. 30 shows profiles of XRD analysis result No. 3 for electric insulating film 303 formed on substrate 302 and the film of temperature sensitive body 304. The profile (1) means that electric insulating film 303 and the film of temperature sensitive body 304 were amorphous. SEM observation for a section of this film revealed that the structure of the film was a column-like structure having a clear grain boundary.

To crystallize temperature sensitive body 304, temperature sensitive body 304 was heat treated in the air at 1000° C. or 1200° C. for 3 hours using an electric furnace. The profiles (2) and (3) in FIG. 30 mean that electric insulating film 303 consists of layers of alumina and temperature sensitive body 304 consists of layers of oxide containing aluminum, chromium and iron. The profile (2) shows that the crystal structure of the film was a single phase of the spinel structure. The profile (3) shows that the crystal structure of the film was a single phase of the corundum structure. SEM observation for a section of this film revealed that the structure of the film was a uniformly sintered structure having no grain boundary.

Next, electrode films 305 of platinum were formed using an RF sputtering apparatus shown in FIG. 26 in the same manner as in Example 11.

Next, again with the reactive deposition apparatus shown in FIG. 29, substrate 302 having electric insulating film 303, the film of temperature sensitive body 304, electrode films 305, and further metal mask 308 were placed on heater 342 within chamber 341. Substrate 302 was heated to 400° C. with heater 342 while chamber 341 was evacuated to $1\times10^{-3}$Pa with vacuum pump 343. After the substrate temperature was stabilized, oxygen as a reactive gas was introduced to chamber 341 kept at a vacuum of $5\times10^{-3}$Pa. An aluminum oxide film was formed on substrate 302 for 40 minutes by splashing metal aluminum from EB gun 344 from among EB guns 344, 345 and 346 with shutter 347 opened. Atoms of metal aluminum were thus subjected to react with oxygen as a reactive gas in plasma to form electric insulating protective film 306 of alumina on the surface of electric insulating film 303, the film of temperature sensitive body 304 and electrode film 305 which was not covered with the metal mask.

The temperature sensor element 301 thus formed was used in a similar manner as in Example 11 to form a temperature sensor shown in FIG. 23. In the temperature sensor of the example, temperature sensor element 301 has a small thermal capacity. Further, temperature sensor 301 is expected to exhibit a high response because the heat directly conducts from the air to the film of temperature sensitive body 304 through electric insulating protective film 306 of 2 µm thickness. Conventional temperature sensor element 3100 shown in FIG. 37 was formed in the same manner as described in Example 11.

The heat response of a temperature sensor using temperature sensor element 301 was compared with that of a conventional temperature sensor. The method for measurement was the same as in Example 11. As shown in Table 1, temperature sensor using sample (5) of the spinel crystal structure at room temperature took 3.9 seconds, 5.1 seconds and 7.6 seconds to exhibit 350° C., 500° C. and 800° C., respectively. The temperature sensor using sample (6) of the corundum crystal structure took 3.3 seconds, 4.8 seconds and 6.7 seconds, respectively. On the other hand, a conventional temperature sensor using sample (13) took 5.0 seconds, 8.3 seconds and 12.5 seconds. The heat response in the temperature sensor of the example was thus found to be better at any temperature.

To examine the change in the temperature sensor of the example over time, 100 heat cycles from room temperature to 800° C. were conducted, and the above measurement was performed again. The change of period to rise from room temperature to 350° C., 500° C. or 800° C. (heat response) was restricted to between minus 0.5 second and plus 0.5 second of the original value for each respective temperature. The examination confirmed that no change in the temperature sensor over time was recognized.

The composition for Al, Cr and Fe in the oxide in the film of the temperature sensitive body of the example was at a ratio of 0.7:0.15:0.15. However, the Al-Cr-Fe composition is not limited to this example. An oxide containing Al, Cr and Fe as main components provides similar crystallinity and heat response as long as the oxide has a composition represented by $(Al_{1-x-y}, Cr_x, Fe_y)_2O_z$ wherein $0.05 \leq x+y \leq 0.95$, $0.05 \leq y/(x+y) \leq 0.6$ and $8/3 \leq z \leq 3$.

The films for an electric insulating film, temperature sensitive body and electric insulating protective film were formed on substrates at 300° C. However, the substrate temperature is not limited to 300° C. The temperature from 200 to 800° C. provided similar crystallinity and heat response.

The films for an electric insulating film and temperature sensitive body were heat treated in the air for crystallization at 1000° C. or 1200° C. However, the temperature in heat treatment is not limited to those temperatures. The temperature from 900 to 1100° C. provided spinel structure films having a similar crystallinity. The temperature from 1100 to 1300° C. provided corundum structure films having a similar crystallinity. Those films resulted in similar heat response. Heat treatment around 1100° C. caused films containing a mixture of the spinel structure and corundum structure. Films containing a mixture of the spinel structure and corundum structure resulted in a heat response intermediate between that of films singly having the spinel structure and that of films singly having the corundum structure.

EXAMPLE 14

FIGS. 22 and 23 also show a temperature sensor element and a temperature sensor of Example 14.

The method for forming temperature sensor element 301 is as follows. In this example, electric insulating film 303, a film of temperature sensitive body 304, electrode films 305 and electric protective film 306 were all formed by RF sputtering.

An RF sputtering apparatus shown in FIG. 26 was used. A target of alumina was placed on target 332. Substrate 302 of heat-resistant "Inconel" metal was placed on substrate holder 326 within chamber 325. Chamber 325 was evacuated to $2\times10^{-4}$Pa with vacuum pump 328 while substrate 302 was heated to 400° C. with heater 329. After the substrate temperature was stabilized, argon as a sputtering gas and oxygen in a ratio of 5:1 were introduced to chamber 325. High frequency power source 331 was operated to sputter target 332 of alumina for 3 hours, while chamber 325 was kept at a vacuum of 0.5 Pa, and substrate holder 326 was rotated with substrate rotating motor 330 at a rate of 5 rotations per minute. Electric insulating film 303 of aluminum oxide was thus formed on the whole surface of substrate 302.

Figure 31:
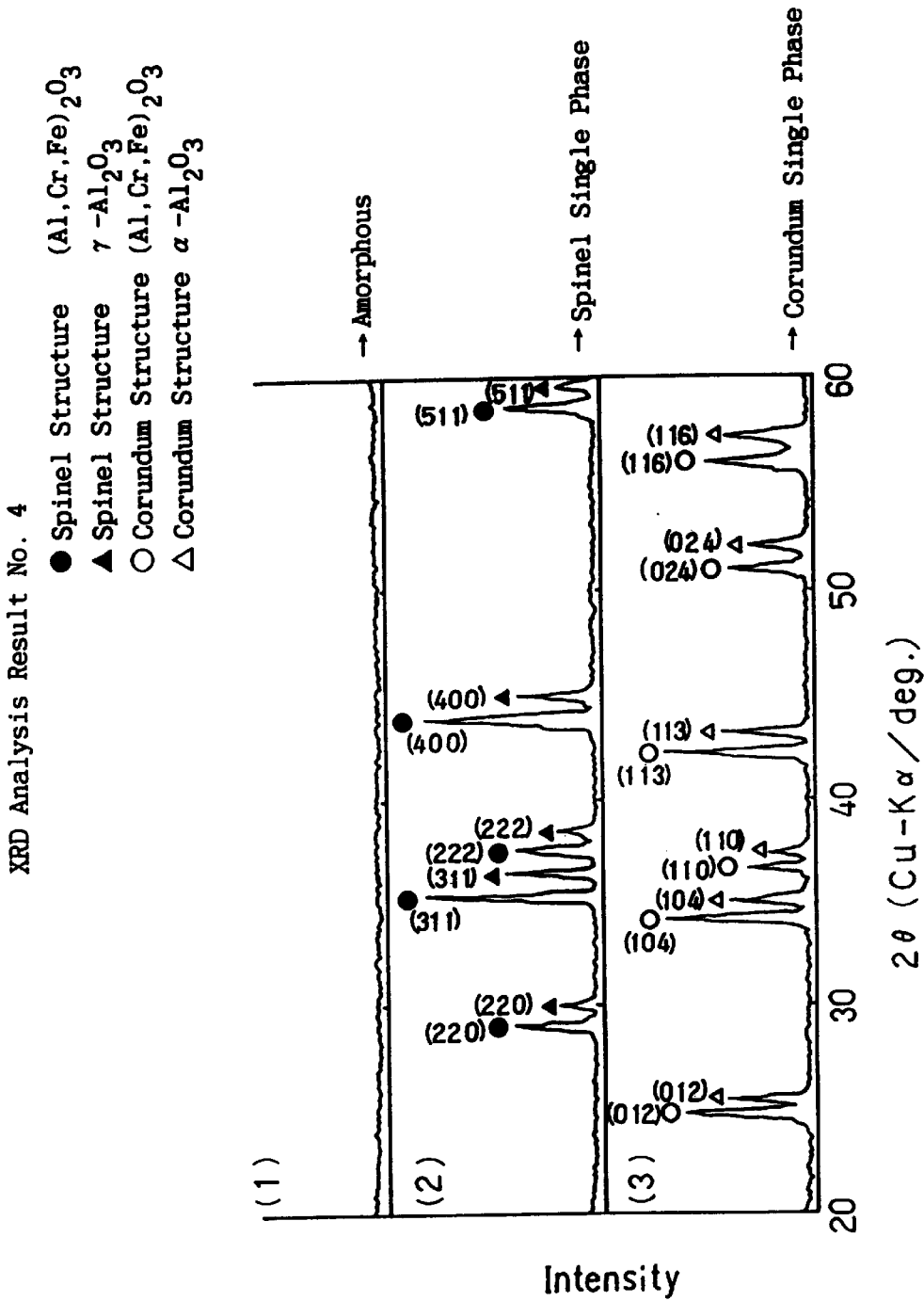
FIG. 31 shows profiles of XRD analysis result No. 4 in Example 14.

With the same RF sputtering apparatus shown in FIG. 26, target 332 was changed to a target of aluminum oxide, chromium oxide and iron oxide in a given ratio. Substrate 302 having electric insulating film 303 and electrode films 305 formed and metal mask 308 thereon were placed on substrate holder 326 within chamber 325, and substrate 302 was heated to 400° C. with heater 329 while chamber 325 was evacuated to $2\times10^{-4}$Pa with vacuum pump 328. After the substrate temperature was stabilized, argon as a sputtering gas and oxygen in a ratio of 5:1 were introduced to chamber 325. High frequency power source 331 was operated to sputter target 332 of aluminum oxide, chromium oxide and iron oxide for 4 hours, while chamber 325 was kept at a vacuum of 0.5 Pa, and substrate holder 326 was rotated with substrate rotating motor 330 at a rate of 5 rotations per minute. The film of temperature sensitive body 304 was thus formed on electric insulating film 303 which was not covered with the metal mask. Thermosensitive body 304 contained aluminum, chromium and iron at a ratio of 0.7:0.15:0.15. FIG. 31 shows profiles of XRD analysis result No. 4 for electric insulating film 303 formed on substrate 302 and the film of temperature sensitive body 304. The profile (1) means that both electric insulating film 303 and the film of temperature sensitive body 304 were amorphous. SEM observation for a section of this film revealed that the structure of the film was a column-like structure having a clear grain boundary.

To crystallize temperature sensitive body 304, temperature sensitive body 304 was heat treated in the air at 1000° C. or 1200° C. for 3 hours using an electric furnace. The profiles (2) and (3) in FIG. 31 mean that electric insulating film 303 consists of layers of alumina and temperature sensitive body 304 consists of layers of oxide containing aluminum, chromium and iron. The profile (2) shows that the crystal structure of the film was a single phase of the spinel structure. The profile (3) shows that the crystal structure of the film was a single phase of the corundum structure. SEM observation for a section of this film revealed that the structure of the film was a uniformly sintered structure having no grain boundary.

Next, electrode films 305 of platinum were formed using the same RF sputtering apparatus shown in FIG. 26 in the same manner as in Example 11 after target 332 was changed to a target of platinum.

Next, again with the same RF sputtering apparatus shown in FIG. 26, a target of alumina was used as target 332. Substrate 302 having electric insulating film 303, the film of temperature sensitive body 304 and electrode films 305 formed and metal mask 308 thereon were placed on substrate holder 326 within chamber 325, and substrate 302 was heated to 400° C. with heater 329 while chamber 325 was evacuated to $2 \times 10^{-4}$ Pa with vacuum pump 328. After the substrate temperature was stabilized, argon as a sputtering gas and oxygen in a ratio of 5:1 were introduced to chamber 325. High frequency power source 331 was operated to sputter target 332 of alumina for 3 hours, while chamber 325 was kept at a vacuum of 0.5 Pa, and substrate holder 326 was rotated with substrate rotating motor 330 at a rate of 5 rotations per minute. Electric insulating protective film 306 of alumina was thus formed on the part of electric insulating film 303, the film of temperature sensitive body 304 and electrode films 305 which was not covered with the metal mask.

The temperature sensor element 301 thus formed was used in a similar manner as in Example 11 to form a temperature sensor shown in FIG. 23. In the temperature sensor of the example, temperature sensor element 301 has a small thermal capacity. Further, temperature sensor 301 is expected to exhibit a high response because the heat directly conducts from the air to the film of temperature sensitive body 304 through electric insulating protective film 306 of 2 μm thickness. Conventional temperature sensor element 3100 shown in FIG. 37 was formed in the same manner as described in Example 11.

The heat response of a temperature sensor using temperature sensor element 301 was compared with that of a conventional temperature sensor. The method for measurement was the same manner as in Example 11. As shown in Table 1, temperature sensor using sample (7) of spinel crystal structure at room temperature took 3.6 seconds, 4.8 seconds and 7.3 seconds to exhibit 350° C., 500° C. and 800° C., respectively. The temperature sensor using sample (8) of corundum crystal structure took 3.1 seconds, 4.3 seconds and 6.0 seconds, respectively. On the other hand, a conventional temperature sensor using sample (13) took 5.0 seconds, 8.3 seconds and 12.5 seconds. The heat response in the temperature sensor of the example was thus found to be better at any temperature.

To examine the change in the temperature sensor of the example over time, 100 heat cycles from room temperature to 800° C. were conducted, and the above measurement was performed again. The change of period to rise from room temperature to 350° C., 500° C. or 800° C. (heat response) was restricted to between minus 0.5 second and plus 0.5 second of the original value for each respective temperature. The examination confirmed that no change in the temperature sensor over time was recognized.

The composition for Al, Cr and Fe in the oxide in the film of the temperature sensitive body of the example was at a ratio of 0.7:0.15:0.15. However, the Al-Cr-Fe composition is not limited to this example. Oxide containing Al, Cr and Fe as main components provided similar crystallinity and heat response as long as the oxide had a composition represented by $(Al_{1-x-y}, Cr_x, Fe_y)_2O_z$ wherein $0.05 \leq x+y \leq 0.95$, $0.05 \leq y/(x+y) \leq 0.6$ and $8/3 \leq z \leq 3$.

The films for an electric insulating film, temperature sensitive body and electric insulating protective film were formed on substrates at 400° C. However, the substrate temperature is not limited to 400° C. The temperature from 200 to 800° C. provided similar crystallinity and heat response.

The films for an electric insulating film and temperature sensitive body were heat treated in the air for crystallization at 1000° C. or 1200° C. However, the temperature in heat treatment is not limited to those temperatures. The temperature from 900 to 1100° C. provided spinel structure films having a similar crystallinity. The temperature from 1100 to 1300° C. provided corundum structure films having a similar crystallinity. Those films resulted in similar heat response. Heat treatment around 1100° C. caused films containing a mixture of the spinel structure and corundum structure. Films containing a mixture of the spinel structure and corundum structure resulted in a heat response intermediate between that of films singly having the spinel structure and that of films singly having the corundum structure.

EXAMPLE 15

FIGS. 22 and 23 also show a temperature sensor element and a temperature sensor of Example 15.

The method for forming temperature sensor element 301 is as follows. In this example, electric insulating film 303, a film of temperature sensitive body 304 and electric protective film 306 were formed by reactive sputtering. Electrode films 305 were formed by RF sputtering.

An RF sputtering apparatus shown in FIG. 26 was used. A target of alumina was placed on target 332. Substrate 302 of heat-resistant "Inconel" metal was placed on substrate holder 326 within chamber 325. Chamber 325 was evacuated to $2 \times 10^{-4}$ Pa with vacuum pump 328 while substrate 302 was heated to 500° C. with heater 329. After the substrate temperature was stabilized, argon as a sputtering gas and oxygen as a reactive gas were introduced to chamber 325. High frequency power source 331 was operated to sputter target 332 of metal aluminum for 4 hours, while chamber 325 was kept at a vacuum of 1.0 Pa, and substrate holder 326 was rotated with substrate rotating motor 330 at a rate of 5 rotations per minute. Atoms of metal aluminum were thus subjected to reaction with oxygen as a reactive gas in plasma to form electric insulating film 303 of aluminum oxide on the whole surface of substrate 302.

Figure 32:
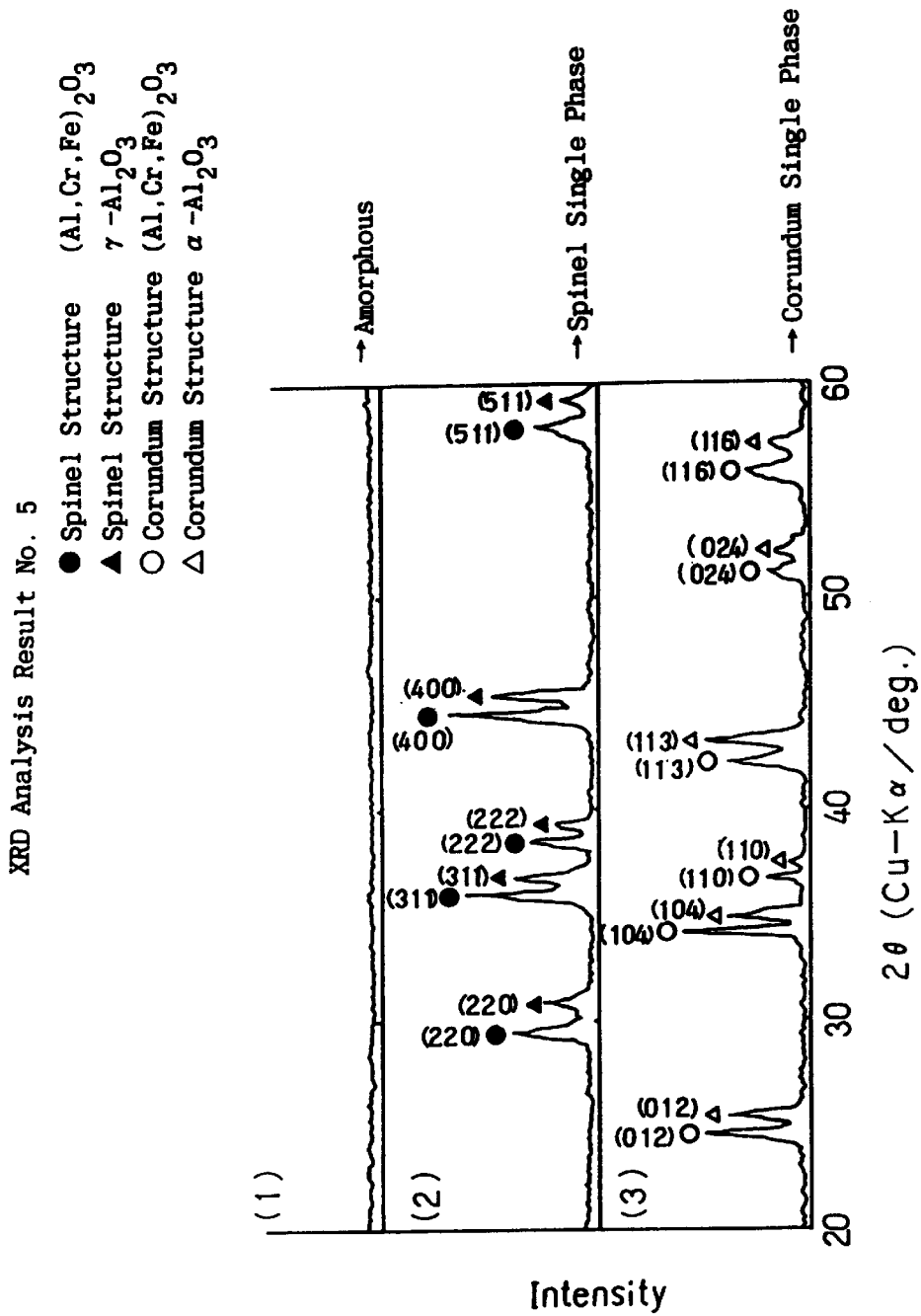
FIG. 32 shows profiles of XRD analysis result No. 5 in Example 15.

With the same RF sputtering apparatus shown in FIG. 26, target 332 was changed to a target of aluminum alloy, chromium alloy and iron alloy in a given composition. Substrate 302 having electric insulating film 303 and electrode films 305 formed and metal mask 308 thereon were placed on substrate holder 326 within chamber 325, and substrate 302 was heated to 500° C. with heater 329 while chamber 325 was evacuated to $2 \times 10^{-4}$ Pa with vacuum pump 328. After the substrate temperature was stabilized, argon as a sputtering gas and oxygen as a reactive gas were introduced to chamber 325. High frequency power source 331 was operated to sputter target 332 of aluminum alloy, chromium alloy and iron alloy for 5 hours, while chamber 325 was kept at a vacuum of 1.0 Pa, and substrate holder 326 was rotated with substrate rotating motor 330 at a rate of 5 rotations per minute. The film of temperature sensitive body 304 was thus formed of an oxide containing aluminum, chromium and iron on electric insulating film 303 which was not covered with the metal mask. Thermosensitive body 304 contained aluminum, chromium and iron at a ratio of 0.7:0.15:0.15. FIG. 32 shows profiles of XRD analysis result No. 5 for electric insulating film 303 formed on substrate 302 and the film of temperature sensitive body 304. The profile (1) means that both electric insulating film 303 and the film of temperature sensitive body 304 were amorphous. SEM observation for a section of this film revealed that the structure of the film was a column-like structure having a clear grain boundary.

To crystallize temperature sensitive body 304, temperature sensitive body 304 was heat treated in the air at 1000° C. or 1200° C. for 3 hours using an electric furnace. The profiles (2) and (3) in FIG. 32 mean that electric insulating film 303 consists of layers of alumina and temperature sensitive body 304 consists of layers of oxide containing aluminum, chromium and iron. The profile (2) shows that the crystal structure of the film was a single phase of the spinel structure. The profile (3) shows that the crystal structure of the film was a single phase of the corundum structure. SEM observation for a section of this film revealed that the structure of the film was a uniformly sintered structure having no grain boundary.

Next, electrode films 305 of platinum were formed using the same RF sputtering apparatus shown in FIG. 26 in the same manner as in Example 11 after target 332 was changed to a target of platinum.

Next, with the same RF sputtering apparatus shown in FIG. 26, a target of aluminum was used as target 332. Substrate 302 having electric insulating film 303, the film of temperature sensitive body 304 and electrode films 305 formed and metal mask 308 thereon were placed on substrate holder 326 within chamber 325. Substrate 302 was heated to 500° C. with heater 329 while chamber 325 was evacuated to $2 \times 10^{-4}$ Pa with vacuum pump 328. After the substrate temperature was stabilized, argon as a sputtering gas and oxygen as a reactive gas were induced to chamber 325. High frequency power source 331 was operated to sputter target 332 of metal aluminum for 4 hours, while chamber 325 was kept at a vacuum of 1.0 Pa, and substrate holder 326 was rotated with substrate rotating motor 330 at a rate of 5 rotations per minute. Atoms of metal aluminum were thus subjected to react with oxygen as a reactive gas in plasma to form electric insulating protective film 306 of alumina on the part of electric insulating film 303, the film of temperature sensitive body 304 and electrode films 305 which was not covered with the metal mask.

The temperature sensor element 301 thus formed was used in a similar manner as in Example 11 to form a temperature sensor shown in FIG. 23. In the temperature sensor of the example, temperature sensor element 301 has a small thermal capacity. Further, temperature sensor 301 is expected to exhibit a high response because the heat directly conducts from the air to the film of temperature sensitive body 304 through electric insulating protective film 306 of 2 µm thickness. Conventional temperature sensor element 3100 shown in FIG. 37 was formed in the same manner as described in Example 11.

The heat response of a temperature sensor using temperature sensor element 301 was compared with that of a conventional temperature sensor. The method for measurement was the same manner as in Example 11. As shown in Table 1, the temperature sensor using sample (9) of the spinel crystal structure at room temperature took 3.7 seconds, 4.8 seconds and 7.5 seconds to exhibit 350° C., 500° C. and 800° C., respectively. The temperature sensor using sample (10) of the corundum crystal structure took 3.3 seconds, 4.5 seconds and 6.2 seconds, respectively. On the other hand, a conventional temperature sensor using sample (13) took 5.0 seconds, 8.3 seconds and 12.5 seconds. The heat response in the temperature sensor of the example was thus found to be better at any temperature.

To examine the change in the temperature sensor of the example over time, 100 heat cycles from room temperature to 800° C. were conducted, and the above measurement was performed again. The change of period to rise from room temperature to 350° C., 500° C. or 800° C. (heat response) was restricted to between minus 0.5 second and plus 0.5 second of the original value for each respective temperature. The examination confirmed that no change in the temperature sensor over time was recognized.

The composition for Al, Cr and Fe in oxide in the film of temperature sensitive body of the example was a ratio of 0.7:0.15:0.15. However, the Al-Cr-Fe composition is not limited to this example. An oxide containing Al, Cr and Fe as main components provided similar crystallinity and heat response as long as the oxide had a composition represented by $(Al_{1-x-y}, Cr_x, Fe_y)_2O_z$ wherein $0.05 \leq x+y \leq 0.95$, $0.05 \leq y/(x+y) \leq 0.6$ and $8/3 \leq z \leq 3$.

The films for an electric insulating film, temperature sensitive body and electric insulating protective film were formed on substrates at 500° C. However, the substrate temperature is not limited to 500° C. The temperature from 200 to 800° C. provided similar crystallinity and heat response.

The films for an electric insulating film and temperature sensitive body were heat treated in the air for crystallization at 1000° C. or 1200° C. However, the temperature in heat treatment is not limited to those temperatures. The temperature from 900 to 1100° C. provided spinel structure films having a similar crystallinity. The temperature from 1100 to 1300° C. provided corundum structure films having a similar crystallinity. Those films resulted in similar heat response. Heat treatment around 1100° C. caused films containing a mixture of the spinel structure and corundum structure. Films containing a mixture of the spinel structure and corundum structure resulted in a heat response intermediate between that of films singly having the spinel structure and that of films singly having the corundum structure.

EXAMPLE 16

FIGS. 22 and 23 also show a temperature sensor element and a temperature sensor of Example 16.

The method for forming temperature sensor element 301 is as follows. In this example, electric insulating film 303, a film of temperature sensitive body 304 and electric protective film 306 were formed by the facing targets sputtering, and electrode films 305 were formed by RF sputtering.

Figure 33:
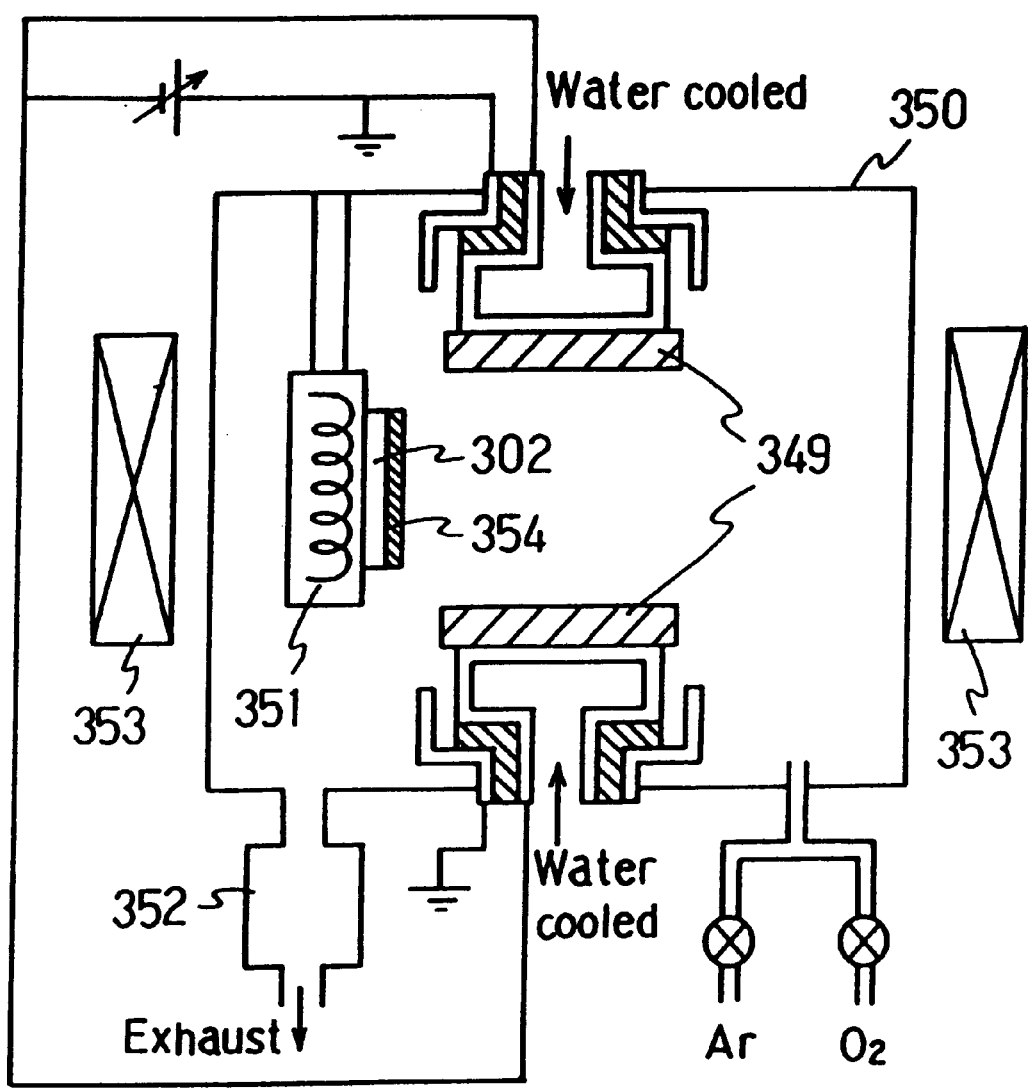
FIG. 33 is a schematic illustration of a facing targets sputtering apparatus in an example of the invention.

A facing targets sputtering apparatus shown in FIG. 33 was used. A target of alumina was placed on targets 349. Substrate 302 of heat-resistant "Inconel" metal was placed on heater 351 within chamber 350. Chamber 350 was evacuated to $2 \times 10^{-4}$ Pa with vacuum pump 352 while substrate 302 was heated to 400° C. with heater 351. After the substrate temperature was stabilized, argon as a sputtering gas and oxygen in a ratio of 10:1 were induced to chamber 350 kept at a vacuum of 5 Pa. A given magnetic field was applied with magnetic coil 353 outside of chamber 350. A given power was applied to targets 349 to generate DC plasma for sputtering targets 349 of alumina for 2 hours. Electric insulating film 303 of aluminum oxide was thus formed on the whole surface of substrate 302.

Figure 34:
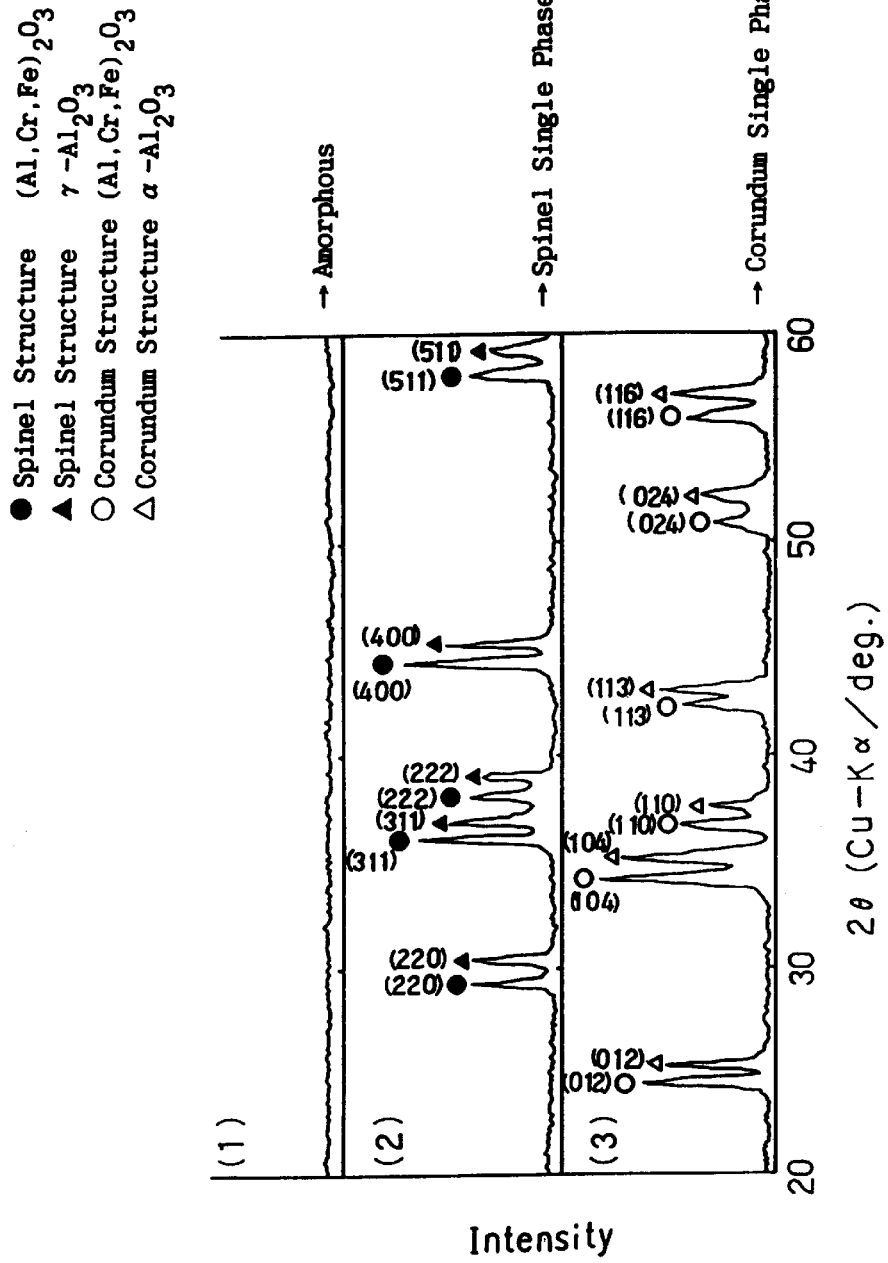
FIG. 34 shows profiles of XRD analysis result No. 6 in Example 16.

With the same facing targets sputtering apparatus shown in FIG. 33, targets 349 were changed to targets of aluminum oxide, chromium oxide and iron oxide in a given composition. Substrate 302 having electric insulating film 303 and electrode films 305 formed and metal mask 354 thereon were placed on substrate heater 351 within chamber 350. Substrate 302 was heated to 400° C. with heater 351 while chamber 350 was evacuated to $2\times10^{-4}$ Pa with vacuum pump 352. After the substrate temperature was stabilized, argon as a sputtering gas and oxygen as a reactive gas in a ratio of 10:1 were introduced to chamber 350 kept at a vacuum of 5 Pa. A given magnetic field was applied with magnetic coil 353 outside of chamber 350. A given power was applied to targets 349 to generate DC plasma for sputtering targets 349 of aluminum oxide, chromium oxide and iron oxide for 3 hours. The film of temperature sensitive body 304 was thus formed of an oxide containing aluminum, chromium and iron on the part of the electric insulating film 303 which was not covered with the metal mask. Thermosensitive body 304 contained aluminum, chromium and iron at a ratio of 0.7:0.15:0.15. FIG. 34 shows profiles of XRD analysis result No. 6 for electric insulating film 303 formed on substrate 302 and the film of temperature sensitive body 304. The profile (1) means that electric insulating film 303 and the film of temperature sensitive body 304 were amorphous. SEM observation for a section of this film revealed that the structure of the film was a column-like structure having a clear grain boundary.

To crystallize temperature sensitive body 304, temperature sensitive body 304 was heat treated in the air at 1000° C. or 1200° C. for 3 hours using an electric furnace. The profiles (2) and (3) in FIG. 34 mean that electric insulating film 303 consists of layers of alumina and temperature sensitive body 304 consists of layers of oxide containing aluminum, chromium and iron. The profile (2) shows that the crystal structure of the film was a single phase of the spinel structure. The profile (3) shows that the crystal structure of the film was a single phase of the corundum structure. SEM observation for a section of this film revealed that the structure of the film was a uniformly sintered structure having no grain boundary.

Next, electrode films 305 of platinum were formed using an RF sputtering apparatus shown in FIG. 26 in the same manner as in Example 11.

Next, again with the facing targets sputtering apparatus shown in FIG. 33, a target of alumina was used as targets 349. Substrate 302 having electric insulating film 303, the film of temperature sensitive body 304, electrode films 305, and further metal mask 354 thereon were placed on heater 351 within chamber 350, and substrate 302 was heated to 400° C. with heater 351 while chamber 350 was evacuated to $2\times10^{-4}$ Pa with vacuum pump 352. After the substrate temperature was stabilized, argon as a sputtering gas and oxygen as a reactive gas in a ratio of 10:1 were induced to chamber 350 kept at a vacuum of 5 Pa. A given magnetic field was applied with magnetic coil 353 outside of chamber 350. A given power was applied to targets 349 to generate DC plasma for sputtering targets 349 of alumina for 2 hours. Electric insulating protective film 306 of alumina was thus formed on the surface of electric insulating film 303, the film of temperature sensitive body 304 and electrode film 305 which was not covered with the metal mask.

Thermosensor element 301 thus formed was used in a similar manner as in Example 11 to form a temperature sensor shown in FIG. 23. In the temperature sensor of the example, temperature sensor element 301 has a small thermal capacity. Further, temperature sensor 301 is expected to exhibit a high response because the heat directly conducts from the air to the film of temperature sensitive body 304 through electric insulating protective film 306 of 2 μm thickness. Conventional temperature sensor element 3100 shown in FIG. 37 was formed in the same manner as described in Example 11.

The heat response of a temperature sensor using temperature sensor element 301 was compared with that of a conventional temperature sensor. The method for measurement was the same as in Example 11. As shown in Table 1, temperature sensor using sample (11) of the spinel crystal structure at room temperature took 3.7 seconds, 4.9 seconds and 7.5 seconds to exhibit 350° C., 500° C. and 800° C., respectively. The temperature sensor using sample (12) of the corundum crystal structure took 3.2 seconds, 4.5 seconds and 6.3 seconds, respectively. On the other hand, a conventional temperature sensor using sample (13) took 5.0 seconds, 8.3 seconds and 12.5 seconds. The heat response in the temperature sensor of the example was thus found to be better at any temperature.

To examine the change in the temperature sensor of the example over time, 100 heat cycles from room temperature to 800° C. were conducted, and the above measurement was performed again. The change of period to rise from room temperature to 350° C., 500° C. or 800° C. (heat response) was restricted to between minus 0.5 second and plus 0.5 second of the original value for each respective temperature. The examination confirmed that no change in the temperature sensor over time was recognized.

The composition for Al, Cr and Fe in oxide in the film of the temperature sensitive body of the example was a ratio of 0.7:0.15:0.15. However, the Al-Cr-Fe composition is not limited to this example. An oxide containing Al, Cr and Fe as main components provided similar crystallinity and heat response as long as the oxide had a composition represented by $(Al_{1-x-y}, Cr_x, Fe_y)_2O_z$ wherein $0.05 \leq x+y \leq 0.95$, $0.05 \leq y/(x+y) \leq 0.6$ and $8/3 \leq z \leq 3$.

The films for an electric insulating film, temperature sensitive body and electric insulating protective film were formed on substrates at 400° C. However, the substrate temperature is not limited to 400° C. The temperature from 200 to 800° C. provided similar crystallinity and heat response.

The films for an electric insulating film and temperature sensitive body were heat treated in the air for crystallization at 1000° C. or 1200° C. However, the temperature in heat treatment is not limited to those temperatures. The temperature from 900 to 1100° C. provided spinel structure films having a similar crystallinity. The temperature from 1100 to 1300° C. provided corundum structure films having a similar crystallinity. Those films resulted in similar heat response. Heat treatment around 1100° C. caused films containing a mixture of the spinel structure and corundum structure. Films containing a mixture of the spinel structure and corundum structure resulted in a heat response intermediate between that of films singly having the spinel structure and that of films singly having the corundum structure.

In Examples 11 through 16, the electric insulating films, films of the temperature sensitive body and electric insulating protective films were formed by any of the plasma CVD method, thermal CVD method, reactive deposition, RF sputtering, reactive sputtering and facing targets sputtering in one example. When electric insulating films, films of the temperature sensitive body and electric insulating protective films were formed in any combination of the above film formation methods, similar crystallinity and heat response were obtained as long as the heat treatment condition for crystallization was in the range of 900 to 1300° C.

INDUSTRIAL UTILITY

As explained above, the temperature sensor element of the invention, the temperature sensor having it, and the method for producing temperature sensor elements provide the following effects.

(1) Thermosensitive films are provided on a metallic support. Electrode films are provided on the temperature sensitive film. Consequently, the heat capacity of the resulting temperature sensor element becomes small, improving heat conduction. The resulting temperature sensor element becomes an excellent temperature sensor element superior in heat-resistance, thermal shock resistance, heat-response and reliability, where resistance hardly changes over time. Thermosensors having such an excellent temperature sensor element are also provided.

(2) Since the temperature sensor does not have a heat-resistant cap, the heat capacity and heat conduction resistance of the temperature sensor becomes small. The resulting temperature sensor becomes an excellent temperature sensor superior in heat-response.

(3) Since the temperature sensitive film is formed film-like, the resulting temperature sensitive film is lighter than conventional temperature sensitive films formed of seramic sintered body.

Therefore, the invention provides temperature sensors and temperature sensors which are superior in heat-resistance, thermal shock resistance, heat-response and reliability for measuring the temperature of exhaust from car engines.

We claim:

1. A temperature sensor element comprising
   a metallic support having a shape of a flat board, wherein the metallic support comprises a heat-resistant alloy consisting essentially of 18 atom % of Cr, 3 to 4 atom % of Al and the remainder of Fe, and has a thickness of 0.2 to 10 mm,
   a first electric-insulating $Al_2O_3$ film of 1 to 3 μm thickness provided on the support,
   a first temperature sensitive oxide thin film including Al, Cr, and Fe with corundum crystal structure or spinel crystal structure provided on the first electric-insulating film and having a pair of electrodes of 0.05 to 3 μm thickness containing Pt, and
   a second electric-insulating $Al_2O_3$ film provided on the temperature sensitive film.

2. The temperature sensor element according to claim 1, wherein a second temperature sensitive film is provided between the first temperature sensitive film and the second electric-insulating film.

3. The temperature sensor element according to claim 1, wherein one of the pair of electrodes is a first electrode film provided on an upper surface of the first temperature sensitive film and the other of the pair of electrodes is a second electrode film provided on a bottom surface of the first temperature sensitive film.

4. The temperature sensor element according to claim 1, wherein a metallic cover is provided on the second electric-insulating film.

5. The temperature sensor element according to claim 4, wherein the metallic cover is unremovably connected with the metallic support having a shape of a flat board.

6. The temperature sensor element according to claim 1, wherein the oxide has a component represented by

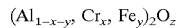

$$(Al_{1-x-y}, Cr_x, Fe_y)_2O_z$$

wherein $0.05 \leq x+y \leq 0.95$, $0.05 \leq y/(x+y) \leq 0.6$ and $8/3 \leq z \leq 3$.

7. The temperature sensor element according to claim 1, wherein the first temperature sensitive film shows at least one response property selected from the group consisting of linear type, nonlinear type, negative type and positive type with respect to temperature.

8. A temperature sensor comprising
   a metallic flange to fix a substance of which temperature is to be measured on the temperature sensor,
   a metallic housing connected with the metallic flange,
   a temperature sensor element connectedly fixed on the metallic housing,
   a lead to take out a signal, connected with the temperature sensor element, and
   an electric insulator to electrically insulate the metallic housing from the lead, provided on the lead,
   wherein the temperature sensor element comprises a metallic support having a shape of a flat board, and wherein the metallic support comprises a heat-resistant alloy consisting essentially of 18 atom % of Cr, 3 to 4 atom % of Al and the remainder of Fe, and has a thickness of 0.2 to 10 mm,
   a first electric-insulating $Al_2O_3$ film of 1 to 3 μm thickness provided on the support,
   a first temperature sensitive oxide thin film including Al, Cr, and Fe with corundum crystal structure or spinel crystal structure provided on the first electric-insulating film and having a pair of electrodes of 0.05 to 3 μm thickness containing Pt, and
   a second electric-insulating $Al_2O_3$ film provided on the temperature sensitive film, and
   wherein the lead to take out a signal is connected with each of the pair of the electrodes.

9. The temperature sensor according to claim 8, wherein the temperature sensor element comprises a second temperature sensitive film existing between the first temperature sensitive film and the second second electric-insulating film.

10. The temperature sensor according to claim 8, wherein, in the temperature sensor element, one of the pair of electrodes is a first electrode film provided on an upper surface of the first temperature sensitive film and the other of the pair of electrodes is a second electrode film provided on a bottom surface of the first temperature sensitive film.

11. The temperature sensor according to claim 8, wherein the temperature sensor element comprises a metallic cover provided on the second electric-insulating film.

* * * * *